(12) United States Patent
Fischer

(10) Patent No.: US 8,918,430 B2
(45) Date of Patent: *Dec. 23, 2014

(54) SEQUENTIAL CHAIN REGISTRY FOR EVENT AWARENESS

(75) Inventor: Randal B. Fischer, Ridgeway, CO (US)

(73) Assignee: SCR Technologies, Inc., Ridgway, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,319

(22) Filed: Aug. 25, 2011

(65) Prior Publication Data

US 2012/0054246 A1    Mar. 1, 2012

Related U.S. Application Data

(60) Provisional application No. 61/377,809, filed on Aug. 27, 2010.

(51) Int. Cl.
*G06F 17/30* (2006.01)
*G06Q 10/06* (2012.01)

(52) U.S. Cl.
CPC .......... *G06F 17/30622* (2013.01); *G06Q 10/06* (2013.01)
USPC .......................................................... 707/793

(58) Field of Classification Search
USPC .......................................................... 707/793
See application file for complete search history.

(56) References Cited

U.S. PATENT DOCUMENTS

| | | | |
|---|---|---|---|
| 6,725,287 B1 * | 4/2004 | Loeb et al. | 710/8 |
| 7,047,420 B2 * | 5/2006 | Douceur et al. | 713/190 |
| 7,082,437 B2 | 7/2006 | Reed et al. | |
| 7,281,008 B1 | 10/2007 | Lawrence et al. | |
| 8,126,933 B2 | 2/2012 | Nishiyama | |
| 8,290,986 B2 | 10/2012 | Popescul et al. | |
| 2001/0037255 A1 | 11/2001 | Tambay et al. | |
| 2002/0065695 A1 * | 5/2002 | Francoeur et al. | 705/7 |
| 2003/0177025 A1 | 9/2003 | Curkendall et al. | |
| 2003/0220862 A1 | 11/2003 | Kilgore et al. | |
| 2004/0000586 A1 | 1/2004 | White | |
| 2004/0093501 A1 | 5/2004 | Holcombe et al. | |
| 2005/0038710 A1 * | 2/2005 | Zimmerman et al. | 705/26 |
| 2005/0065862 A1 | 3/2005 | Doubet | |
| 2006/0100939 A1 * | 5/2006 | Boyer et al. | 705/28 |
| 2006/0101067 A1 | 5/2006 | Kilian-Kehr et al. | |

(Continued)

FOREIGN PATENT DOCUMENTS

| | | |
|---|---|---|
| WO | WO 02/21401 A2 | 3/2002 |
| WO | WO 2008011076 | 1/2008 |
| WO | WO 2008049033 | 4/2008 |

OTHER PUBLICATIONS

PCT International Search Report and Written Opinion mailed Apr. 9, 2012, in Application PCT/US2011/049378, 9 pages.

(Continued)

*Primary Examiner* — Noosha Arjomandi

(74) *Attorney, Agent, or Firm* — Merchant & Gould P.C.

(57) ABSTRACT

Systems and methods are disclosed for tracking information related to events. Event information may be stored in a digital sequential chain. The sequential chain stores information related to the event as it occurs over a period of time. The sequential chain allows for the relation of multiple events resulting in an event chain. The information in the event chain may be related using a unique identifier.

20 Claims, 36 Drawing Sheets

(56) References Cited

U.S. PATENT DOCUMENTS

| | | | |
|---|---|---|---|
| 2006/0253385 | A1 | 11/2006 | Reams |
| 2007/0083551 | A1 | 4/2007 | Jezierski et al. |
| 2007/0156544 | A1 | 7/2007 | Meyer et al. |
| 2007/0192216 | A1 | 8/2007 | Arnold et al. |
| 2007/0219916 | A1 | 9/2007 | Lucas |
| 2008/0010239 | A1 | 1/2008 | Nochta |
| 2008/0195434 | A1* | 8/2008 | Broughton ................ 705/7 |
| 2008/0215719 | A1 | 9/2008 | Swan |
| 2009/0187583 | A1* | 7/2009 | Pape et al. .............. 707/100 |
| 2009/0271435 | A1 | 10/2009 | Yako et al. |
| 2009/0299805 | A1 | 12/2009 | Baughman et al. |
| 2009/0307032 | A1 | 12/2009 | Tribe et al. |
| 2010/0017436 | A1 | 1/2010 | Wolge |
| 2010/0023520 | A1 | 1/2010 | Barboy et al. |
| 2010/0076931 | A1 | 3/2010 | Bornhoevd et al. |
| 2012/0054201 | A1 | 3/2012 | Fischer |
| 2013/0018696 | A1* | 1/2013 | Meldrum ................ 705/7.27 |
| 2013/0262331 | A1 | 10/2013 | Fischer |

OTHER PUBLICATIONS

PCT International Search Report and Written Opinion mailed Apr. 9, 2012, in Application PCT/US2011/049372, 9 pages.
U.S. Appl. No. 13/218,288, Amendment and Response filed Sep. 20, 2013, 32 pgs.
PCT International Search Report and Written Opinion in International Application PCT/US2013/034976, mailed Jul. 29, 2013, 11 pgs.
"Betfair Fraud Detection Use Case", EPTS F2F Meeting, Stamford, CT, Sep. 2008, pp. 1-15.
"Big Data Bonanza", Financial Times, Dec. 14, 2012, pp. 1-2.
"Brief Summary of the Dodd-Frank Wall Street Reform and Consumer Protection Act", pp. 1-16.
"Global Risks 2008: A Global Risk Network Report", World Economic Forum, Jan. 2008, 54 pages.
"Google ventures has big plans for 'start-up university'", The Wall Street Journal, Feb. 13, 2012, pp. 1-2.
"One easy way to start a trade war", Financial Times, Dec. 9, 2009, 1 page.
"Sunshine Rules", Financial Times, Aug. 22, 2012, pp. 1-2.
Accenture, "High Performance in a Volatile World: Seven Imperatives for Achieving Dynamic Supply Chains", 2009, pp. 1-24.
Aciar, Silvana et al., "Informed Recommender: Basing Recommendations on Consumer Product Reviews", IEEE, May/Jun. 2007, pp. 39-47.
Almgren, Robert, "Event Processing in Algorithmic Trading", Gartner Event Processing Summit, Sep. 15, 2008, pp. 1-32.
Armstrong, Robert et al., "Lex in depth: Facebook", Financial Times, May 2, 2012, pp. 1-7.
Arthur, W. Brian, "Competing Technologies, Increasing Returns, and Lock-In by Historical Events", Jun. 1987, revised May 1988, 22 pgs.
Atkins, Ralph, "Eurozone: Frankfurt's dilemma", Financial Times, May 24, 2011, pp. 1-4.
Balch, Oliver, "Assessment tools come of age", Financial Times, Nov. 25, 2009, pp. 1-2.
Barboza, David, "Supply chain for iPhone highlights costs in China", The New York Times, Jul. 5, 2010, pp. 1-4.
Baulier, Jerry, "What is the technology vision for event processing?", Aleri, EPTS Symposium, Sep. 18, 2008, pp. 1-29.
Bizarro, Pedro, "EPTS Use Case Workgroup Status Report", 4th EPTS Symposium, Stamford, CT, Sep. 18, 2008, pp. 1-24.
Bizarro, Pedro, "Status report on the BiCEP—Benchmarking Complex Event Processing project", 4th EPTS Symposium, Stamford, CT, Sep. 18, 2008, pp. 1-21.
Bradshaw, Tim et al., "Facebook's premium ad prices still rising", Financial Times, May 6, 2012, pp. 1-2.
Bradshaw, Tim, "Facebook ad potential starts feeding frenzy", Financial Times, Feb. 21, 2011, pp. 1-2.
Buck, Tobias, "Israel: Invention Tension", Financial Times, Aug. 31, 2011, pp. 1-4.
Business Software, "Top 15 Supply Chain Management Software Vendors Revealed", 2011 Edition, 2011, pp. 1-71.
Cane, Alan, "Digital Delivery: Supplier-Consumer relationship Undergoes a Revolution", Financial Times, Jan. 25, 2011, pp. 1-2.
Cane, Alan, "The days of the next big thing could be over", Financial Times, Dec. 9, 2009, pp. 1-3.
Cisco, "Is there a business advantage to building the end of cities as we know them?" ad, Financial Times, Jan. 26, 2012, 1 page.
Cisco, "Old Days: You bought the chutney because you liked the jar" ad, Financial Times, Jan. 25, 2012, pp. 1-2.
Criscione, Valeria, "Norwegian fund acts to stem water risks", Financial Times, Dec. 6, 2009, pp. 1-2.
Crooks, Ed et al., "Unilever and Coke vow to cut emissions", Financial Times, Dec. 12, 2009, 1 page.
Crooks, Ed, "Chiquita to stop use of tar sands oil", Financial Times, Dec. 15, 2011, pp. 1-3.
Crooks, Ed, "Oil companies plan new safety body", Financial Times, Jan. 30, 2011, pp. 1-2.
Dembosky, April et al., "Advertisers uneasy with Facebook", Financial Times, May 6, 2012, pp. 1-4.
Dembosky, April, "Facebook offers more information to advertisers", Financial Times, Oct. 3, 2011, pp. 1-2.
Dembosky, April, "Facebook sets up site for ad creatives", Financial Times, Mar. 27, 2011, pp. 1-2.
Dembosky, April, "Facebook treads fine line with advertisers", Financial Times, Jul. 23, 2012, pp. 1-2.
Deutsch, Anthony, "Cargill threatens palm oil supplier over deforestation", Financial Times, Mar. 25, 2010, 1 page.
Ding, Li et al., "Linked Open Government Data", IEEE Computer Society, May/Jun. 2012, pp. 11-15.
Dodd-Frank Wall Street Reform and Consumer Protection Act, 111th Congress Public Law 203, US Government Printing Office, Jul. 21, 2010, pp. 1-902.
Douglis, Fred et al., "System S: Stream Computing at IBM Research", IBM Corporation, 2008, pp. 1-21.
Eaglesham, Jean et al., "Businesses resist 'conflict minerals' law", Financial Times, Aug. 17, 2010, 1 page.
Eaglesham, Jean et al., "US Law to squeeze 'conflict minerals'", Financial Times, Aug. 17, 2010, pp. 1-2.
EITI (Extractive Industries Transparency Initiative) website: http://eiti.org/, printed May 2, 2013, 2 pgs.
EPC Global Inc., "EPC Information Services (EPCIS) Version 1.0 Specification", ratified standard, Apr. 12, 2007, pp. 1-144.
EPC Global Inc., "Pedigree Ratified Standard", version 1.0 as of Jan. 5, 2007, 138 pgs.
EPC Global Inc., "The EPCglobal Network and the Global Data Synchronization Network (GDSN): Understanding the Information & the Information Networks", 2004, pp. 1-12.
EPC Global powered by GS1, Object Naming Service (ONS), Version 1.0, Oct. 4, 2005 version, pp. 1-24.
EPTS, "Event Processing Glossary—Version 1.1", Editors: David Luckham and Roy Schulte, Jul. 2008, pp. 1-19.
Ernst & Young, "Climate change and sustainability: Five areas of highly charged risk for supply chain operations", 2010, pp. 1-16.
Etzion, Opher et al., "Event Processing in Action", with forward by David Luckham, 2011, Manning Publications Co., Stamford, CT, pp. 1-386.
Ferris, Christopher, "Software Standards—Role and Influence of Standards", IBM Corporation, 4th Event Processing Symposium, Sep. 18, 2008, pp. 1-17.
Ferris, Christopher, IBM Software Group, "EP Standards Panel", 4th Event Processing Symposium, Sep. 18, 2008, pp. 1-10.
Financial Times Special Report, "Global Brands", May 19, 2011, pp. 1-8.
Fischer, Randal et al., "EITI and the Oil and Gas Industry: Fiscal Transparency through the Supply Chain", Discussion Paper Aug. 2008, pp. 1-27.
Fischer, Randal et al., "Kazakhstan Petroleum Association", Feb. 28, 2008, Astana, pp. 1-5.
Fischer, Randal et al., "Market Framework for Understanding Resource Revenue Transparency", Oct. 28, 2007, pp. 1-35.

(56) References Cited

OTHER PUBLICATIONS

Fischer, Randal et al., "Pilot Project for Transparency Improvement (PPTI)", Zayed Future Energy Prize submission, Sep. 25, 2008, pp. 1-53.
Fischer, Randal et al., "Remodelling of the Extractive Industries Transparency Initiative (EITI): Why it is Necessary and How to Do It", Executive Summary, Aug. 4, 2008, pp. 1-27.
Fischer, Randal et al., "The Extractive Industries Transparency Initiative (EITI): Revenue Transparency in the Oil & Gas Market Place" Dec. 2007, pp. 1-19.
Fischer, Randal et al., "The Extractive Industries Transparency Initiative (EITI): Revenue Transparency in the Oil & Gas Market Place", Feb. 28, 2008, pp. 1-19.
Fretwell, Lisa et al., "Catch 'Em and Keep 'Em: Revitalizing the Store in a Cross-Channel World", Cisco Internet Business Group, Jan. 2012, pp. 1-7.
Garrett, Nicholas et al., "Electronics groups alarmed after renegade troops take over Congo tin mine", Financial Times, Mar. 6, 2008, pp. 1-2.
Garrett, Nicholas, "Certified Trading Chains in Mineral Production & The Extractive Industry Transparency Initiative", Sep. 21, 2008, pp. 1-43.
Gartner, "Server Vizualization: One Path that Leads to Cloud Computing", Gartner RAS Core Research Note G00171730, Oct. 29, 2009, pp. 1-3.
Godin, Arkady, "4th Event Processing Symposium Event Processing as seen by customers Position Statement", The MITRE Corporation, Sep. 17, 2008, pp. 1-11.
Godin, Arkady, "4th Event Processing Symposium Real-Time Data Stream Analytical Publish/Subscribe System", The MITRE Corporation, Sep. 17, 2008, pp. 1-16.
Godley, Wynne et al., "Prospects for the U.S. and the World: A Crisis that Conventional Remedies Cannot Resolve", The Levy Economics Institute of Bard College Strategic Analysis, Dec. 2008, 11 pgs.
Gooch, Liz, "Europe acts to ensure its imported timber is legal", The New York Times, Apr. 9, 2010, pp. 1-3.
Grant, Jeremy, "Euro Summit to review the architecture of finance", Financial Times, Sep. 24, 2009, pp. 1-2.
Grant, Jeremy, "Watchdogs call for central registry", Financial Times, Feb. 26, 2009, 1 page.
Grant, Jeremy, "Welcome to a world of low predictability", Financial Times, Apr. 28, 2009, pp. 1-3.
Grasso, Valerie Bailey, "The Berry Amendment: Requiring Defense Procurement to Come from Domestic Sources", Congressional Research Service, May 4, 2011, pp. 1-23.
Grasso, Valerie Bailey, "The Specialty Metal Provision and the Berry Amendment: Issued for Congress", Congressional Research Service, Oct. 5, 2010, pp. 1-24.
GS1 Healthcare, "A GS1 Healthcare US Success Story: Purdue Pharma Expands & Enhances Serieialization & EPC/RFID Programs Using GS1 EPCglobal Gen2 Standard", 2 pgs.
GS1 website: http://www.gs1us.org/, printed May 2, 2013, 2 pgs.
GS1, "An Introduction to the Global Individual Asset Identifier (GIAI)", BarCodes and eCom, Dec. 2006, pp. 1-8.
GS1, "An Introduction to the Global Location Number (GLN)", BarCodes and eCom, Dec. 2006, pp. 1-9.
GS1, "An Introduction to the Global Returnable Asset Identifier (GRAI)", BarCodes and eCom, Dec. 2006, pp. 1-8.
GS1, "An Introduction to the Global Service Relation Number (GSRN)", BarCodes and eCom, Dec. 2006, pp. 1-9.
GS1, "An Introduction to the Global Trade Item Number (GTIN)", BarCodes and eCom, Dec. 2006, pp. 1-16.
GS1, "An Introduction to the Serial Shipping Container Code (SSCC)", BarCodes and eCom, Dec. 2006, pp. 1-10.
GS1, "Data Driver Can Do More for Your Business", Flyer, 2 pages.
GS1, "Global Location Number (GLN) Subscription Overview", Nov. 2006, 3 pgs.
GS1, "GPC-UNSPSC Alignment Update for the User Community", 2 pgs.
GS1, "Guidelines for Department of Defense Unique Identification (UID) Markings Using the GS1 System", BarCodes and eCom, revised Nov. 2006, pp. 1-26.
GS1, "Industry Pilot Study: Tracing Grapes from Chilean Field to U.S. Grocery", 2012, pp. 1-8.
GS1, EPC Adoption Roadmap, website: www.gs1.org/resources/tools/epc-adoption-roadmap, printed May 2, 2013, 2 pgs.
GS1, General Specifications, "Section 8.0, GS1 Standards Glossary of Terms", Jan. 2007, Version 7.1, pp. 1-20.
GS1, Identification Key Series—GDTI (Global Document Type Identifier), Issue 1.3, Feb. 2009, pp. 1-4.
GS1, The EPCglobal Architecture Framework, EPCglobal Final Version 1.2 Approved Sep. 10, 2007, authors Felice Armenio et al., pp. 1-64.
Hansen, Markus et al., "Identification and Tracking of Individuals and Social Networks using the Electronic Product Code on RFID Tags", Aug. 2007, Karlstads Universitet, pp. 1-20.
Harrnigton, Peter, "Machine Learning in Action", 2012, Manning Publications Co., Shelter Island, NY, pp. 1-382.
Harvey, Fiona, "Take green path, US business warned", Financial Times, Apr. 7, 2009, pp. 1-2.
Hodge, Anthony, "Voluntary mining code is best way to build trust", Financial Times, Mar. 11, 2011, 1 page.
Hotz, Robert Lee, "Future of data: encoded in DNA", The Wall Street Journal, Aug. 16, 2012, pp. 1-3.
Hughes, Jennifer, "ECB calls for more clarity in bond market", Financial Times, Dec. 24, 2009, pp. 1-2.
IBM ad, "Smarter Business for a Smarter Planet", 2009, 1 pg.
ICMM, "Mining: Partnerships for Development", Position Statement, Feb. 2010, pp. 1-4.
Issing, Otmar et al., "New Financial Order Recommendations by the Issing Committee", London, England, Version: Feb. 2, 2009, pp. 1-36.
Issing, Otmar et al., "Why the regulators must have a global 'risk map'", AP-Financial Times Paper and Magazine found online at: http://activepaper.olivesoftware.com/Repository/getFiles.asp?Style . . . , Feb. 19, 2009, pp. 1-2.
Jacobs, Rose, "Environment: Airlines begin to realise green fuel is a complex proposition", Financial Times, Jul. 7, 2012, pp. 1-4.
Jannach, Dietmar et al., "Recommender Systems—An Introduction", Sep. 30, 2010, pp. 1-327.
Jannach, Dietmar et al., "Tutorial—Recommender Systems", Int'l. Joint Conference on Artificial Intelligence, Barcelona, Jul. 17, 2011, 126 pages.
Jodi Oil (Joint Organisations Data Initiative) website: http://jodidata.org/, printed May 2, 2013, pgs.
Kahneman, Daniel et al., "Prospect Theory: An Analysis of Decision under Risk", Econometrica, 47(2), Mar. 1979, pp. 263-291.
Kay, John, "Innovation is not about wearing a white coat", Financial Times, Dec. 16, 2009, pp. 1-2.
Kay, John, "Radical innovation rarely comes from within", Financial Times, Nov. 23, 2010, pp. 1-2.
Kirchgaessner, Stephanie et al., "Halliburton and BP knew risk before spill", Financial Times, Oct. 28, 2010, 1 page.
Koenig, Ian, "Content Distribution in an Event Oriented World", Sep. 2008, pp. 1-25.
Kotler, Philip, "Don't forget the effect of marketing", Financial Times, Apr. 20, 2010, 1 page.
Lo, Andrew W., "The Financial Industry Needs its Own Crash Safety Board", Financial Times, Mar. 2, 2010, 1 page.
Lohr, Steve, "The internet gets physical", The New York Times, Dec. 17, 2011, pp. 1-4.
Lovas, Louis, "CEP Standards", Progress Apama, Progress Software Corporation, 2006, pp. 1-7.
Lucas, Louise, "'Sustainable' palm oil falls short of mark", Financial Times, May 30, 2011, pp. 1-2.
Lucas, Louise, "Food producers accused over palm oil", Financial Times, May 22, 2011, 1 page.
Lucas, Louise, "Growing issue for palm oil producers", Financial Times, May 22, 2011, pp. 1-2.
Lucas, Louise, "Palm Oil struggles for sustainability", Financial Times, Oct. 26, 2011, pp. 1-2.

(56) References Cited

OTHER PUBLICATIONS

Lucas, Louise, "Unilever sets goal to source its palm oil", Financial Times, Apr. 24, 2012, pp. 1-2.
MacNamara, William et al., "Shell chief's warning on Dodd-Frank", Financial Times, Mar. 2, 2011, pp. 1-2.
Marcus, Bob, "Event Processing as a Service: Cloud Computing", pp. 1-18.
Marmanis, H. et al., "Algorithms of the Intelligent Web", 2009, Manning Publications Co., Greenwich, CT, pp. 1-369.
Marsh, Peter, "Big groups back global eco-label scheme", Financial Times, Feb. 28, 2011, 1 page.
Marsh, Peter, "Closed Encounters with Suppliers", Financial Times, Jul. 6, 2011, pp. 1-3.
Marz, Nathan, "Big Data: Principles and best practices of scalable realtime data systems", MEAP Edition, version 3, 2012, Manning Publications, pp. 1-100.
Masters, Brooke et al., "Cries of anti-Americanism as rating risk is revised", Financial Times, Jan. 29, 2012, pp. 1-3.
Masters, Brooke et al., "Finance: Shadow boxes", Financial Times, Feb. 2, 2011, pp. 1-6.
McEntire, Jennifer et al., "Traceability (Product Tracing) in Food Systems: An IFT Report Submitted to the FDA, vol. 1: Technical Aspects and Recommendations", Comprehensive Reviews in Food Science and Food Safety, vol. 9, 2010, pp. 92-158.
McNulty, Sheila et al., "Halliburton sues BP over Macondo claim", Financial Times, Sep. 2, 2011, 1 page.
McNulty, Sheila, "Suppliers of oil sands fuel shunned", Financial Times, Feb. 10, 2010, 1 page.
Michelson, Brenda M., "Event Processing Market Observations", 4th Event Processing Technical Symposium, Sep. 17, 2008, pp. 1-8.
Morrison, Harry et al., "Opinion: climate change and a question of loyalty", Financial Times, May 18, 2011, pp. 1-2.
Murray, Sarah, "Jobless generation hungry for change", Financial Times, Jan. 26, 2012, pp. 1-3.
Nasiripour, Shahien et al., "Disclosure of government payments mandated", Financial Times, Aug. 22, 2012, pp. 1-2.
Newing, Rod, "Environment: long-term impact of green issues played down", Financial Times, May 18, 2011, pp. 1-2.
Newing, Rod, "Supply Chains: Relationships key to reducing risk", Financial Times, Jun. 9, 2009, pp. 1-2.
Niblett, Peter, "Event Distribution in a Heterogeneous Environment aka Standards for Event Distribution", pp. 1-24.
Oakley, David, "McKinsey signals slower growth era", Financial Times, Sep. 25, 2009, 1 page.
O'Donnel, Kim, "Safeway scales the 'seafood scorecard' by Greenpeace", USA Today, pp. 1-3.
Olson, Michael, "Building Processing Technical Society", Event Processing Technical Society, Sep. 18, 2008, pp. 1-21.
Paschke, Adrian, "Rule ML W3C RIF Event Processing Standards", 4th Event Processing Symposium, Sep. 17-19, 2008, pp. 1-30.
Peels, Robert et al., "Responding to the Lehman Wave: Sales Forecasting and Supply Management during the Credit Crisis", Dec. 5, 2009, pp. 1-20.
Power Tagging whitepaper, "Smart Grids—Smart Power", pp. 1-6.
Pozsar, Zoltan et al., "Shadow Banking", Federal Reserve Bank of New York Staff Reports, Staff Report No. 458, Jul. 2010, pp. 1-81.
Recommender Systems, An Introduction, Chapter 12, "Recommendations in ubiquitous environments", 7 pgs.
Reinhart, Carmen et al., "The Aftermath of Financial Crises", Dec. 19, 2008, 13 pgs.
Rosenberg, Jothy et al., "The Cloud at Your Service", with forward by Anne Thomas Manes, 2011, Manning Publications Co., pp. 1-273.
Rosenfeld, Jeff et al., "Comparison of North American and Imported Crude Oil Lifecycle GHG Emissions", Final Report, Tiax Case No. D5595, Jul. 6, 2009, pp. 1-229.
RSPO (Roundtable on Sustainable Palm Oil), website: http://rspo.org, printed May 2, 2013, 2 pgs.
Schrage, Michael, "Interoperability: the great enabler", Financial Times, Feb. 5, 2009, pp. 1-2.
Schulte, W. Roy, "Event Processing Standards", EPTS, Sep. 18, 2008, pp. 1-7.
SCR Technologies, Inc., "Digital Energy Journal", Apr. 2011, pp. 1-3.
Searls, Doc, "The customer as a God", The Wall Street Journal, Jul. 20, 2012, pp. 1-4.
Shadow Banking, The Shadow Banking System, Map,conceptualized, designed and created by Zoltan Pozsar, The Federal Reserve Bank of New York, Nov. 2009, 1 page.
Simonite, Tom, "What Facebook Knows", Technology Review, Jul./Aug. 2012, 8 pgs.
Stabile, Tom, "Architects of a 'social investment data engine'", Financial Times, Apr. 11, 2010, pp. 1-2.
Steel, Emily, "Social Media make mark at London games", Financial Times, Jul. 25, 2012, pp. 1-2.
Taylor, Paul, "Examining the cloud's green credentials", Financial Times, Apr. 25, 2011, pp. 1-3.
Taylor, Paul, "Supply chain is a strategic discipline", Financial Times, Jan. 25, 2011, pp. 1-3.
Taylor, Richard N. et al., "Domain-specific software architecture and product lines", Software Architecture Lecture 24, 2008, pp. 1-34.
Tett, Gillian, "Global insight: New world of supply chains", Financial Times, Aug. 12, 2009, pp. 1-2.
The Economist Newspaper Ltd., "Free Exchange Economics", obtained online at http://www.economist.com/blogs/freeexchange/2012/08/growth-0/print on Aug. 14, 2012, pp. 1-4.
Thompson, Clive, "Set Data Free", Wired, Apr. 2011, 1 page.
Urban, Susan D, PhD., "A Vision for Event Processing Technology in 2018: Roadmap for Research Directions", EPTS Symposium, Sep. 17-19, 2008, pp. 1-14.
Urban, Susan D, PhD., "Research Directions for the Specification, Semantics, and Optimization of a Stream Composite Event Definition Language for Distributed Event Stream Processing", 4th Event Processing Technical Symposium, Sep. 17, 2008, pp. 1-20.
U.S. Appl. No. 13/218,288, Amendment and Response filed Mar. 21, 2013, 15 pgs.
U.S. Appl. No. 13/218,288, Office Action mailed Dec. 21, 2012, 19 pgs.
U.S. Appl. No. 13/218,288, Office Action mailed Jun. 20, 2013, 19 pgs.
Utz Guide of Implementation, "Interpretation and examples for the fulfillment of the Code of Conduct—Coffee", 2006 version, pp. 1-143.
Van Duyn, Aline, "Code system to help track US mortgages", Financial Times, Sep. 23, 2009, pp. 1-2.
Van Duyn, Aline, "Understand the financial system first, then regulate it", Financial Times, Apr. 1, 2011, pp. 1-2.
Vincent, Paul, "Standards for CEP, CEP Tools", TIBCO Software, Inc., 2008, pp. 1-10.
Von Ammon, Rainer, "Teaching Event processing", CITT Centrum Fur Informations-Technologie Transfer GMBH, pp. 1-17.
Von Ammon, Rainer, et al., "Integrating Complex Events for Collaborating and Dynamically Changing Business Processes", pp. 1-16.
Waters, Richard, "Data opens doors to financial innovation", Financial Times, Dec. 13, 2012, pp. 1-3.
Waters, Richard, "Google to unveil new search facility", Financial Times, May 17, 2012, pp. 1-2.
Waters, Richard, "Google to unveil search results overhaul", Financial Times, May 16, 2012, 1 page.
Waters, Richard, "Number crunchers seek patterns in data", Financial Times, Dec. 13, 2012, pp. 1-2.
Waters, Richard, "World-wise web?", AP Financial Times Paper and Magazine, Mar. 4, 2008, pp. 1-5.
Watts, Duncan J., "A simple model of global cascades on random networks", PNAS, Apr. 30, 2002, vol. 99, No. 9, pp. 1-6.
West Global, "Vantify Experience Centre: Aspects of Activity Monitoring in a Mobile Operator", pp. 1-16.
Wiggins, Jenny et al., "Good enough to eat?", Financial Times, Apr. 15, 2009, pp. 1-4.

(56) References Cited

OTHER PUBLICATIONS

Wiggins, Jenny, "Unilever cuts palm oil ties over environment fears", Financial Times, Dec. 11, 2009, 1 page.

Wylie, Ian, "Supply chain of information offers a vital link", Financial Times, Nov. 19, 2012, pp. 1-2.

U.S. Appl. No. 13/218,288, Notice of Allowance mailed on Mar. 6, 2014, 15 pgs.

U.S. Appl. No. 13/218,288, Amendment and Response after Notice of Allowance filed Apr. 1, 2014, 8 pgs.

U.S. Appl. No. 13/218,288, USPTO Response to Amendment after Notice of Allowance mailed on Apr. 25, 2014, 2 pgs.

\* cited by examiner

SEQUENTIAL CHAIN REGISTRY FOR EVENT AWARENESS

PRIORITY

This application claims priority to U.S. Provisional Patent Application No. 61/377,809, entitled "Sequential Chain Registry System and Method," filed on Aug. 27, 2010, and is related to U.S. Pat. No. 8,819,026, entitled "Sequential Chain Registry," both of which are hereby incorporated by reference in their entirety.

BACKGROUND

It is often desirable to track events as they occur over a sequence of time. However, an even greater benefit may be provided if events that occur on different objects, or on the same object, over a sequence of time are tracked and related. For example, the various components of a facility or an activity may have a nuanced effect on each other. Often, it is difficult to track how events that may occur involving such objects relate to one another. Furthermore, although each object may be part of the same facility or process, different objects are often under the control of different entities or systems. Because of this, it is often difficult, if not impossible, to capture and relate events or information about events that occur on an object or on different, but interrelated objects.

SUMMARY

Embodiments of the present disclosure relate to systems and methods for the creation of a digital sequential chain that may be used to relate events, as well as circumstances or metrics associated with events, which occur to an object or process over time. In embodiments, the sequential chain may be used create a relationship between interrelated objects in order to capture and relate data about events as they occur to the objects. The ability to relate these objects together provides a way to capture all data related to events as they happen to the same object or to disparate objects. Further, the relation of data provides a mechanism in which observation or analysis may be performed on how the events occurring on the same object or on disparate objects affect one another, allowing the capture, evaluation, and understanding of event sequences and their potential consequences. Such mechanism, as herein described, may be thought of as 'event awareness.'

In embodiments, a unique identifier, such as a DocString identifier is created that may be modified to track the relationship(s) created as one or more objects are subjected to different events over time.

Embodiments of the present disclosure also relate to providing a user interface that may be used to provide the data for constructing a sequential chain. Yet another embodiment discloses analytics that may be performed on data obtained from the sequential chain and a user interface for conveying the results of such analysis.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

FIG. 18 is a screenshot of an embodiment of a data entry form that enables an SCR database to receive data.

FIG. 19 is a screenshot of an embodiment of a user interface that may be employed with the systems and methods disclosed herein.

FIG. 21 is a screenshot of another embodiment of a user interface that may be employed with the embodiments disclosed herein.

FIG. 22 illustrates an embodiment of an output that may be produce by the systems and methods disclosed herein.

FIG. 23 is yet another embodiment of output that may be produced by the systems and methods disclosed herein.

FIG. 30 illustrates an embodiment of data received by a DMST (data mining algorithms and statistical tools) module.

DETAILED DESCRIPTION

Figure 1:
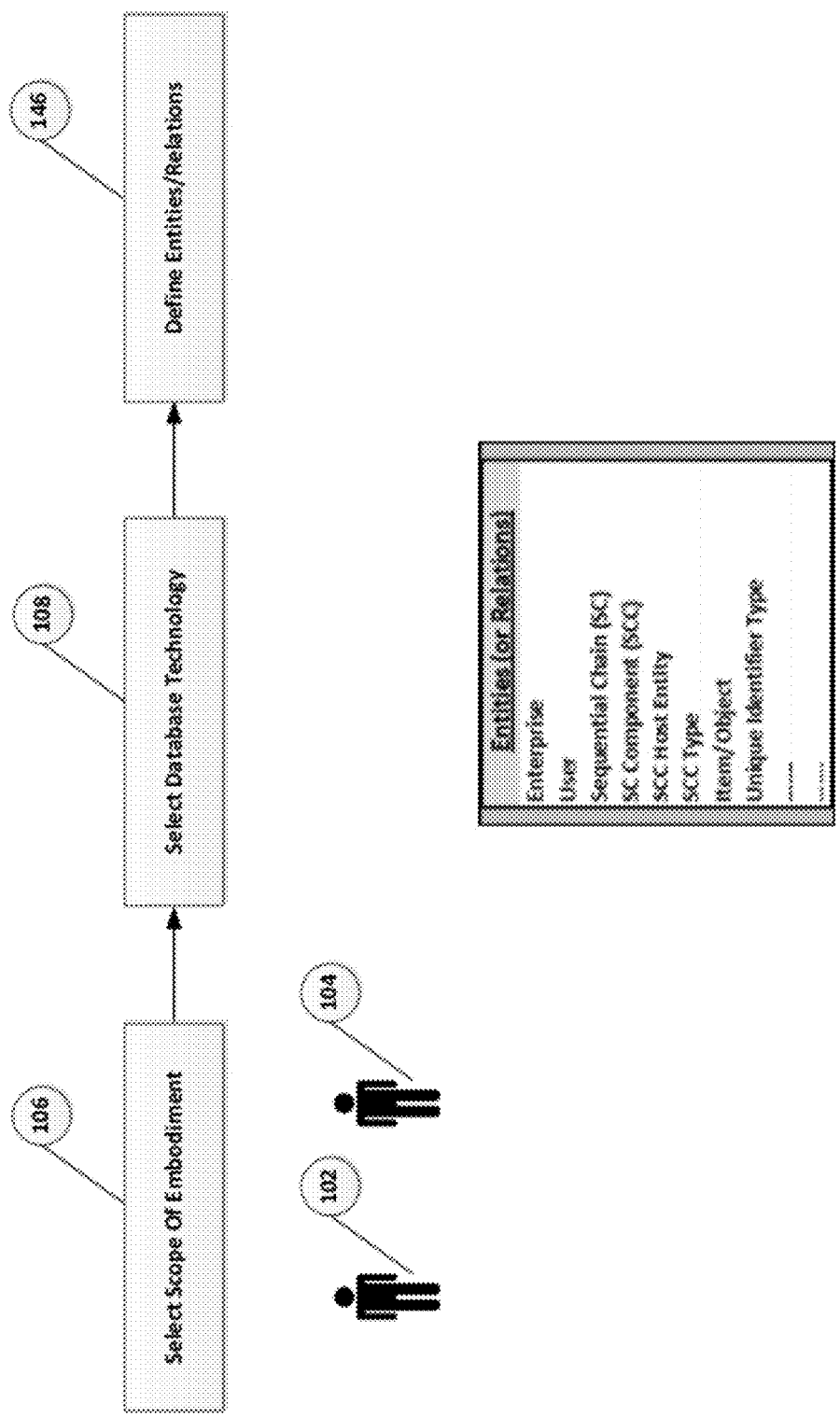
FIG. 1 is a flowchart illustrating an embodiment of a method by which a user may commence the construction of an embodiment of the "SCR" system and method.

Embodiments of the present disclosure relate to systems and methods for tracking and relating events, including meta data pertaining to external (or milieu) data associated with the events. The offshore oil and gas exploration and production industry is used herein as one instance of a sector, an industry or area in which such an embodiment may be constructively and beneficially engaged, particularly in light of the high degree of human machine interaction, or HMI, entailed in this industry. Specifically, illustration of such embodiment and its capabilities is provided, as a non-limiting exemplification of an event and sequence back testing (ESBT) embodiment of a sequential chain registry (SCR), with respect to the drilling of an offshore well for any or all of the purposes of exploring, testing, evaluating, producing, or otherwise creating an oil and/or gas well for exploratory, delineation, commercial, or other purposes. As will be apparent to an artisan of ordinary skill, other applications of an SCR embodiment (as constructed and operated for the purposes described herein for the ESBT embodiment of SCR) may be envisioned.

As used herein, the term ESBT refers to the configuring and operation of an SCR embodiment in a manner: i) whereby a particular data structure (as described below) is employed to enable capture and manipulation of data from one or a plurality of operations being conducted in support of a common objective; ii) wherein the sequence of event operations may be of particular interest to one or a plurality of parties concerned with the objective on which such embodiment may be focused or targeted; and iii) wherein particular data attributes and attribute values related to such event operations (including data attributes and data values with respect to the sequence of such operations and to the meta data associated with such operations) also may, or may not, be of interest to such parties.

ESBT, as used herein, further refers to a method whereby: i) both the fact of an event's occurrence and the sequence in which the event's occurrence takes place (that is, with respect to the temporally sequential occurrence of other events) may be tracked; ii) data attributes and attribute values pertaining to occurrence of such events (other than the fact of the occurrence) may be, but need not be, captured and kept track of in relation to such event-occurrence-sequence data; iii) logical event data chains (also herein referred to as 'event chains') may be formed and stored in an SCR database, a data analysis module, or elsewhere in another data store; iv) a reference data file, herein referred to as an 'event sequence library' or 'event sequence sub-library,' may be created by system users, a system designer or others, whereby such event sequence library (also, herein, "ESL") may be populated (by system users or others) with data for instances that describe a plurality of pre-defined events and event sequences and received by and stored in an SCR database, a data analysis module, or elsewhere in another data store; v) particular data attributes and attribute values may be associated with particular events contained in such particular, pre-defined event sequences, and also received by and stored in an SCR database, a data analysis module, or elsewhere in another data store; vi) an event sequence analyzer, also herein referred to as an "ESA," as an element in a data analysis module, may be employed by users to process data pertaining to event chains against pre-defined (or 'benchmark') data contained in an event sequence library, or ESL, thereby generating comparisons of data for actual event chains to data pertaining to pre-defined event chains; vii) an ESA may generate reports—also herein referred to as "event and sequence reports," or "E & S reports"—whereby comparisons may be made with respect to actual event sequences, compared to, or versus, pre-defined event sequences, each either including or not including corresponding comparisons of non-sequence event data; and/or viii) exception reports (and other nature of reports so generated as E & S reports) may be created wherein such reports may contain a plurality of forms of information that enable comparisons of actual event sequences and event data to pre-defined event sequences and event data, such that useful alerts, warnings, alarm flags, or other nature of information may be provided to users for the purpose of evaluating situations and taking decisions, as may be warranted. In some circumstances, comparisons of data pertaining to sequences of events for actual, tracked sequences versus pre-defined sequences (e.g., as the latter sequences may be described and contained in an ESL) may indicate, a priori, a possibility or likelihood of particular adverse outcomes if the then-present event chain is continued without corrective action being taken by decision makers using information available from an ESBT embodiment.

SCR Data Types

Various types of data (or SCR components) may be employed to track and relate events as they occur over time. For convenience and illustration, but not by way of limitation, four defined data types, or categories, are included in demonstrating the data that may be received by, and on which computation may be performed within, the present system and method. As used herein: i) data type-1, also referred to as object data, refers to data attributes and data values pertaining to a) an object that transits a sequential chain and also to b) an object that remains stationary and with events acting upon the in-place object; ii) data type-2, also referred to as sequential chain (SC) data, refers to data attributes and data values pertaining to a sequential chain; iii) data type-3, also referred to as sequential chain component (SCC) data, refers to data attributes and data values pertaining to a plurality of sequential chain components, which comprise a sequential chain; and iv) data type-4, also referred to as sequential chain component host or host entity (SCC host or SCC host entity) data, refers to data attributes and data values pertaining to a host entity that hosts a particular sequential chain component. In embodiments, each of the SCR components described herein may also be associated with an identifier. The identifier may be shared among the SCR components; for example, all of the different SCR components related in a sequential chain may have the same identifier, each SCR component may have its own unique identifier, and/or each SCR component may be associated with both a shared identifier and a unique identifier.

In embodiments, object data may be used to represent an object. The object may be any type of object, including but without limitation tangible objects and intangible objects that traverse a sequential chain. As a non-limiting example, object data may represent oil as it traverses a supply chain. Object data may be extendable such that any type of data commonly associated with the object represented by the object data may be stored in the object data. This flexibility allows the SCR systems and methods disclosed herein to be employed regardless of the type of underlying object that is being represented while allowing all relevant information associated with the object to be captured and stored. In embodiments, objects may be dynamic; that is, objects may change during the sequential chain. For example, a dynamic object may start out as crude petroleum and be refined into gasoline. Further, in embodiments, objects may remain stationary, whereby events may operate upon such stationary object. For example, a stationary object may represent an offshore oil well that is drilled and completed via a sequence of operations, e.g., by a temporal sequence of events, wherein each event in the event sequence adds in some manner to the status, state or condition of the well.

The SCC, in embodiments, is a data object capable of storing information about a sequential chain component. In embodiments, an SCC may represent a component segment or element of a sequential chain, or 'SC,' along with movement though time in which a dynamic object transits through an SCC that is associated with a sequential chain. For example, an SCC may represent an oil field where the oil was first extracted, a pipeline movement of the oil, processing of the oil in a refinery, etc. In embodiments, an SCC may represent another SC. Although specific examples are provided, one of skill in the art will appreciate that SCC may represent information related to a process activity (e.g., a refinery or a chemical plant) or a change of control action (e.g., a pipeline or oil tanker). For an instance of a stationary object, as described earlier, in embodiments an SCC as a data object has particular. In embodiments, a unique identifier, such as a DocString identifier. Is created the may be modified to track the relationship(s) created as one to an event occuring, in or at the SCC as such event may, of may not, operate upon or impact the status, state or condition of the stationary object. For example, a 'well logging' event, as an SCC, may operate upon an oil well, as an instance of a stationary object, thereby affecting in some manner the status, state or condition of the oil well.

As described above, an SC component (or SCC) may represent information about events that occur on or at a point, process, location, item or the like in the sequential chain. Data representing information about an entity related to the particular point, process, conveyance or the like in the sequential chain may be associated with an SCC. Such related data may be stored in one or more SCC host (or SCC host entity) objects. In embodiments, multiple SCC host objects may be associated with a single SCC, that is, the data for multiple entities may be related to a single portion of time, e.g., an instance represented by a SCC, in the sequential chain. For example, a set of data objects that represents in total or in part 'well logging' as an event, or SCC, may include data describing factors such as 'well depth' or 'logging crew shift foreman' as those factors (as meta data) describe the SCC host entity The sequential chain (SC) object, in embodiments, is a data object capable of grouping together and storing other information (e.g., object data, SCC data, SCC host data, etc.) that is related or relatable in a common sequential chain. The SC represents the entire sequential chain, which is comprised of a plurality of SCCs. In embodiments, the SC may be used to group and relate information related to i) dynamic objects (e.g., object data) as they move through time and space, ii) stationary objects (e.g., object data), as well as iii) all of the entities associated with each discrete period during which either a dynamic object is transiting a set of SCCs comprising a SC or a stationary object is being acted upon by events represented by a set of SCCs comprising a SC.

Such information related to objects, SCs, SCCs, and SCC host entities may be referred to as attributes. Any type of attribute may be associated with the various data types disclosed herein. The sequential chain registry systems and methods disclosed herein enable the capturing of any nature of SC Components (e.g., an oil platform) as well as information related to an SC Host Entity (e.g., a country, region, and/or static or dynamic data further describing host entities). In embodiments, attributes may be related to the events themselves. In such embodiments, the attributes may contain information related to quantity and/or quality measures of a product. The embodiments disclosed herein provide ways of relating information between objects, SC Components, and SC Host Entities, thereby providing a flexible information profile related to an object and its hosts as the object traverses a sequential chain (in an instance of a dynamic object) or to an object and its hosts as the object is acted upon via events executed in a sequential chain (in an instance of a stationary object). For example, embodiments of SCR described herein may utilize the relationships described herein to provide real world information about events as they occur in relation to an object or location.

In embodiments, the SC is an object that is assigned a unique identifier which differentiates a particular SC from any and all other SCs. Assigning a unique identifier to the SC may also be referred to as the "registration" of the SC. Thus, the registration of the SC in a registry (e.g., a database or other software environment) allows for the association of a unique identifier with the SC. Registration of the SC thereby allows the SC: a) to possess a unique identity; and b) to "hold" or "house" a plurality of SC components by relating the SC components using the unique identifier.

The SCR components (e.g., the SC component; the SCC component; the SCC host entity component; and the object component) described above are intended to be interoperable with many different types of software systems. This allows for information, in the form of structured and/or unstructured data, to be captured and maintained from various different items that may be under the control of different enterprises or systems. The SCR components provide a mechanism which can capture and relate information from objects that otherwise would not be able to share data due to a difference in design, software, hardware, architecture, or otherwise. Additionally, the SCR components described herein may be operable with various forms of analytics software. For example, the components described herein may be used with data mining software, statistical analysis software, complex event processing (or CEP) software, etc. to allow analytical processing of an object and its related data. While a specific taxonomy is used to describe certain aspects of the SCR components disclosed herein, one of skill in the art will appreciate that the taxonomy is provided for ease of illustration and is in no way intended to limit the scope of usage for the SCR components disclosed herein.

A plurality of computations may be performed on data received by a database that is designed as part of an embodiment of the SCR. By way of example but not limitation, an embodiment of the SCR may employ relational database functionality to create data sets from a plurality of individual data objects. Alternatively, other types of database structures may be used.

Sequential Chains

FIG. 1 is a flowchart illustrating an embodiment of a method by which a user may commence the construction of an embodiment of the "SCR" system and method. A system facilitator 102, a system user 104, or another may begin specification of a particular embodiment by selecting a scope of the embodiment 106. By way of example but not limitation, one embodiment as described herein is an embodiment of SCR for the oil and gas industry, wherein such embodiment, more generally, herein is referred to as the event and sequence back testing, or ESBT, embodiment. Alternatively, other embodiments of SCR may be selected, as such other embodiments are described and illustrated in co-pending patent application identified by Attorney Docket No. 40695.0001USU1, entitled "Sequential Chain Registry," which is hereby incorporated by reference in its entirety. Once an embodiment's scope is determined 106, the system facilitator 102, a system user 104, or another—for instance, a database system designer or other appropriate information technology professional—may select the particular database technology 108 judged to be most suitable to the particular scope of embodiment targeted for the SCR system and method. By way of example but not limitation, relational database technology may be selected as an appropriate technology around which to design an embodiment of the SCR. As used herein, the term RDBMS signifies a relational database management system, such as offered by software vendors Oracle®, IBM®, Microsoft®, and other enterprises.

Embodiments described herein use RDBMS software as a component of the SCR system and method. Hereafter in this description, examples shown for embodiments of the SCR system and method are derived by using an RDBMS software application offered by Microsoft®—Microsoft® Office Access™ 2007. As will be apparent to an artisan of ordinary skill, other database software and/or other forms of database technology other than relational database technology may also be selected for use in designing and operating an embodiment of the SCR. Likewise, RDBMSs other than those vended by Microsoft® may also be employed. After selecting an appropriate database technology 108, a system designer defines a plurality of entities, or relations, which may be used in an SCR embodiment 146, as described next.

Figure 2:
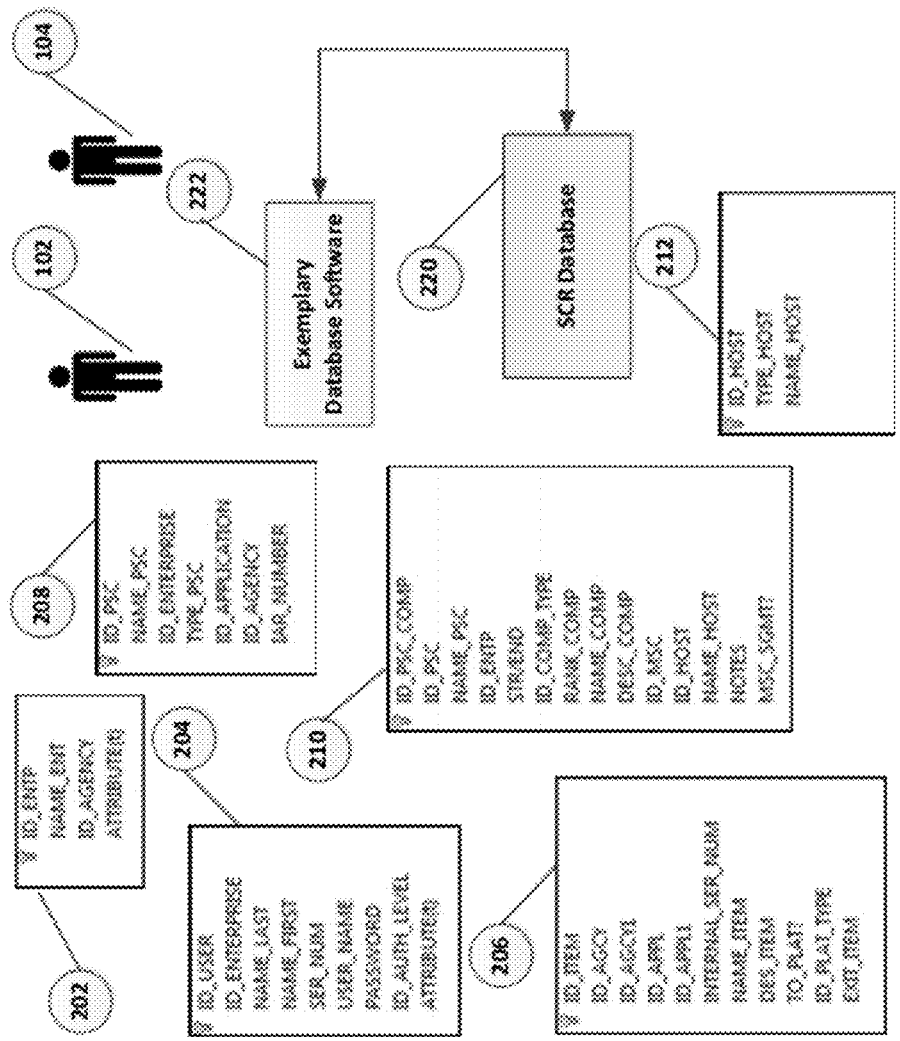
FIG. 2 is an illustration depicting embodiments of database entities.

FIG. 2 is an illustration depicting embodiments of database entities and relationships. Such entity data and entity relationships may be created, managed, and maintained by the various SCR systems and methods disclosed herein. By way of example but not limitation, element 202 depicts a database representation, as provided by exemplary database software, for the enterprise entity. The enterprise entity 202 is received into an SCR database 220 as a result of a system designer or another declaring it into the database via a suitable database software system such as the exemplary database software 222. In the instance of the enterprise entity 202, a plurality (t)-count of data attributes pertaining to the enterprise entity is created as a result of the process of declaring attributes into, and receiving them by, the SCR database 220. Similarly, FIG. 2 depicts other exemplary entities and their associated data attributes received into the SCR database for entities: user 104; object (or item or product, for instance, an oil well, etc.) 206; sequential chain 208; SC component 210; and SC component host entity 212.

Figure 3:
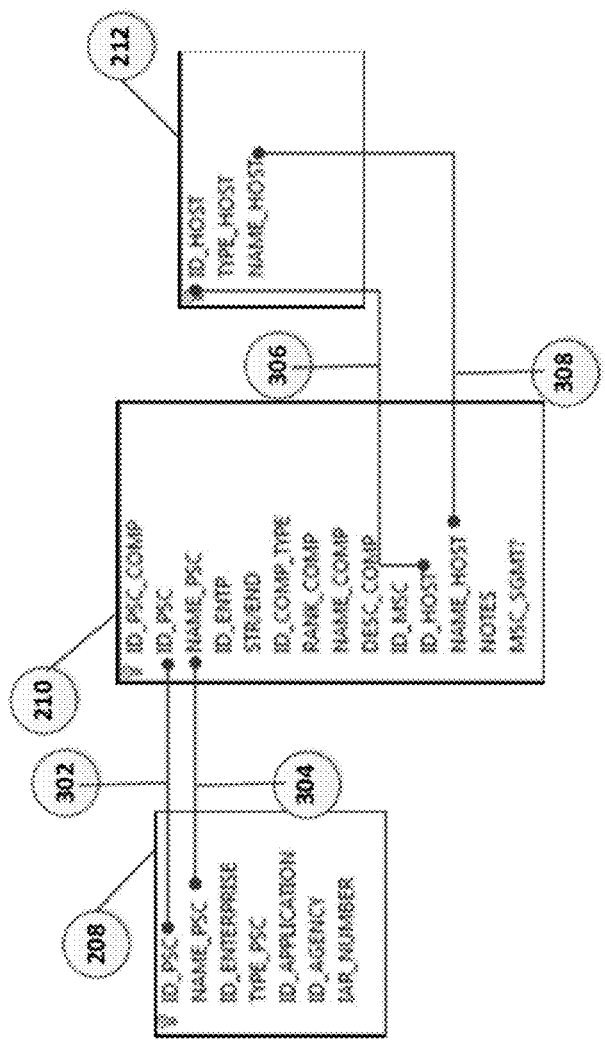
FIG. 3 shows example embodiments of entity relationships.

Definition of entity relationships may be performed by a user, by the SCR system, or by any other process, following the earlier definition of a plurality of entities. As used herein, the term entity relationship refers to an association, made within a database, among entity classes. FIG. 3 shows example embodiments of entity relationships amongst three exemplary entities 208, 210, 212. For instance, two entity relationships 302, 304 are shown between the exemplary entity sequential chain 208 and the exemplary entity SC component 210. Respectively, the two entity relationships are indicated in FIG. 3 to be created by using a sequential chain's unique ID reference 302, e.g., a form of identifier, and the sequential chain's name 304 as the common data attributes for the two exemplary entities. In an analogous manner, two other entity relationships 306, 308 are shown between the exemplary entity SC component 210 and the exemplary entity SC component host 212. Respectively, the latter two entity relationships use a SC component host's unique ID reference 306 and the SC component host's name 308 as the common data attributes for these two entity relationships. In embodiments, an SCR database receives declarations of entity relationships from a system designer, system facilitator, user, or another, via database software.

Figure 4:
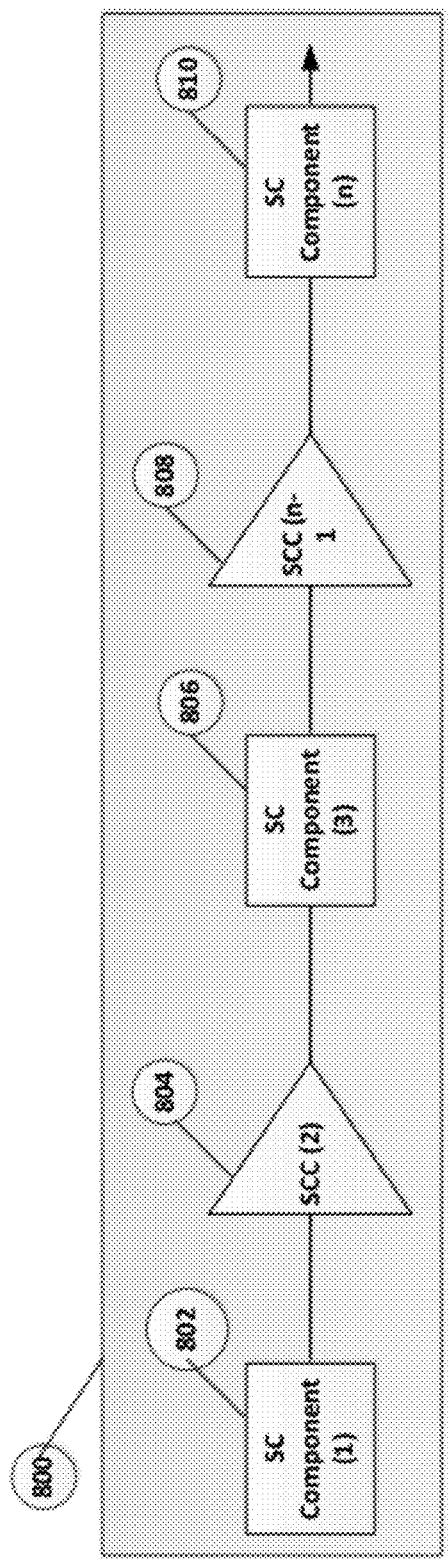
FIG. 4 provides an example embodiment of a sequential chain (SC) that may be represented using the components described herein.

For the embodiment shown in FIG. 4, specification by a user or another of a particular sequential chain 800 is received into a database, whereby the sequential chain is comprised of (n)-count of particular SC components 802, 804, 806, 808, and 810. As shown in FIG. 4, the sequential chain and the SC components comprising it may each be uniquely identified via particular identifiers (e.g., by use of non-repeating, sequential whole numbers as a form of identifier) and also may be assigned a plurality of other attributes, including attributes such as a name, an enterprise owner, an SC component rank and other attributes. Thus, in the foregoing, have been described four elements of a database system that may be used to describe even large, complex sequential chain systems. The four elements may include: entities, attributes, identifiers and relationships. Embodiments of the SCR system and method described herein may employ these four (and other) database elements.

A particular embodiment of the SCR system and method may be constructed to include suitable logic tests to ensure that the intended structure of all sequential chains is accomplished in reification. For instance, a suitable logic test may be created to ensure that: (i) an SCR database (e.g., shown as element 220 in FIG. 2) receives declared data pertaining to a number of discrete process activities (or PAs) equal to $((n+1)/2)$ and to a number of discrete change of control actions (or CCAs) equal to $((n-1)/2)$ for any particular sequential chain, wherein (n) represents an odd whole number; and (ii) the sequential chain commences with an SC component that is a process activity, or PA (thereby, ensuring that a process activity also exists at the end of the sequential chain, assuming (n) is an odd whole number). In another embodiment, other or different logic tests may be employed with the embodiments disclosed herein. For example, a test may be included to ensure that no unique SC component appears more than once in a declared sequential chain unless, for instance, an event (as represented by a SCC) is intended by a system designer or another to act upon an object, as may be the case for the exemplary event 'commence rotational drilling' when such event is intended to be effected more than only one time.

One of skill in the art will appreciate that the embodiments described herein may be employed in, or for, various different sequential chains related to various different industries. As such, the rules for each SC may vary depending upon the needs of the particular industry or the nature of sequential chain applicable to the particular industry. Any number of logic tests may be employed with the embodiments disclosed herein to ensure that the SC conforms to and accurately represents a specific sequence of events, processes, steps or the like. Thus, for reasons of data control and data quality, it may be appropriate for a particular embodiment of the SCR system and method to include a plurality of logic tests to ensure both data accuracy and sound logical relationships of the data elements received into, and accessed from, a particular SCR database system. Employment of a particular taxonomy and schema for forming and declaring sequential chains, such as described herein, enables the construction of such logic tests. As will be apparent to an artisan of ordinary skill in database design, a plurality of other taxonomies and other logic tests may be constructed, depending on the nature and complexity of a particular application environment for a particular SCR embodiment. The extent and complexity of such taxonomy and logic tests may also reflect the extent of data quality control that is intended for a particular SCR embodiment, as well as the data quality control that is available within the application space pertaining to such particular SCR embodiment.

Next are described aspects of SCR's data and logical structures that enable data relation, or association, amongst a plurality of data, including, but not with limitation, data pertaining, respectively, to events that occur over a sequence of time, sequential chains, SC components comprising a sequential chain (as the aforementioned events may, or may not, be represented as occurring in the SCCs), and host entities hosting SC components, for objects as they exist, or may exist, in a particular SC component within a particular sequential chain and as the objects may, or may not, be operated upon or otherwise affected by events as may represented as occurring in the SCCs.

In embodiments, an SCR database may receive data from a plurality of different sources within an application environment of a particular SCR embodiment. Enterprise data (e.g., data comprising the type of data stored by one of the SCR data types disclosed herein) may be received by an SCR database from enterprise users and enterprise customers, suppliers, sub-contractors and the like, while data describing an SC component host entity may be received by an SCR database from a system facilitator who focuses on providing host entity-specific data. For example, in embodiments SCC host entity data may be centrally maintained in a central repository. Because SCC host entity data may be relatively static in time (e.g., as may be contrasted to object data), central management of such SCC host entity data makes it easier to provide users with the proper SCC host entity data rather than requiring the user to discover that information herself. As a non-limiting example, such relatively static-in-time SCC host entity data may be data describing the manpower-composition of a particular drilling crew where such crew data may describe the drilling crew (e.g. a crew leader plus crew members, by name and other identification parameters), as the crew functions as a SC component (SCC) conducting various drilling events in relation to the drilling of an oil well (and, further, where the oil well is an example of a static object). In such an example, such relatively static-in-time SCC host entity data (that is, data describing a particular drilling crew) may be received by an SCR database or other data store, for instance, on a weekly or monthly basis (or whenever composition of the crew changes), and such relatively static data may be declared into the database or other data store by a system facilitator or another. On the other hand, particular SCC host entity data may be dynamic in nature, requiring dynamic data input into, and receipt by, an SCR database or other data store. For instance, measurement data pertaining to downhole drilling pressure (e.g., pressure stated in pounds per square inch), as measured during oil well drilling operations, will typically be a function of drilling depth (e.g., depth below the surface from which drilling operations began) and, as such, will be appropriately declared into an SCR database or other data repository dynamically in time and so declared by an operator (e.g. an oil field roustabout) who is closely linked to the SCC (e.g. to the drilling crew) in which the drilling events taking place are those also generating the dynamic measurements of drilling pressure.

Example SCR Systems

Figure 5:
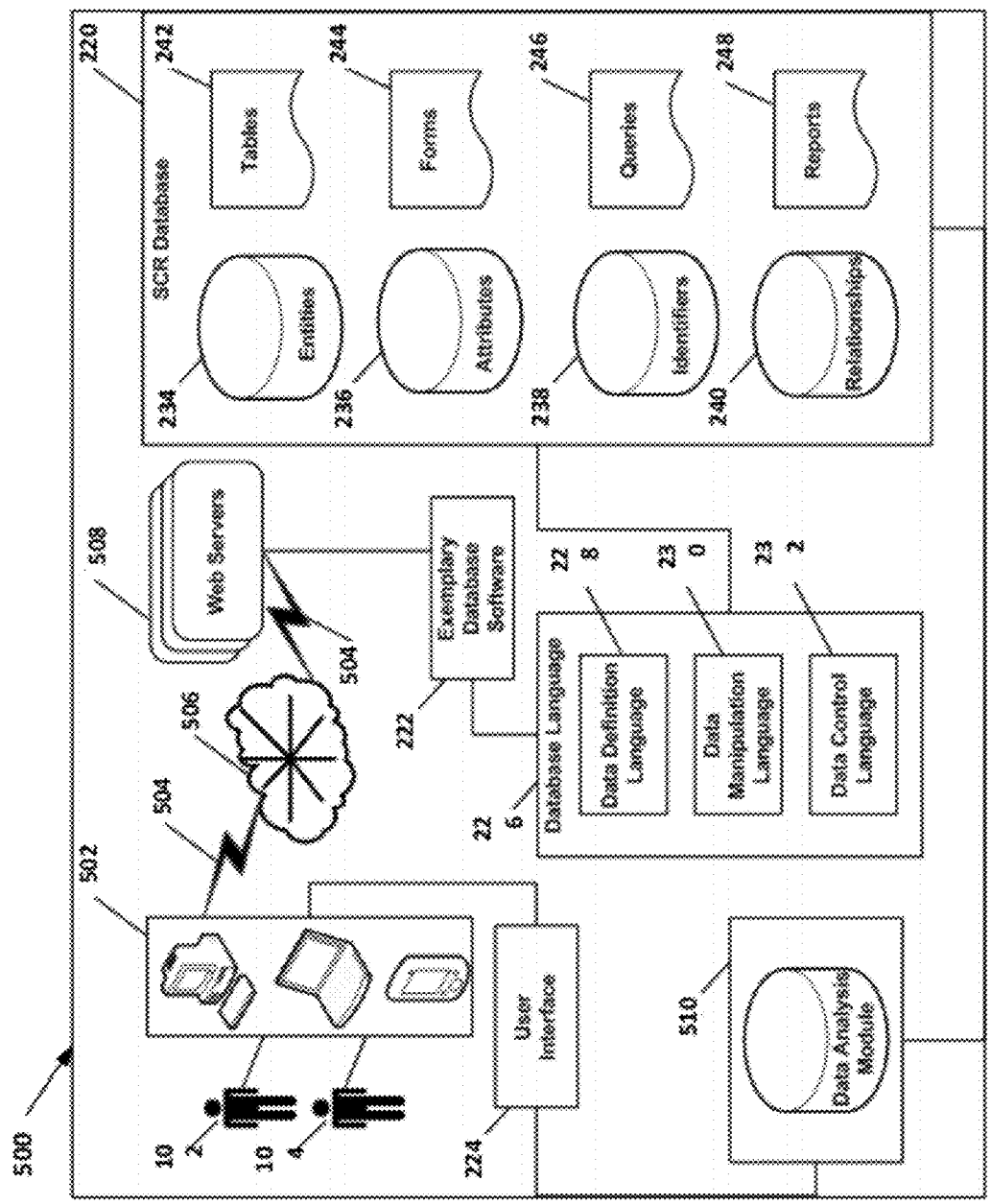
FIG. 5 is a block diagram illustrating components of an example embodiment of an SCR system.

FIG. 5 is a block diagram illustrating components of an example embodiment of an SCR system 500, including illustration of the manner in which data is received by an SCR database 220 and may be returned to users 102, 104 following manipulation of data so received. An embodiment of SCR system and method 500 may include, inter alia: i) a network communications system that facilitates data and other communication between a system facilitator 102 and a plurality of other users 104 with an SCR database 220 via exemplary database software 222; and ii) a data analysis module 510. System users 102, 104 and including a system designer (collectively referred to herein, as users) may use an appropriate remote device 502, such as a desktop or laptop computer, a telephone or smartphone, PDA or other suitable electronic device, to access the exemplary database software 222 and SCR database 220 through a network 506, such as the world wide web or an intranet, via a communications link 504. In embodiments of SCR system 500, the exemplary database software 222 and SCR database 220 may be accessed by users via a suitable user interface 224, which may also enable access to a data analysis module 510.

SCR system 500 includes a software platform 222, executing on one or more computers, for example web or application servers, that are in communication with SCR database 220, which database also executes on one or more computers. Software platform 222 may include a form of database language 226. Database language 226 may include: a data definition language 228, or DDL; a data manipulation language 230, or DML; and a data control language 232, or DCL.

DDL 228 is a part of a database language 226 used by a system designer or another to: create a particular database and structural components of the database; modify the structure of an existing database; and destroy a database after it is no longer needed. DDL 228 is employed to create structural elements, including, for instance, data schemas, data tables, and data views. DML 230 is a part of a database language 226 used by a system designer or another to operate on data that inhabits a data structure created via the DDL 228, including operations to: store data in a structured way that makes data easily retrievable; change stored data; selectively retrieve information that responds to a user's needs; remove data from a database when such data are no longer needed; and perform other such data management operations.

DCL 232 is a part of a database language 226 used by a system designer or another to: provide protection of, and security for, stored data from misuse, misappropriation, corruption, and destruction; grant, manage, and revoke access privileges to users for accessing a database system or particular segments of a database system; provide other control functions such as preserving database integrity for particular data transactions and providing backup in event of system failures; and perform other such data management operations. Insofar as the SCR system and method may be implemented using a database software system and database language suitable to a particular application environment for a particular SCR embodiment, the particular commands and instructions for effecting such implementation are specific to the particular database software system and, therefore, are not herein described.

An embodiment of SCR database 220, therefore, may receive a plurality of data: as may be declared by users via a communications network 502, 504, 506, 508 and, in particular instances, via the aid of a user interface 224; and as defined, manipulated and controlled via database software 222 and database language 226. SCR database 220 may store such data as particular classes of data and as particular instances of data within a particular class. Data in SCR database 220 may be further organized into entities 234, attributes 236, unique identifiers 238 and entity relationships 240. As also illustrated in FIG. 5, SCR database 220 may include tables 242, forms 244, queries 246, and reports 248.

Although not illustrated in FIG. 5, one of skill in the art will appreciate that the systems disclosed herein may exist in a cloud computing network. For example, the SCR database 220 may exist on a number of distributed data stores and/or servers, such as Web Servers 508 that are located in a number of different locations. The various types of data and SCR components disclosed herein may be stored across the distributed data stores and or servers that make up a cloud networked SCR database. Client devices, such as devices 502, can access the various devices that make up the cloud via a network, such as network 506. One of skill in the art will appreciate that network 506 may be the Internet, a WAN, a LAN, or any other type of network known to the art.

Figure 6:
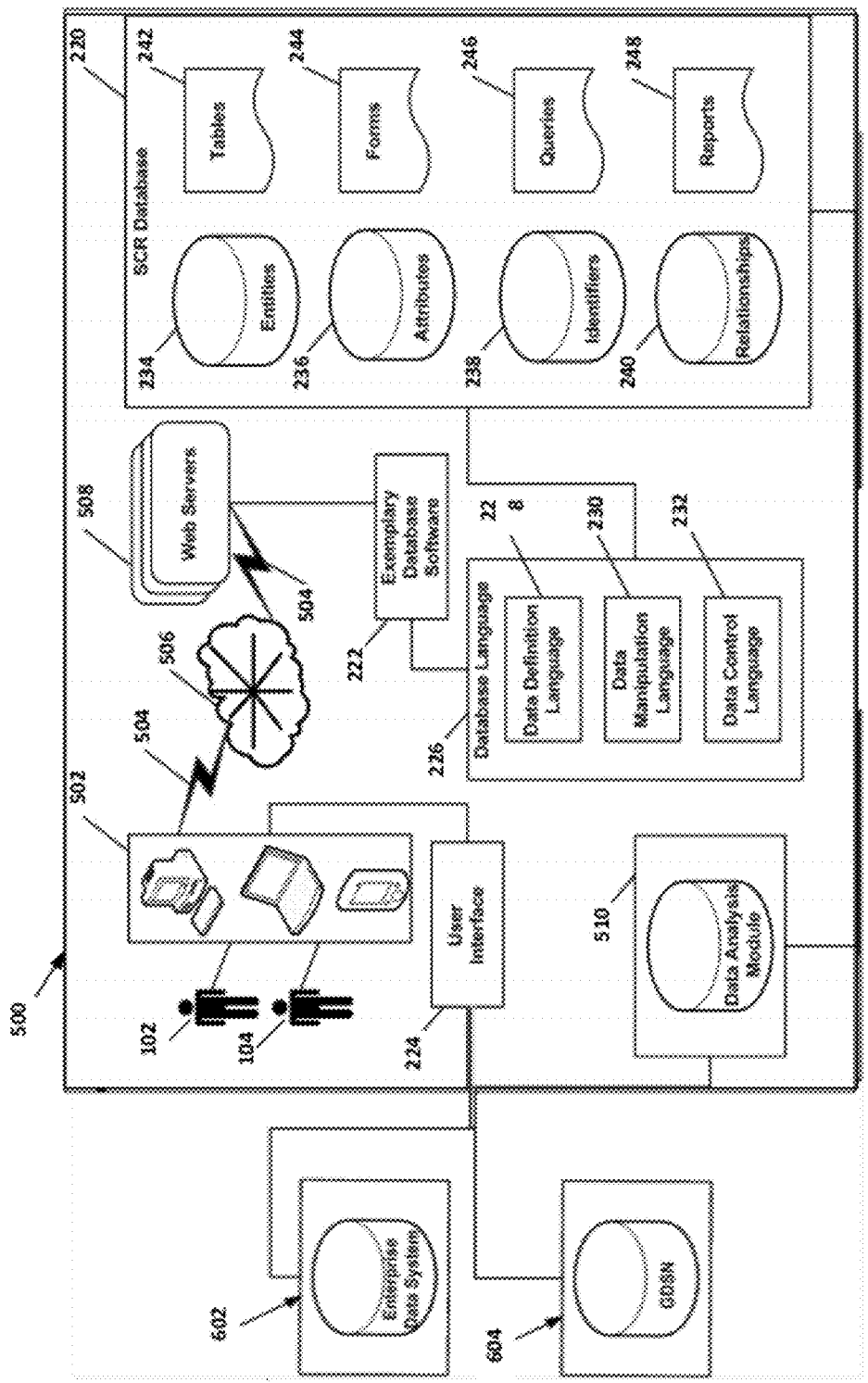
FIG. 6 is a block diagram illustrating an exemplary embodiment of an SCR application in an environment wherein SCR database may receive event data.

FIG. 6 is a block diagram illustrating an exemplary embodiment of an SCR system 500 in an environment wherein SCR database 220 may receive data from either of, or both, an enterprise data system 602 and a global data synchronization network 604. For instance, an embodiment of SCR may be used in an environment in which particular data regarding objects existing in sequential chains may already exist in existing enterprise data systems 602, such as accounting systems, inventory management systems or any ERP system, such as those provided by SAP AG, IBM® or Oracle® Corporation. Similarly, an embodiment of SCR may be used in an environment in which particular data regarding objects existing in sequential chains may already exist in one or a plurality of global data synchronization networks 604, or GDSN, such as the GDSN® that is interoperated with the GS1 Global Registry.

In such an application environment, wherein SCR system 500 may be interoperated with either or both an enterprise system 602 and a GDSN 604—referred to herein, collectively, as external data networks—SCR database 220 may receive data via a network 502, 504, 506, 508 and database software 222, as described above, but whereby data stored in such external networks is first manipulated via a suitable user interface 224, for instance, via an interface that may enable data extraction, transformation, and load (also, herein referred to as ETL) operations. Integration of data supplied by external data networks 602, 604 and received by SCR database 220 may execute within the same operating environment as database software platform 222, as described above. Alternatively, data integration may execute independently from software platform 222, that is, on separate computers. In either event, such data integration enables SCR database 220 to receive data from one or more external networks 602, 604 in addition to receiving data from users communicating directly with SCR database 220, as described earlier. An example of data accessed from external data networks 602, 604 is relatively time-static data, for instance, data describing and identifying particular drilling crews and their members.

Figure 7:
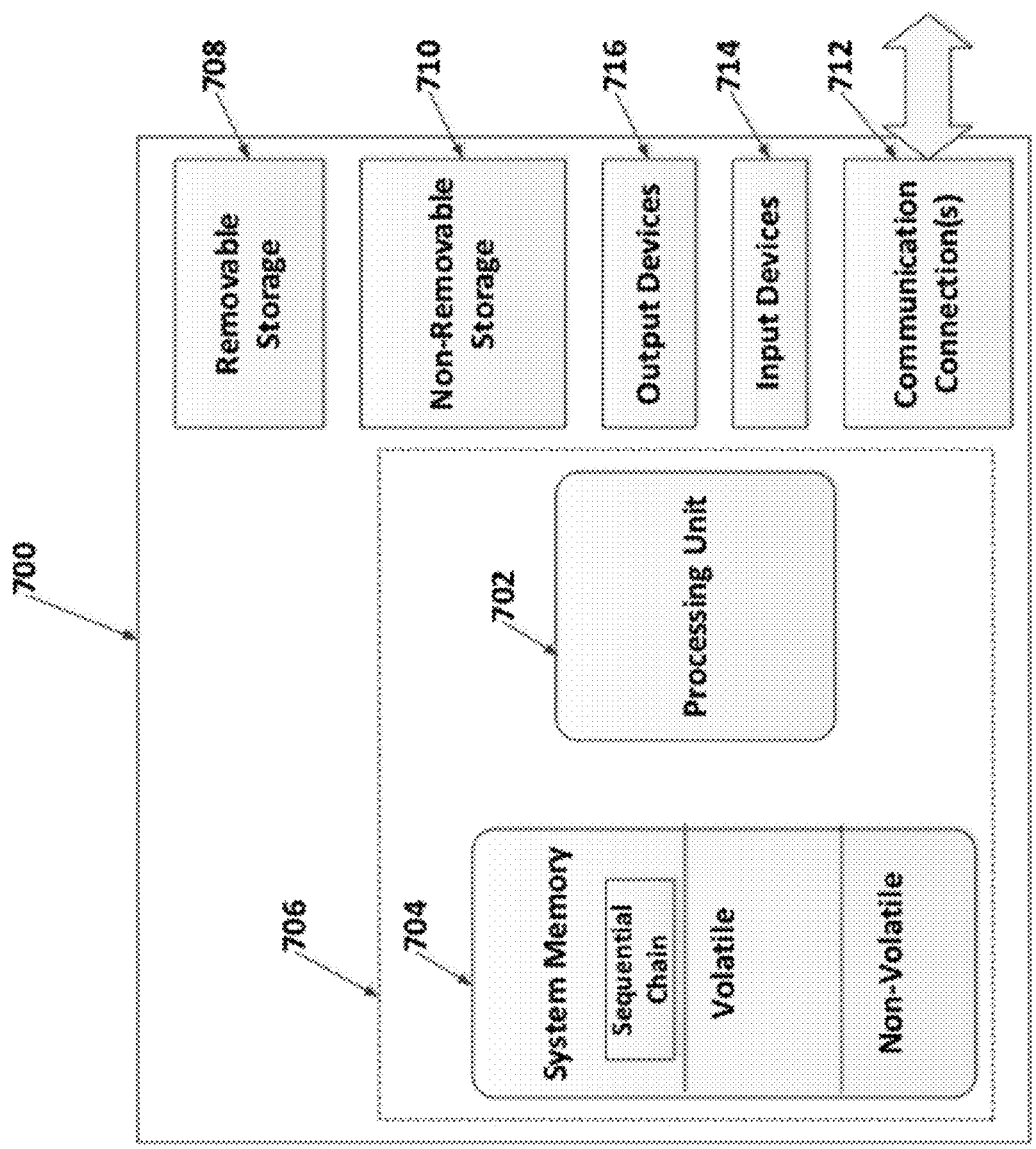
FIG. 7 illustrates one example of a suitable operating environment in which one or more of the present embodiments may be implemented.

FIG. 7 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server, including a server operating in a cloud environment. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 7 illustrates one example of a suitable operating environment 700 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, sequential chains constructed as described herein) may be volatile (such as RAM), non-volatile (such as ROM, flash memory, etc.), or some combination of the two. This most basic configuration is illustrated in FIG. 7 by dashed line 706. Further, operating environment 700 may also include storage devices (removable, 708, and/or non-removable, 710) including, but not limited to, magnetic or optical disks or tape. Similarly, operating environment 700 may also have input device(s) 714, such as keyboard, mouse, pen, voice input, etc. and/or output device(s) 716, such as a display, speakers, printer, etc. Also included in the environment may be one or more communication connections 712, such as LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Event and Sequence Back Testing (ESBT)

In order to provide a realistic industrial setting for describing construction and implementation of an embodiment functioning with SCR's ESBT capability, illustrative descriptions herein draw upon a set of hypothetical events relating to an assumed (hypothetical) industrial accident that may be assumed to have occurred on 20 Aug. 2009 in the Gulf of Alaska (in U.S. waters), whereby the (hypothetical) offshore drilling rig known as the 'Broad View,' owned by Enterprise 'B' Ltd., a large offshore drilling contractor, exploded, capsized, and sank to the seabed floor. Assumed hypothetical investigations may indicate that this adverse outcome—that is, the assumed total loss of the Broad View drilling rig, resulting in consequential loss of human lives and causing one of the largest offshore petroleum related environmental disasters in U.S. history plus the (hypothetical) initial loss of some $3 billion market value in the equity and debt of ACME Oil Company, or ACME Oil (as operator of the ABC well, on which the Broad View rig was drilling at the time of that rig's demise)—may likely have been the result of improper sequencing of events leading to the (assumed) explosions on and around the rig. The following description illustrates how an SCR embodiment, operating with the features of event and sequence back testing, or ESBT, may be constructed and operated with a target focus of avoiding undesirable sequencing of events—such as the sequencing of events on an offshore drilling platform—and, thereby, enabling greater operational control and safety, thereby reducing the probability of occurrence of highly consequential, negative outcomes. In addition to the assumed entities of ACME Oil and Enterprise 'B,' two other enterprises are also assumed to be involved in this hypothetical illustration: Enterprise 'A' and Enterprise 'C,' as further described below.

An ESBT embodiment may be operated by system users and others in a manner that provides predictive process control, or PPC. PPC, as implemented by an ESBT embodiment and as herein described, operates in a manner that enables identification of variations of controllable parameters in order to stabilize processes within a manufacturing or other nature of operation in order to maintain or enhance quality of the output of such operations. For the illustrative instance of applying an ESBT embodiment in the offshore oil well drilling sector, such output may be considered a safely constructed and suitably functional oil or gas well, and controllable parameters may be considered the operating parameters of a plurality of support operations that are performed in order to accomplish creation of such target output, or object. For purposes of contributing to the safety and control of such support operations, a highly important controllable parameter may be the temporal sequence in which two or more particular support operations (also herein referred to as 'events') occur, accompanied by the circumstances surrounding each such support operation, or event occurrence (or, also, event execution). As described below, identification of variations in event sequence—specifically, variations between an actual (or planned) sequence of events versus a set of benchmark event sequences—is an objective of the ESBT system and method.

An ESBT embodiment of SCR may be considered as a form of support relationship management (SRM). Use of the ESBT embodiment of SCR as an aid to SRM has a particular focus on capturing, evaluating, and understanding event sequences and their potential consequences. In this respect, the ESBT embodiment of SCR may be employed as a risk management tool for evaluating, controlling, and improving sequential operations and processes such as those that take place in the field of offshore (and onshore) drilling operations in the oil and gas industry, as an example. However, one of skill in the art will understand that the SCR components as well as the various ESBT embodiments described herein may be employed as a risk management tool in any industry or situation. An ESBT embodiment employs predictive data mining and other tools as a means to monitor and control, in real (or near-real) time, a plurality of continuous processes, e.g., a plurality of processes involved with drilling and completing an oil or gas well.

The ESBT system and method treat a plurality of support enterprises, support roles, support events, and the like as entities (e.g., enterprises or personnel) that provide support to a common objective. For the illustrative application of an ESBT embodiment of SCR herein described, such common objective may be considered, for instance, to be the completion of a sound, safely constructed offshore oil or gas well. For instance such a well may be one as may be designed, constructed and operated under the operatorship of a large oil company. Referring to the hypothetical energy company ACME Oil Company's operatorship of the hypothetical exploratory ABC well in the Gulf of Alaska during 2008 and through 2009 until the night of 20 Aug. 2009 (when the hypothetical drilling rig, Broad View, operating on the ABC well, capsized following a blowout of the well) various observations may be made. First, the common objective that is supported by a plurality of support enterprises, for purposes of illustrating an ESBT embodiment of SCR, may be herein considered as 'the safe completion of the ABC well, located 50 miles offshore Alaska in deep waters of the Gulf of Alaska.' Second, support enterprises—e.g., those enterprises providing support to such common objective (e.g., to the safe completion and operation of the ABC well), whereby support relationship management (SRM) is a useful task to perform—may be herein considered to be enterprises such as Enterprise 'B' Ltd., which owned the Broad View rig and leased it to ACME Oil, and Enterprise 'A' and Enterprise 'C', which performed certain tasks and events in support of the ABC well, as the common objective; and others. Events, for non-limiting illustrative purposes, may be considered functions such as performance of particular operations by support enterprises, including those such as Enterprise 'A's inserting cement into the bore structure of the ABC well (an operation known as 'cementing' in the oil and gas well drilling sector), as well as performance of particular measurement or testing operations, such as Enterprise 'A's operation of measurement equipment to sample and measure flow rates of cement injected into the well bore and to take pressure measurements at particular points downhole in the well bore. As described below, such 'events' are treated, in an ESBT embodiment, as database entities within the particular data schema.

The ESBT embodiment, is herein described with respect to a plurality of event occurrences: which happen, are identified, and are recorded with particular attention to the temporal sequence in which such event occurrences may happen and which, therefore, are sequentially relatable as amongst each particular such event occurrence (e.g., as an event may occur at $time_{(t)}$) and all other such particular event occurrences (e.g., as each may occur at $time_{(T)}$) that are identified as being in a commonly shared sequence of events. An event, as used herein, for instance, may be the event, or act, of taking or measuring pressure or temperature in a particular place and at a particular time; an event also may be a non-measurement or non-test activity, such as the insertion of drilling fluids into a well bore or the cementing of well casing. As one of skill will observe, the former nature of event instance (e.g. the measurement of pressure) may create a data object (e.g., a particular instance of measured pressure such as '12,250 psi as measured at 16.47 hours on 19 Aug. 2009'), which data object in turn may be an exemplary metric that may be related to the latter nature of event instance (e.g., the insertion of drilling fluids into an oil well bore).

An ESBT embodiment of the SCR system and method may be run in a live, real time mode whereby ongoing accumulation and analysis of appropriate data, combined with the data structure and other features of the ESBT embodiment, may enable creation of time-critical, sequential information that may be used to aid decision analysis and decision making. The a priori application of the ESBT embodiment, in the case of ACME Oil's (hypothetical) ABC well blowout, as described below, enables the capture, storage, relation, analysis, and dissemination of mission-critical information and evidence that may be used in decision making and, thereby, may save (in the hypothetical circumstances): ACME Oil, the loss of great capital and reputation; oil rig workers, their loss of lives or injuries; the Gulf of Alaska much environmental catastrophe; and many others, the losses consequential to a possible mismatch between planned, safe event chains versus executed event chains.

Application of an ESBT embodiment of the SCR system and method is one manner in which a tragic and costly accident (e.g., such as the hypothetical ABC well blowout) may be avoided—specifically, by enabling multi-dimensional a priori capture and analysis of particular target data, including the event sequences in which particular data are captured and/or in which events are executed, and processing such data against an event sequence library (ESL) via an event sequence analyzer (ESA). Through such system and method, personnel (e.g., personnel of several independent, hypothetical enterprises) onboard the (hypothetical) rig Broad View during the day and night of 20 Aug. 2009 may have been apprised of one or more particular actual sequences of events, which sequence or sequences in part or in aggregate may have been analyzed and shown to present a high probability of adverse outcomes. Such analysis may be provided by application of particular algorithms and other data processing techniques (as described below) that enable (e.g., in an ESBT embodiment) comparison of actual event sequences to a set or domain of benchmark event sequences, whereby such set of benchmark event sequences may be stored in an ESL. If adequate data had been captured and analyzed in a timely manner so as to enable decision making on the hypothetical Broad View oil rig with benefit of such analysis, then real time operational modifications may have been made, in the event of the ABC well blowout, thus possibly converting a deadly event sequence into one that may have been appropriately modified, in advance, thereby preventing the adverse outcomes that eventuate in this illustrative and hypothetical example.

Furthermore, the systems and methods disclosed herein may be employed across the various systems used by different entities, thereby ensuring data that may have otherwise been siloed in separate systems is aggregated in order to provide analysis of related events as they occur in real time. In other words, the ESTB embodiments of SCR disclosed herein may be employed to collect data regarding events from different, disparate systems which otherwise may not have been able to communicate with each other. In embodiments, a DocSting identifier may be used to relate and aggregate information about different events into a single event chain.

ESBT system and method may track information related to stationary objects (e.g., such as an oil or gas well), specifically data objects pertaining to the facts of a particular event's occurrence (e.g., occurrence with respect to a stationary object) and such occurrence in relation to other event occurrences within SC components whose principal nature of relation with other SC components (within a particular sequential chain) is one whereby a particular sequence may be uniquely identified—both for planned and as-executed event chains—with specific reference to the temporal ordering of such SC components and the events therein occurring.

The ESBT embodiments described herein enable continuous linkage of static objects—that is, data objects—to a particular (uniquely identified) event chain. In event chain-centric ESBT embodiments, a data structure may be employed to capture such data objects related to events. In ESBT embodiments, the data structure provides for discrete static objects (as discrete data objects) to be associated with discrete event chain SC components, with at least one static data object (including, possibly, null objects) per each one SC component. In embodiments, as is described herein, a DocString identifier may be used to link a series of events and/or each individual event with additional data about the event. The DocString identifier may be used to relate one or more events that may occur over a period of time. The DocString identifier may be used to relate the one or more events in such a way that a digital event chain can be constructed which aggregates data pertaining to all related events (and, in embodiments, milieu data about the events).

In the exemplary embodiments herein described, forms of sequential chains may be constructed. In ESBT embodiments, such sequential chains may exist, inter alia, in order to provide a data structure (within an SCR database) with capability of providing a structured, sequential framework to house and enable sequence-ordering of data pertaining to a plurality of SC components (and including to a plurality of events that occur or may occur in a plurality of SC components), and whose function includes giving a time-ranked ordering to a series of events and event-related data, such as physical measurements or changes, chemical measurement or changes, or any other type of change or measurement.

ESBT embodiments represent instances of an SCR system wherein the data structure may differ from other embodiments that may be deployed using SCR (e.g., the SCR system and components), specifically in that the object related to a SC component in an ESBT embodiment may be a static (non-moving) data object in contrast to the non-static (moving) nature of objects appropriate to the other SCR embodiments described in the co-pending patent application entitled "Sequential Chain Registry," which is hereby incorporated by reference in its entirety. As will be apparent to an artisan of ordinary skill, other nature of objects, sequential chains, and SC components may also be articulated and used in operations of other embodiments of the SCR system and method, which is highly malleable, customizable, and adjustable in its number of configurations.

Figure 8:
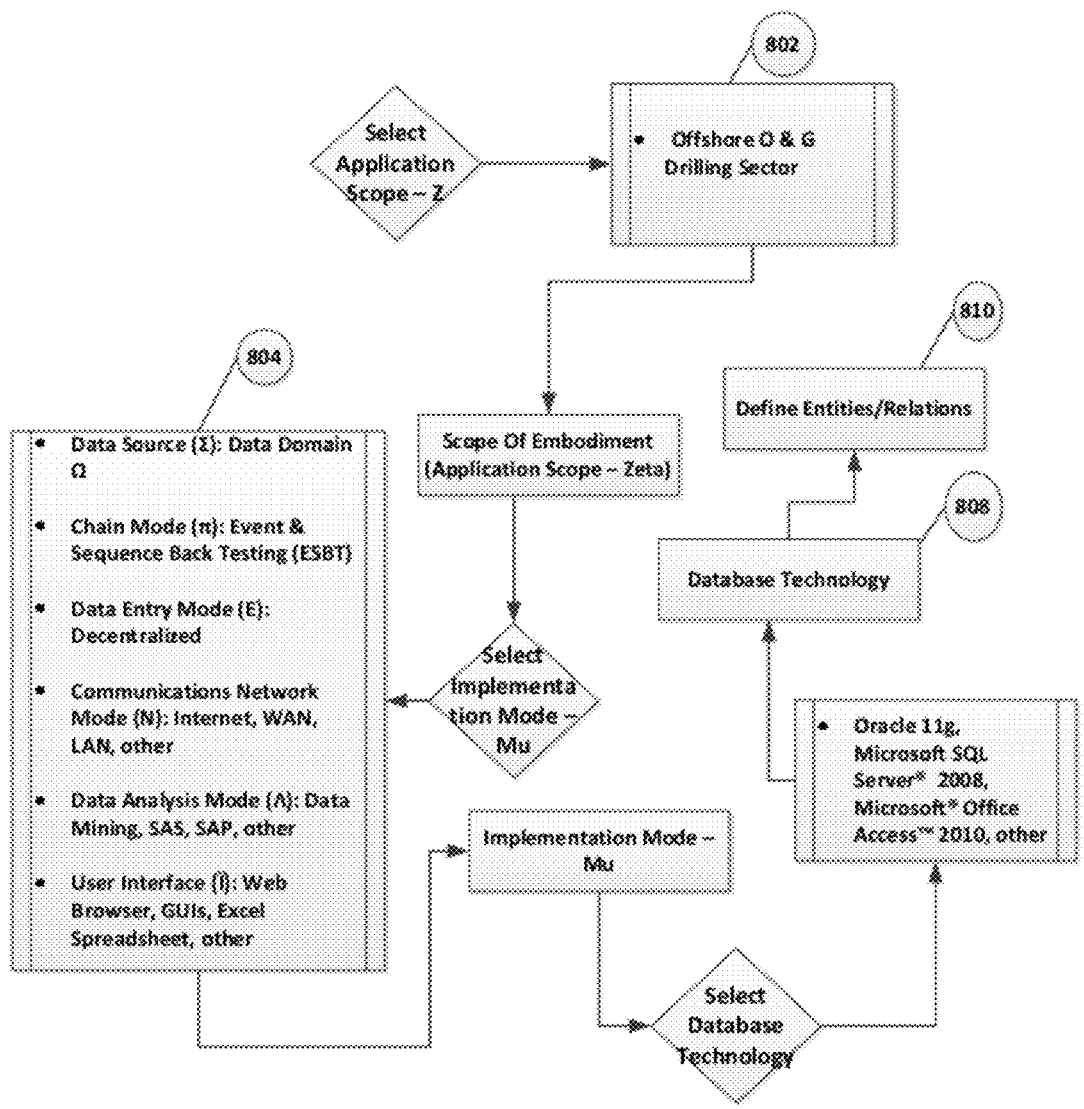
FIG. 8 is a flow chart illustrating steps taken by a system designer or others, as an aid in selecting particular features for event and event-sequence back testing.

FIG. 8 is a flow chart illustrating steps taken by a system designer or others, as an aid in selecting particular features for an event and sequence back testing, or ESBT, embodiment.

System design features for constructing an ESBT embodiment may be selected by a system designer or another, including particular features for an application environment 802, such as, for example, the offshore oil and gas drilling sector, a set of implementation modes 804, including the ESBT chain mode, and appropriate database technology and systems 808 for use with the selected application environment and chain mode. The system designer or another, then, may commence defining entities and entity relations 810, whereby, 'entity' connotes something for which a user wishes to assign identity and to track, and whereby 'entity relation' connotes user-defined relationships or linkages between particular entities.

For an ESBT embodiment, entities may be considered to be 'events,' e.g., the actions that may be executed within the application environment, e.g., in the exemplary instance, the offshore oil and gas drilling sector or industry. For instance, one such event—as an entity to be identified and tracked—may be the well drilling operation, 'inject drilling fluid into well bore,' which is performed as one task in drilling and completing an oil or gas well.

Figure 9:
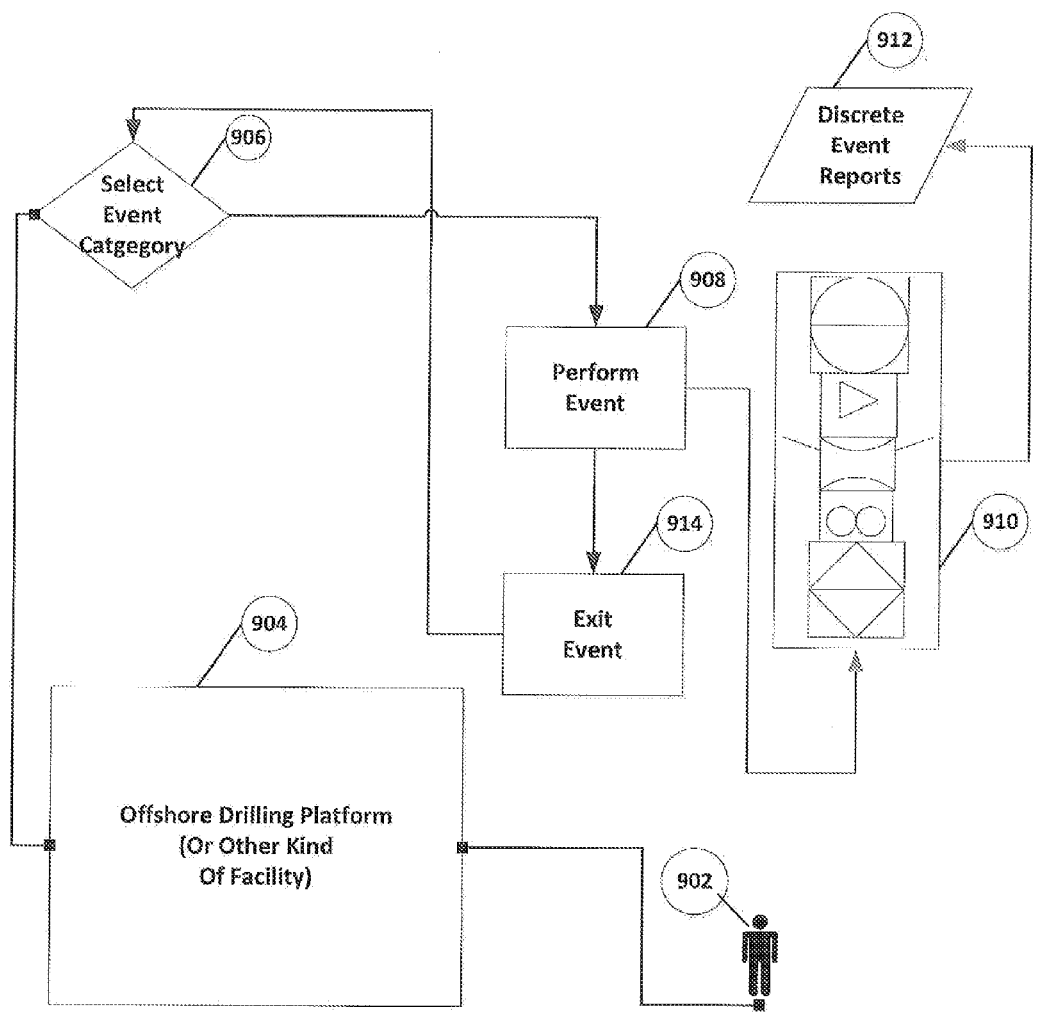
FIG. 9 is a flow chart representation, as a high-level overview, of exemplary method 'event and sequence back testing,' or 'ESBT.'

FIG. 9 is a flow chart representing, as a high-level overview, selected steps that may be taken in connection with a nonexclusive embodiment involving drilling an offshore oil or gas well (also, herein, 'oil well'). One or more oilfield personnel 902, or 'company operator' herein, who may be situated either on an offshore drilling platform 904 or elsewhere, may select a particular event 906 from a menu of event categories to perform in connection with accomplishing a common objective. For instance, a company operator may select 'commence insertion of drilling fluid into well bore' as an event, or task, to be performed. A company operator 902 and/or others may then perform the selected event 908. That is, in the exemplary instance, such company operator (perhaps assisted by others) may begin injecting drilling fluid (such as drilling mud, used in well drilling operations) into the target well bore.

In addition to commencement of the physical operation involved in injecting drilling fluid into the well bore, in the exemplary instance, a company operator 902 or another may also commence certain tests or measurements to monitor progress of the selected event, or task, which has been commenced. For instance, a company operator may initiate one or a plurality of measurements 910 that may be pertinent to the event or task 908 being performed. That is, in addition to an event 908 itself being performed by a company operator or another, another task may also be conducted in conjunction with such event, viz., a measurement or test task 910. In relation to the exemplary event, 'commence insertion of drilling fluid into well bore' 908, such a corresponding measurement or test task may be 'measure flow rate (in kilograms per minute) of drilling fluid being injected into well bore' 910.

In oil field practice, a plurality of events, or tasks, such as the exemplary one just described, is performed on an offshore drilling platform. Most or all of these events have associated with them corresponding measurement or test events, whereby parameters (such as flow rates, pressure, temperature, and electrical conductivity) relating to the underlying physical event and/or to the surroundings of the event or otherwise may be measured, recorded, and evaluated. Thus, data may be collected (by a company operator or another) as a set of discrete event reports 912, wherein the data domain may include both data recording the fact of an event 908 occurring or having occurred, e.g., the fact that the task 'commence insertion of drilling fluid into well bore' has occurred as well as data pertaining to one or a plurality of measurements or tests 910 performed in conjunction with the underlying event. As will be apparent to an artisan of ordinary skill, other nature of data may also be included in the data domain, which supplies data to event reports 912. For instance, data may be recorded, stored, and processed (as further described below), whereby facts such as the time and date of an event's occurrence, the names of company operators engaged in the events, and other relevant information are also stored. Information and data, so recorded, stored, and processed, may be in form of structured data or unstructured data. An example of unstructured data that may be employed in ESBT embodiments is data that may be located within emails via interoperation of an email parsing utility within an ESBT embodiment. For instance, such interoperation of an embodiment with a module operating as an email parser, may reveal the phrase "extreme concern" being used by one or more company operators within a threshold time window. Such parsed, unstructured data may have relevance to SRM operations and control if, by way of example, such data in conjunction with other unstructured or structured data were reasonably to suggest to a skilled operator that imminant danger may be in the offing. As also will be apparent to an artisan of ordinary skill, some measurements and tests 910 may be partly or wholly automated while others may be manually conducted by company operators or others. Further, a plurality of methods may be employed for assembling data pertaining to performance of events 908 and to measurements or tests 910 relating to such events. For instance, some event reports may be maintained by company operators observing and manually recording measurement readings (such as pressure readings or flow rates), while in other instances such measurements may be partly or entirely automated, e.g., by an automated flow meter that both measures and digitally records fluid flow rates. At the completion of the event, an indication that the event has been completed may be made at 914 at which point the system returns to operation 906 and continues to collect data for other events, if any. As is illustrated in this example, the ESBT systems and methods are capable of tracking different types of events as well as the various different types of data that may be associated with the event. As herein described with reference to SCR data types, and for further clarity, data type-3 pertains to data objects associated with SC components (or SCCs). For clarity, it is noted that 'event' as herein used may be, but need not be, taken as synonymous with SCC in application of ESBT embodiments. By way of non-limiting example, the event of 'cease operating rotary drill string system' may be considered as synonymous with the SC component 'rotary drill string system' wherein may be performed, inter alia, the event 'cease operating.' For further clarity, it may be noted that SCR data type-4, which data type is used for data objects describing SCC hosts (also herein referred to as SCC host entities), may refer in ESBT embodiments to classes and instances of data that describe the external, or milieu, environment surrounding a SC component or event. By extension of the preceding, non-limiting example, therefore, an exemplary instance of a SCC host entity, which hosts or otherwise describes in part or in whole, may be a set of data objects that parameterize and specify the event of 'cease operating rotary drill string system' (and that event's instantiated SC component 'rotary drill string system'), for instance, data objects relating to a particular drilling crew associated with the event (e.g., with the SC component) at a particular time or time interval along with other data objects (such as the names and other details of the crew's foreman, assistant foreman, roustabouts and others associated with the particular drilling crew and the particular event/SC component).

The foregoing descriptions, with accompanying FIG. 9, illustrate an instance wherein the data collection and data analysis environment may be considered as occurring in a non-integrated data environment. For instance, the events occurring on an offshore drilling platform, such as those (hypothetically) occurring in August 2009 on Enterprise 'B's Broad View platform leased to ACME Oil Company, may be performed by company operators from more than one company or enterprise. For example, it is common oil industry practice for a designated operator (such as the illustrative ACME Oil Company) to conduct certain operations on an offshore oil rig, including that of overall project management, while other companies may perform specific tasks on a contractor or sub-contractor basis. In the exemplary instance of the ABC well operations in the Gulf of Alaska: ACME Oil Company may be assumed to have had overall responsibility for project management; Enterprise 'B', as owner of the Broad View rig, had certain responsibilities with respect to rig operation; Enterprise 'A' had particular responsibilities concerning well casing cementing operations; and other entities or enterprises had other responsibilities. In such manner, then, a plurality of enterprises may provide a plurality of particular support roles to a general contractor (e.g., to ACME Oil Company), all working together in pursuing a common objective, viz., in the exemplary illustration, the safe completion of the offshore ABC oil well. The ESBT embodiment, therefore, may enable coordination of such a plurality of support roles—both as in relation of each support role to each other support role and as in relation of all support roles to the role(s) of the general contractor. As used herein, such coordination is also referred to as support role management, or SRM.

The general contractor/sub-contractor model of oil field operations, such as just described, often results in a non-integrated data environment, by which herein is meant the following. In a non-integrated data environment, a plurality of enterprises conduct discrete operations, herein referred to as events. (For further clarity, and with reference to the SCR data structure herein described, such events are considered as occurring in SC components, or SCCs, and may be understood as synonymous with SCCs.) As each such event is conducted 908, measurements and tests 910 may also be conducted and discrete event reports 912 generated. Upon completion of a particular event 914 (or in parallel with a particular event), other events may also be conducted. Such other events, in turn, generate other measurements and tests 910 and other event reports 912 containing data particular to each such other event. However, unless steps are taken to ensure that a desired degree of data integration occurs, the general contractor/sub-contractor model of oil field operations may result, and often does, in an inadequate degree of such data integration. A function of an ESBT embodiment is to enable a desired level of data integration, which, as described below, may be provided via the effective coordination of a plurality of support roles, e.g., by support role management, or SRM.

Failure to provide for an adequate degree of data integration—for instance, integration of data pertaining to operations conducted by several parties on an offshore oil rig—may result in the inability of any or all of the general contractor (e.g., ACME Oil Company) and its sub-contractors (e.g., Enterprise 'C,' Enterprise 'B', Enterprise 'A', and others) to be aware of important data patterns occurring, whereby knowledge of such patterns may enable company operators or others to detect dangerous conditions (viz., as may be reflected in data patterns) and then to make appropriate decisions leading to amelioration of such conditions. For instance, incipient dangerous conditions may be signaled in particular data patterns or data sets that relate to a plurality of different operations—e.g., different events handled by different company operators—being conducted on an offshore drilling rig. For example, in the hypothetical instance of the ABC well blowout: i) one sub-contractor (or the general contractor, ACME Oil Company) may have had available to it data indicating an 'inoperable' status of the ABC well's blow-out preventer, or BOP; ii) another party may have had available to it data indicating dangerous in-bore pressure readings and/or trends in such pressure readings, indicating a possible build-up of escaping hydrocarbon fluids or gases; and iii) another party may have had available to it data indicating that certain electronic alarm systems were in an 'off' status. Individually, each particular data set as just described may have been available to particular, exemplary parties concerned with operation of the (hypothetical) Broad View rig on 20 Aug. 2009, as that rig continued its months' long support of the ABC well completion task.

The nature of situation just described—viz., wherein multiple sources of data may be available to a plurality of individual parties with discrete responsibilities within a joint operation, but wherein such data is neither adequately integrated nor made available in an integrated manner to at least one single responsible party—is a nature of problem addressed by the event and sequence back testing, ESBT, embodiment of the SCR system and method.

Figure 10:
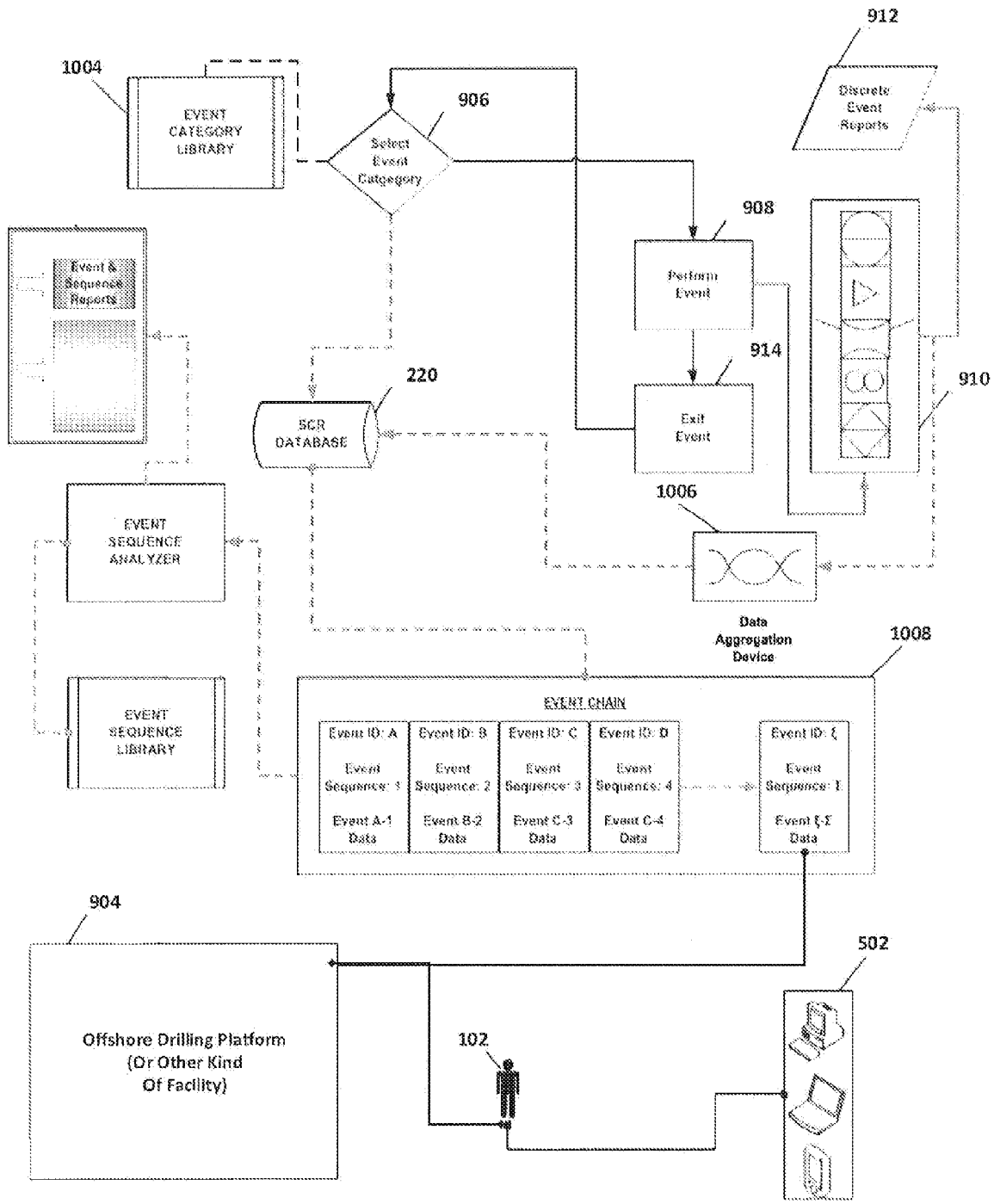
FIG. 10 provides a flow chart that illustrates how, in embodiments, an integrated event and data environment may be formed to aid in integrating data pertaining to a plurality of discrete event occurrences and to milieu, or external, data (as meta data) pertaining to discrete event occurrences.

FIG. 10 provides a flow chart that illustrates how an integrated event and data environment may be formed to aid in integrating data pertaining to a plurality of discrete event occurrences, wherein such data may originate with a plurality of different sources. As earlier described, the exemplary (hypothetical) instance described herein is one where a plurality of enterprises may provide support operations in support of a common objective, e.g., the common objective of accomplishing the safe completion and operation of the ABC well in the Gulf of Alaska.

In FIG. 10, the elements (906, 908, 910, 912, and 914) may be performed as described in FIG. 9, but with the following modifications. A user 102 or another may select an event 906 from an event category library 1004, for instance, from a data file stored in an SCR database 220. In embodiments, upon an event being selected and performed 908 and upon event-related data, including data pertaining to measurements or tests conducted in connection with the event 910, being made available for discrete event reports 912, such data also may be communicated to a data aggregation device 1006. The means by which such data communication occurs may be those as earlier herein described and as illustrated in FIGS. 5 and 6, for instance, via WANs, the world wide web, LANs, or otherwise, whereby a user 102 or another accesses such communication channels via one of a plurality of devices 502 such as a mobile phone, a PDA, or a laptop computer. Data aggregation device 1006 may be any suitable device that is capable of receiving data from a plurality of sources, for instance, from measurement instruments such as may be included in 912. In order to ensure the greatest possible extent of data integration—that is, of data from a plurality of different support functions working in conjunction with an offshore drilling rig 904—all, or as many as feasible, support functions and their corresponding measurement instruments may be connected to a data aggregation device 1006. The data aggregation device may be, for instance, an electronic switch operating in conjunction with a file server whereby data may be received and preprocessed prior to its being transferred to an SCR database 220. A data aggregation device 1006 also may be a computer, server, or other nature of computational device.

The ESBT embodiment may employ an 'objective analytical record, or 'OAR' as herein used, whereby transactions involving a particular objective (e.g., in the exemplary illustration, the common objective of safely completing the ABC oil well) may be aggregated into a data file or files (within a database). The meaning of 'transaction' in this instance is that of the creation, communication, and storage of data that may be generated in connection with performance of a particular event 908. For instance, performance of a set of tasks required for accomplishing the safe completion and operation of the ABC well in the Gulf of Alaska (as the exemplary common objective) may result in creation of a plurality of data concerning both the facts of such tasks, or events, being performed as well as measurement, test, and other data related to such events being performed. An example of the complete construction of an objective analytical record, or OAR, is described below and illustrated with FIG. 11. FIG. 10 illustrates one element 1008 included in an OAR, wherein such element relates to a particular sequence of event-related data, such sequence also herein referred to as an 'event chain,' which corresponds to a particular set of events being performed in a particular sequence.

When a user 102 or another selects an event category 906 from the event category library 1004, as illustrated in FIG. 10, the action of selecting such event may be communicated to an SCR database 220, by means as earlier described and as illustrated in FIGS. 5 and 6. When such event category selection is the first in an anticipated sequence of events, a data file identifier may be assigned for the data file that will be built (progressively, over time), that is, for an event chain 1008. In embodiments, the event chain may be constructed using a DocString identifier to relate the events and data about the events.

Figure 11:
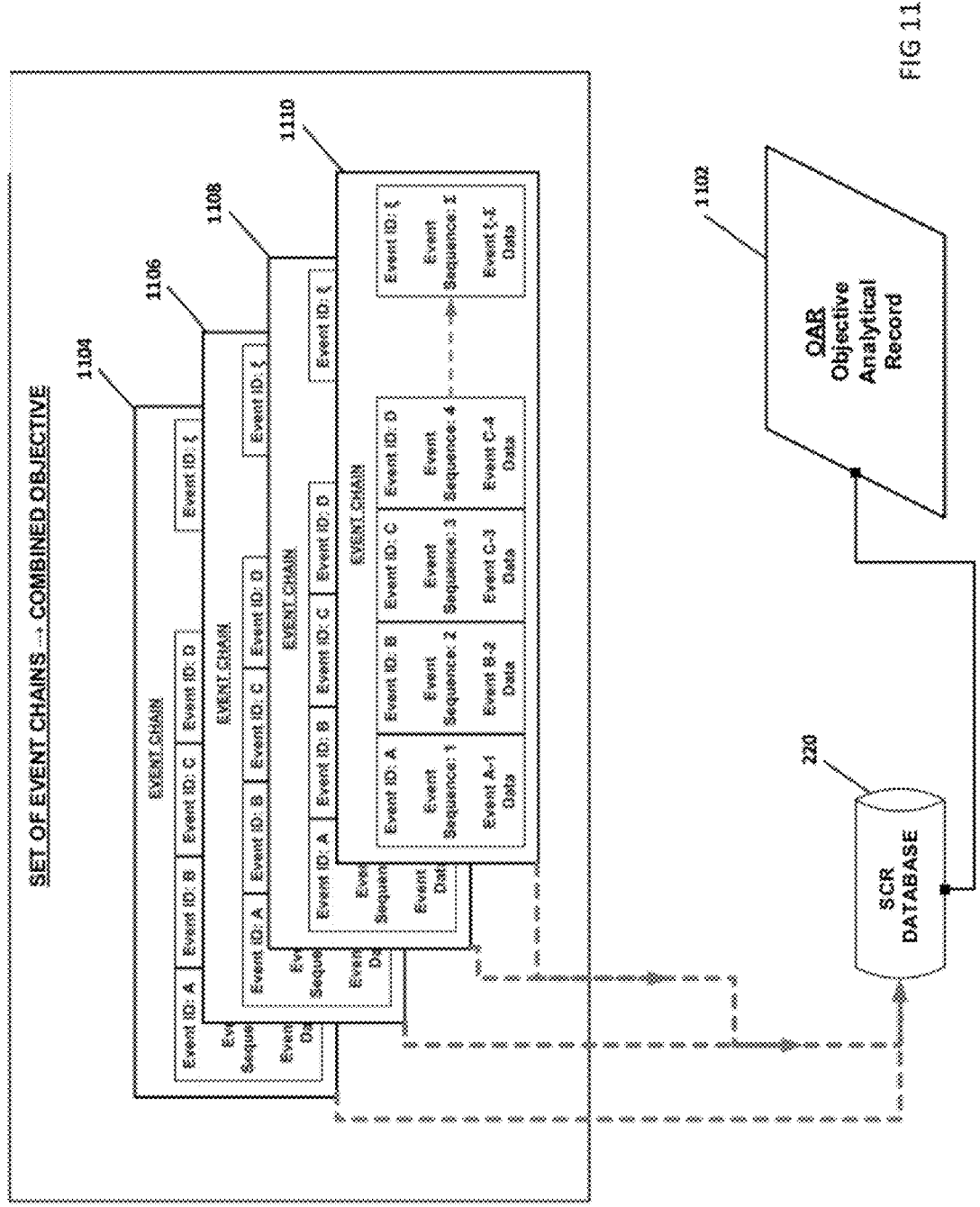
FIG. 11 illustrates elements that may comprise an embodiment of an objective analytical record.

FIG. 11 illustrates elements that may comprise an objective analytical record, or OAR 1102, comprised of one or a plurality of event chains 1104-1110. During the course of operations conducted in support of a common objective—e.g., considering a plurality of events 908 and measurements or tests 910 executed in conjunction with such events, as illustrated in FIG. 10, for the combined objective of accomplishing the safe completion and operation of the ABC well in the Gulf of Alaska—a set of event chains may be created, that is, as a set of data object sets. Each individual event chain may be identified with a unique event identifier, given a unique event sequence identifier, and associated with a plurality of data pertaining to such event. As described above, data pertaining to such event chains may be received by an SCR database 220 and, collectively, formed into an objective analytical record, or OAR 1102. As will be apparent to an artisan of ordinary skill, considerations regarding data processing speed, database system selection, project scope and scale, and other factors may influence whether a system designer or another may design a database file structure with only one OAR for the entire project, with a small number of OARs, or with many OARs. A large industrial operation such as drilling, completing, and operating an offshore oil well may employ a plurality of OARs, whereby, for instance, one OAR is created for each set of events or tasks conducted by each particular support enterprise. Thus, in the exemplary instance of drilling the ABC well, one OAR may be created for ACME Oil Company (as the general contractor), one each for Enterprises 'A,' 'B,' and 'C,' and other OARs for other such support enterprises.

Referring both to FIGS. 10 and 11, once event chains and objective analytical records, or OARs 1102, have been created and are stored in an SCR database 220, it then may be possible to: process those event chains and OARs within an event sequence analyzer (or ESA); make comparisons of actual data sequences with pre-defined, benchmark data sequences stored in an event sequence library (or ESL); and to generate event and sequence reports, as later described.

Figure 12:
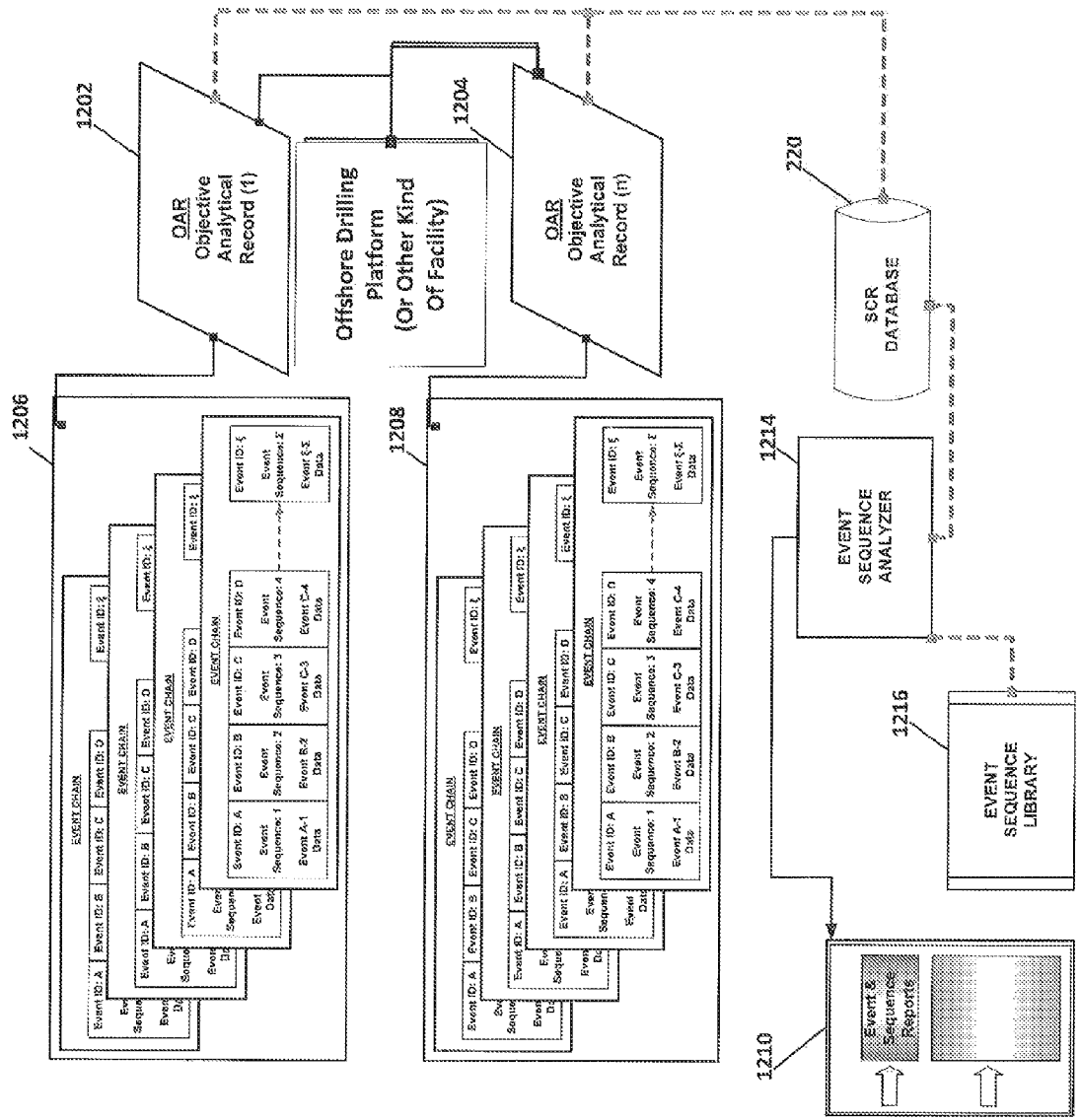
FIG. 12 illustrates elements within an ESBT embodiment that operates on objective analytical records.

FIG. 12 illustrates elements within an ESBT embodiment that operate on objective analytical records, or OARs 1202 and 1204, thereby generating event and sequence reports 1206 that may be used by system users and others in making decisions concerning operation of a complex industrial system such as that herein described for the exemplary instance of drilling an offshore oil well.

An SCR database 220 may receive a plurality of data pertaining to particular operations and sequences of those operations 1206 and 1208, whereby such data may be organized into one or a plurality of OARs 1202 and 1204. For instance, FIG. 12 illustrates data pertaining to a total of (n)-count of OARs being received by, and stored in, an SCR database.

Referring also to FIG. 6, a data analysis module 510 within an ESBT embodiment may contain a form of data analysis tool, herein, referred to as an event sequence analyzer (ESA). Similarly, the data analysis module may also contain an event sequence library (ESL). Alternatively, an ESA or an ESL may be contained within an SCR database or elsewhere in another location that is accessible to system users.

The event sequence analyzer, ESA, may include one or a plurality of algorithms that may be used in analyzing data sequences, sorting algorithms, association algorithms, or other nature of algorithms used in data mining and statistical operations, as further below described. The SCR data analysis module, including an ESA, may process data contained in any or all OARs and make comparisons of data sequences contained in such OARs with pre-defined, benchmark data sequences included in an ESL 1216, as shown in FIG. 12. Event and sequence reports 1210 may be generated from data computed in an ESA 1214. Such reports may be employed in making real time decisions, for instance, in deciding to terminate a particular sequence of events being performed on an offshore drilling rig if warnings of adverse conditions are displayed in such reports, for instance, as may be displayed by warning flags that may be generated pursuant to particular logic rules included in an ESA 1214. Operation of the event sequence analyzer, or ESA 1214, in tandem with other elements included in an ESBT embodiment, are described next with reference to exemplary data that may be of interest to operators of an offshore oil platform, such as the Enterprise 'B'-owned (and ACME Oil Company operated) Broad View platform that capsized in the Gulf of Alaska in August 2009; all references to such described incident are hypothetical and for illustration purposes.

Figure 13:
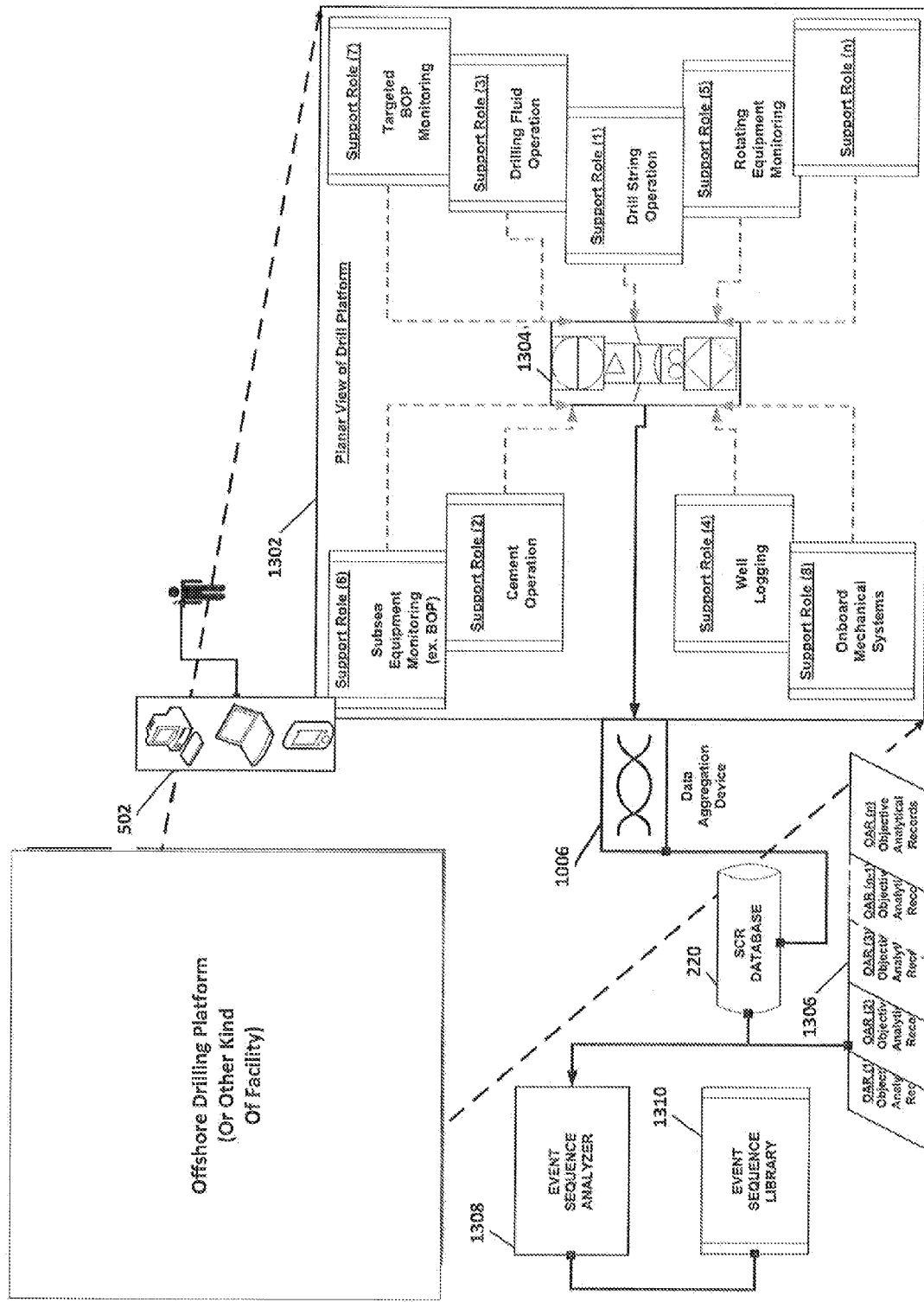
FIG. 13 provides a block diagram illustrating an example embodiment of elements that represent selected operations that may be performed in an example ESBT embodiment.

FIG. 13 provides a block diagram illustrating, in a planar view 1302, elements that represent selected operations that may be included within the scope of tasks conducted on an offshore oil drilling platform or rig. For instance, most of the operations or tasks illustratively included in the planer view 1302 may be assumed to be performed on the (hypothetical) Broad View drilling platform either on or before the day (hypothetically, 20 Aug. 2009) on which that platform capsized and sank to the seabed floor in the Gulf of Alaska. As used herein, in the context of the ESBT embodiment, such operations or tasks are referred to as 'events.' Events such as those illustrated in planar view 1302 are the entities that may be tracked and evaluated by application of an ESBT embodiment of the SCR system and method, and as such, events may be understood to mean the actions, activities, processes and the like that take place in the corresponding SC component (SCC) entity with which an event is associated and for which the SCR data type-3 is employed.

Included in the illustrative planar view 1302 in FIG. 13 are events, or tasks, commonly performed in conjunction with drilling and completing an offshore oil well such as the hypothetical ABC well in the Gulf of Alaska. For instance, as shown in FIG. 13, events—as support roles in support of the combined objective of "accomplishing the safe completion and operation of the ABC well in the Gulf of Alaska"—may include: i) operation of a drill string, comprised of connected sections of steel pipe, typically each about 30 feet in length, and with powered rotary equipment driving the string; ii) cementing operations, which are performed as one part of oil well completion procedures; iii) drilling fluid operations, which are performed in connection with drilling the oil well's bore hole and maintaining safe down-hole pressure inside the well bore; iv) well logging operations, such as geophysical logging whereby measurements are made by logging instruments lowered into the well's bore hole; v) monitoring of rotating equipment performance for equipment such as a drill string, drill collar, and drill bit; vi) subsea equipment monitoring, e.g., monitoring of robot movements and position; vii) specifically targeted monitoring of a subsea-positioned blowout preventer, or BOP, which is employed to prevent a blowout, which may be caused, for instance, by excessive pressure within a bore hole; viii) operation, maintenance, and monitoring of onboard (e.g., on-platform, above sea level) mechanical systems; and ix) a plurality, (n)-count, of other operations, or support roles, involved in drilling and completing an offshore oil well. Each such event (or task) may be a particular element, such as that shown in the 'perform event' element 908 in FIG. 9; each such event may function in support of a particular 'combined objective,' e.g., in the exemplary instance, the safe completion and operation of the hypothetical ABC well; and each such event may be represented, inter alia, by a system user or another as an entity in a database.

A frequent situation encountered in oil well drilling operations, both for offshore and onshore wells, is the participation of a plurality of different enterprises, each playing one or more particular roles toward a common objective (e.g., the common objective of safely drilling and completing a particular oil well). As described earlier and illustrated in FIG. 13, such particular roles can be highly specialized. For instance, well logging operations are significantly different in nature from drill string operation and rotating equipment maintenance. However, such disparate operations may all share a common objective, for instance, the safe drilling and completion of the oil well. It is common in oil industry practice for one enterprise to function as a general contractor—also referred to as the 'operator'—of the oil field operations wherein a well may be drilled. For instance, ACME Oil Company may be assumed to be the operator of record for the ABC field and well at the time of the (hypothetical) explosion at, and capsizing of, the Broad View rig in the Gulf of Alaska.

A data collection, analysis, and retrieval problem often occurs in connection with oil well drilling and completion operations. Such problem is rooted in the decentralized manner in which oil drilling and completion operations are normally conducted. Specifically, such problem arises due to a plurality of factors, for instance, those including situations whereby: i) different roles, or functions, are typically conducted by different enterprises, each staffed by their own personnel; ii) different (spoken and written) languages often may be in use on a drilling platform on any given day or night; iii) specialized instrumentation equipment typically may be owned and operated by the particular enterprise performing particular tasks or duties, which may be monitored by such equipment; iv) data results of the plurality of different measurements, tests, and other nature of evaluations being performed during the course of drilling and completing an oil well may remain, to varying degrees, significantly localized and decentralized (e.g., remain in the hands of each particular support role enterprise) rather than being centralized, or otherwise shared in some manner, and made accessible to all responsible parties in a coordinated manner; v) and other such factors.

The present system and methods of embodiments herein described are structured to address the nature of data problem, as just described, whereby a plurality of discrete operations, or events, are performed by a plurality of different enterprises (typically, enterprises that may be commonly related to each other only with reference to a general contractor, or field operator, who contracts individually with each different enterprise). As illustrated in FIG. 13, an ESBT embodiment addresses this nature of data problem by enabling the aggregation of both critical and non-critical data at one or a few data aggregation points 1304, followed by assembly of objective analytical records, or OARs 1306, that may be created and stored in an SCR database 220, followed by data analysis of such OARs within an event sequence analyzer (ESA) 1308 (and including comparisons of actual, or planned, event sequences to benchmark sequences contained in an event sequence library (ESL) 1310) contained in an SCR data analysis module as such module 510 as shown in FIGS. 5 and 6. This set of capabilities (of the ESBT embodiment) is further described below.

Referring both to FIG. 13 and FIG. 9, a plurality of discrete events (e.g., in support of oil field operations), such as those illustrated for support roles no. 1 through no. (n) on an oil drilling platform, may each individually occur with each such discrete event generating data via data measurement devices, both with respect to execution of an event task itself (e.g., with respect to commencement and cessation of the event task) and to particular measurements made in connection with such event execution. Relating to each particular event performance, such data as measured (or otherwise compiled) typically may be routed, as discrete event reports, to parties authorized to access such event-specific data. For instance, condition-status (e.g., 'state') data pertaining to operability of a blowout preventer, BOP—illustrated as support role no. '7' in the drilling platform planar view 1302 in FIG. 13—may be communicated to personnel within the general contractor enterprise (e.g., ACME Oil Company) and also to personnel within the enterprise performing the corresponding event, or task, whereby the BOP's operational status is, or may be, monitored. However, such critically important information—e.g., data indicating whether or not the BOP has recently been tested or measured and found to be either in 'working' or 'not working' status—may not be communicated to other personnel. For instance, if such test were performed at support role no. '7' ('targeted BOP monitoring') with observed result of status 'not working,' but data from such BOP test not communicated, for instance, to support role no. '2,' (cement operation'), then the latter support role may commence or proceed with its well cementing operations without current knowledge of the operability status of the BOP. Further, if such hypothetical sequence of events, as just described, also had been accompanied by another (hypothetical) event measurement such that 'dangerous in-bore pressure, above 3,500 psi' had been indicated, then one party with access to all three data objects—viz, i) BOP status, 'not working;' ii) cement operations, 'commence;' and iii) 'dangerous in-bore pressure, above 3,500 psi'—would have been in position to observe that well cementing was commencing while in-bore pressure was at dangerous level and with the blowout preventer, BOP, not in working status.

As illustrated in FIGS. 13 and 6, a system user of the ESBT embodiment may communicate via a plurality of client interface devices 502—for instance, via a hand-held PDA, mobile phone, or similar communications device—with an SCR database 220. SCR database 220 may receive data from a data aggregation device 1006, for instance, from a device such as a dedicated file server that receives and stores raw data from a plurality of sources located on an offshore drilling platform.

Data generated by particular support roles, in conjunction with particular event executions (shown as 908 in FIG. 9) by those support roles, may be routed from a measurement device in at least two distinct manners: i) to particular support role personnel and others via discrete event reports (shown as 912 in FIG. 9); and ii) also to a data aggregation device (shown as 1006 in FIG. 10). Thus, such data aggregation device 1006, e.g., a dedicated file server, may enable collection of data at a common point for data generated by a plurality of decentralized data-generating enterprises such as the plurality of (n)-count of support roles functioning on offshore platform. In such manner, thus, discrete, decentralized support roles may continue to route their data as currently done in a decentralized manner, e.g., the first of the two routes just described, and they may also route their data (contemporaneously or otherwise) to a data aggregation device 1006 that may be included in an embodiment. SCR database 220 may receive raw data from data aggregation device 1006 and, therefrom, manipulate data in order to create event chain files (shown as 1104 in FIG. 11) and objective analytical records, OARs (shown as 1102 in FIG. 11), and may store such OARs in appropriate data files, or tables, within the database. Each discrete OAR, for instance an OAR pertaining to each particular support role, may be structured from discrete sequential event chains (1104, as illustrated in FIG. 11). A particular OAR may be comprised of one or a plurality of such discrete sequential event chains. As illustrated both in FIG. 12 and FIG. 13, OARs 1202, 1204 in FIGS. 12 and 1306 in FIG. 13 may be communicated from an SCR database 220 to an event sequence analyzer, ESA 1214 or 1308, which may be contained in an SCR data analysis module shown as 510 in FIGS. 5 and 6. For instance, transfer of OAR data files from the database 220 to the ESA 1308 may occur in real time, and such transfer may also be initiated by a system user's (2) or another's query request submitted via a client interface 502 to either or both of the SCR database 220 or to the ESA 1308. Next is described exemplary data input that may be received by an SCR database 220 via a data aggregation device 1006 and forwarded to an ESA 1308 for processing against one or a plurality of benchmark event sequence libraries 1310.

Figure 14:
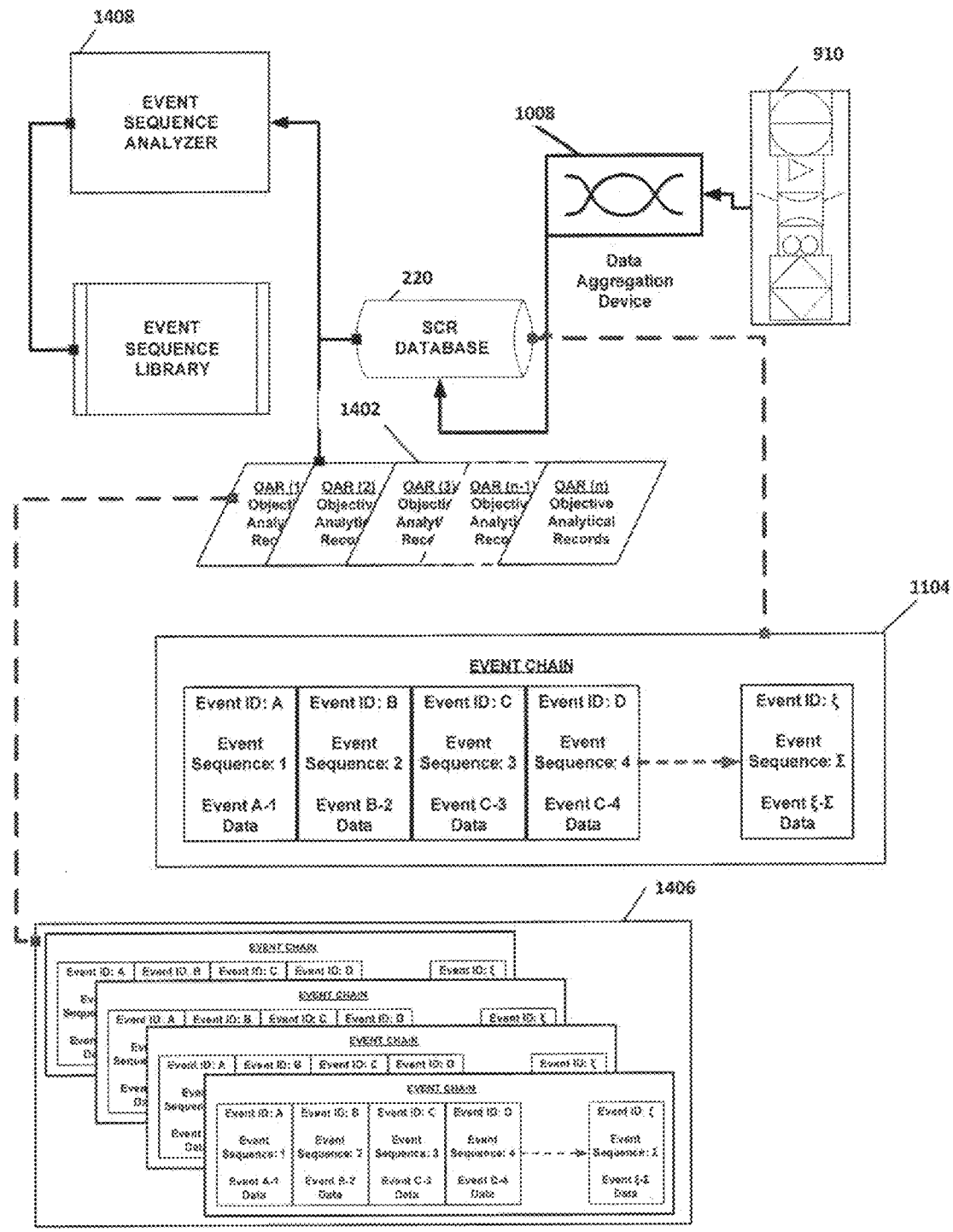
FIG. 14 illustrates an embodiment of a data flow whereby data comprising sequential chains are organized and placed into objective analytical records.

FIG. 14 illustrates a conceptual data flow, whereby data comprising sequential event chains (also, herein referred to as 'event chains') are organized and placed into objective analytical records, or OARs. Upon data being received by a data aggregation device 1008 from one or a plurality of measurement and other devices 910, such data may be communicated to an SCR database 220. As described further below, such data may include: i) data pertaining to the status of an event, also herein referred to as 'status data;' ii) data pertaining to event-related performance actions such as measurements and tests, also herein referred to as 'transactional data;' and iii) any other nature of data that system users or others may wish to capture and analyze.

As also shown in FIG. 14, data received by an SCR database 220, as described above, may be organized into event chain files 1104, whereby each particular such file may pertain to a series of events that occur and are executed by a particular support role (e.g., by a particular enterprise) and, further, whereby such series may be ordered with respect to data/time and/or in other manners. An objective analytical record, OAR, may be created (within the SCR database 220) as an array of a plurality of event chain files 1104 where each such file relates to a particular support role (enterprise). A plurality of OARs (1406) may then be organized into an array of OARs 1406.

The following illustrative example is provided to demonstrate the nature of data objects formed and stored in an SCR database that operates in an ESBT embodiment: i) support role (or enterprise) 'A' may execute a series of events; for instance, Weatherford International Ltd. may execute a series of events, or operations, pertaining to its drilling fluid systems, whereby 'A' also declares pertinent data (and/or such data generation may be automated), which is received by a data aggregation device 1008; ii) such data may be communicated to, and received by, an SCR database 220, wherein a temporally-ordered series of data is created as an event chain file 1104, for instance an event chain file pertaining to support role A's event executions in a particular 24-hour period; iii) such event chain file for A's event executions in such particular time period may be included in a digital array 1406, whereby a plurality of such event chain files pertaining to A's event executions during a longer time period (e.g., 30 successive 24-hour periods) is formed in database 220 as one objective analytical record, OAR, containing such array of event chain files, pertaining to A's event executions over a particular time period; and iv) a set, or array, of such OARs 1406 may be created in the database, wherein each particular OAR pertains to a particular support role such as support role 'A.'

For instance, OAR no. '1' in array 1402 in FIG. 14 may pertain to support role (enterprise) 'A,' and OAR no. 'n' in array 1402 may pertain to support role 'N.' Thus, in aggregate, the array of OARs—each OAR being created as described above and each OAR pertaining to one particular support role (enterprise)—may represent a data set (contained in an SCR database), comprised of one OAR for each particular support role and for particular time periods, whereby such array in aggregate includes data pertaining to a plurality of support roles' (e.g., enterprises') support provided toward execution of an overall, common objective. As earlier described, the exemplary instance of such common objective used herein is that pertaining to drilling and completion of an offshore oil well, whereby such common objective may be described as: 'the safe completion of the ABC well, located 50 miles offshore Alaska in deep waters of the Gulf of Alaska.' With such common objective, as described, a plurality of support roles (enterprises) may be engaged in roles supporting the common objective. For instance, such common objective in this exemplary instance may be that articulated by ACME Oil Company, as designated operator of the ABC oil field, and a plurality of support roles (enterprises) may include those such as: Enterprise 'B', providing support in roles such as drilling, evaluation, and well completion; Enterprise 'A', providing support in well cementing operations; Enterprise 'C' Limited, providing well logging support; and other support roles providing other nature of support to the exemplary common objective as framed by ACME Oil Company.

Figure 15:
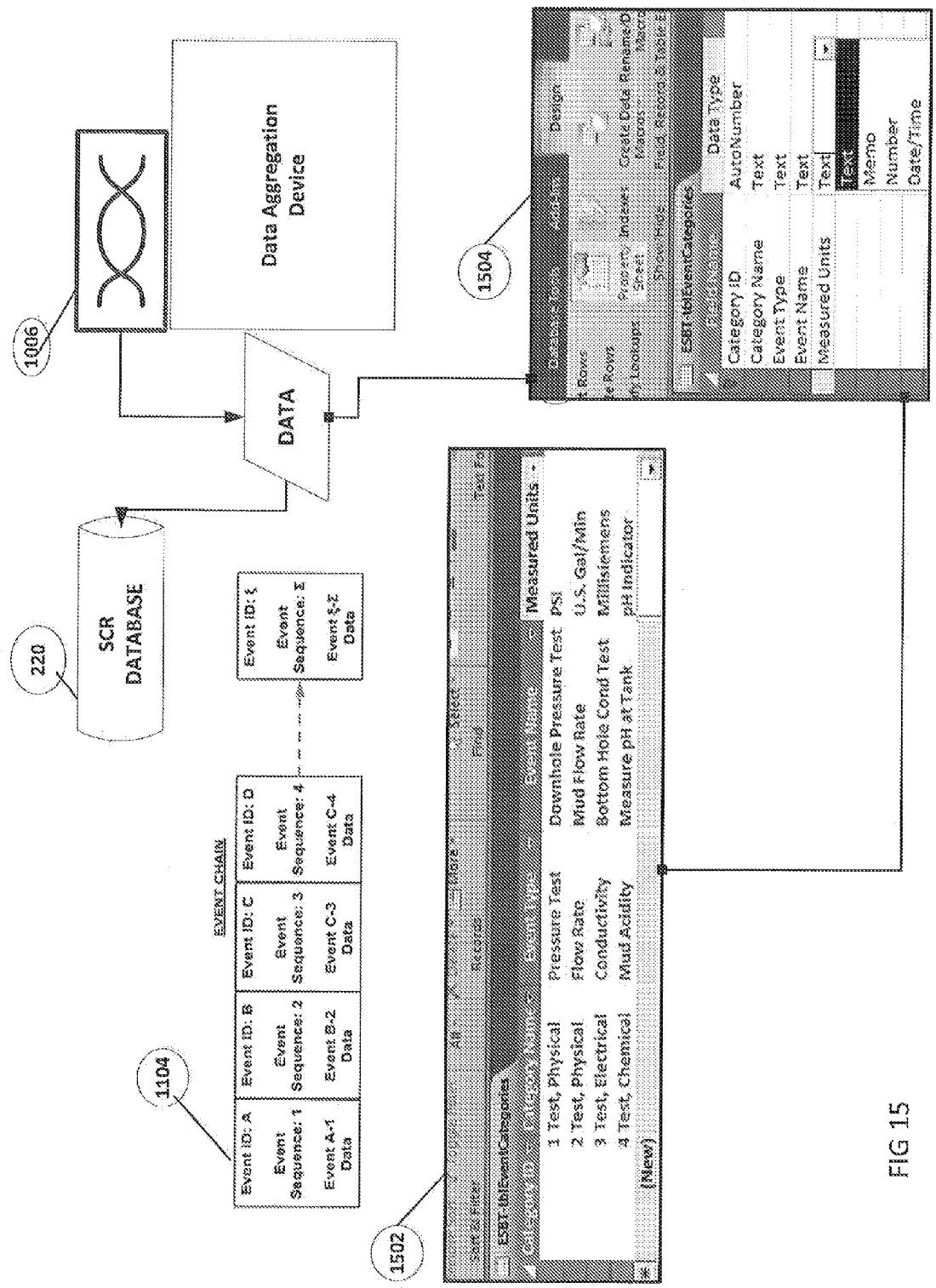
FIG. 15 shows an exemplary instance of a database table that may be employed with embodiments disclosed herein.

FIG. 15 shows an exemplary instance of a database table 1502, such as may be created by system users or others by using a database management system (e.g., Microsoft SQL Server 2008 or Microsoft Access 2010), whereby data received by a data aggregation device 1006 and communicated to an SCR database 220 may be organized (within the database) in an event chain file 1104 for a particular support role's (e.g., enterprise's) event executions. Element 1504 illustrates a structural view of a particular data table, specifically, for table 1502, 'ESBT-tblEventCategories.' For instance, such table provides a list of event categories such as may be provided by ACME Oil Company as the general contractor and operator of the ABC oil field and as may be used by a plurality of support roles in connection with generating data for their respective roles in support of ACME Oil's common objective.

Figure 16:
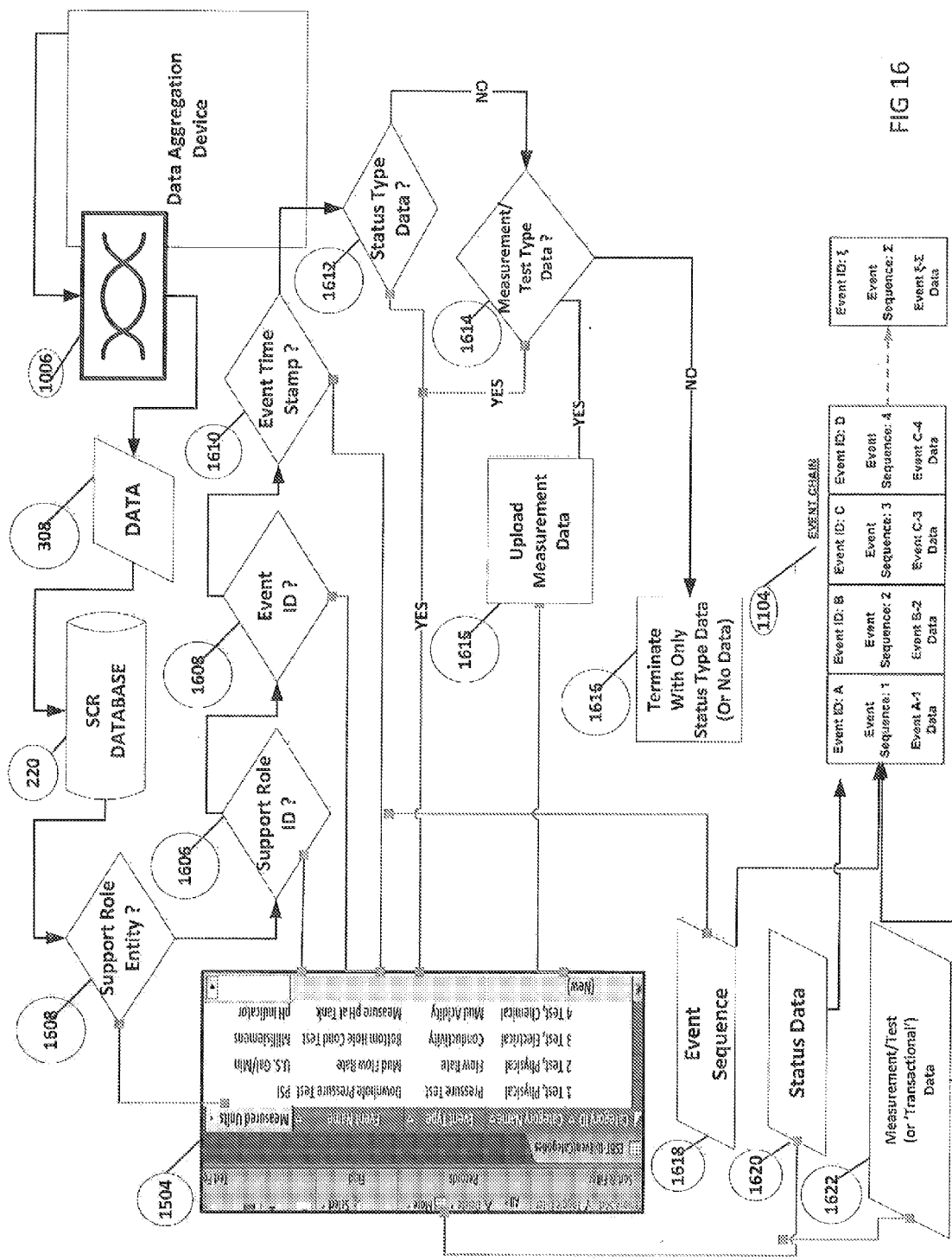
FIG. 16 includes a flow chart showing an embodiment of tests that may be executed in determining data flows for data that are received by an SCR database.

FIG. 16 includes a flow chart showing logic tests that may be executed in determining data flows for data 1602 (as may be generated by a plurality of support roles) that are received by an SCR database 220 from a data aggregation device 1006. Exemplary data table 1504 illustrates a database table structure such as may be employed for receiving, storing and displaying such multi-dimensional data. Following is described a set of exemplary logic tests, whereby data aggregated at data aggregation device 1006 may be organized into sequential event chains such as 1104, stored in the database 220, and made available for subsequent data analysis in an event sequence analyzer, ESA 1408, as shown in FIG. 14. As will be apparent to an artisan of ordinary skill, logic tests (and logic test ordering) other than those illustrated in FIG. 16 may be employed, whereby data flowing from element 1006 may be organized into a sequential event chain in the form of element 1104.

First at operation 1604, a name of the particular support role entity (e.g., Enterprise 'A') may be recorded into an appropriate data table such as exemplary table 1504. Next at operation 1606, a particular support role identity may be placed in the data table. Next at operation 1608, a particular event ID may be placed in the data table, followed by an event time stamp 1610, which records date and time data for the particular event. Logic test 1612 queries whether data being organized and stored in the data table is 'status' type data, e.g., data (e.g., as binary Yes/No) that may signify that a particular event has commenced in time or has been completed. If 'No' then the flow proceeds to test 1614. If 'Yes' then the value of the 'status' attribute is stored in the data table and flow continues to operation 1614. Next at operation 1614, a query may be performed to determine whether the data set 1602 includes measurement, or test type data, which herein is also referred to as 'transactional data.' If 'No' to test 1614, then the flow terminates at 1616. If 'Yes' 1614, then flow continues to upload operation 1615 and the transactional data may be stored in the data table. Upon completion of these logic tests, as illustrated in FIG. 16, one or a plurality of data tables, such as table 1504 may contain: i) event sequence data 1618, which may indicate the rank order sequence in which each particular event is executed; ii) status data 1620, which may indicate a status attribute of an event, such as 'event commenced' or 'event terminated;' and iii) measurement data 1622, also herein referred to as 'transactional data,' which pertains to attributes such as test or measurement observations performed in connection with event execution (such as "1,000 psi" as a pressure measurement taken at a particular location and time). Data pertaining to these three data types (1618, 1620, 1622) are stored in one or a plurality of data tables such as 1504 in an SCR database and, collectively, may be conceptually represented by a sequential event chain 1104.

Figure 17:
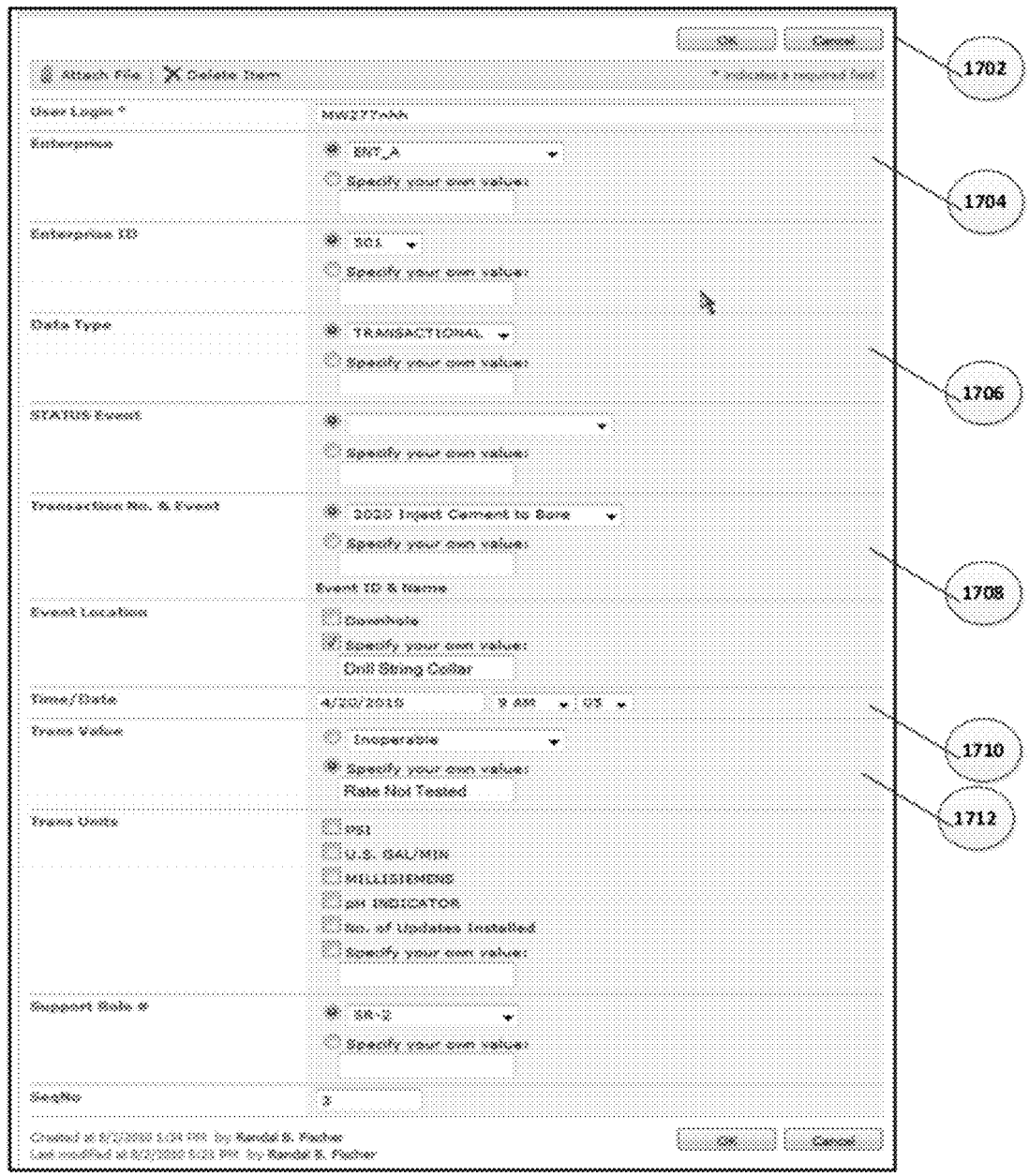
FIG. 17 is a screenshot of an embodiment of a data input form that may be used in an ESBT embodiment.
Figure 18:
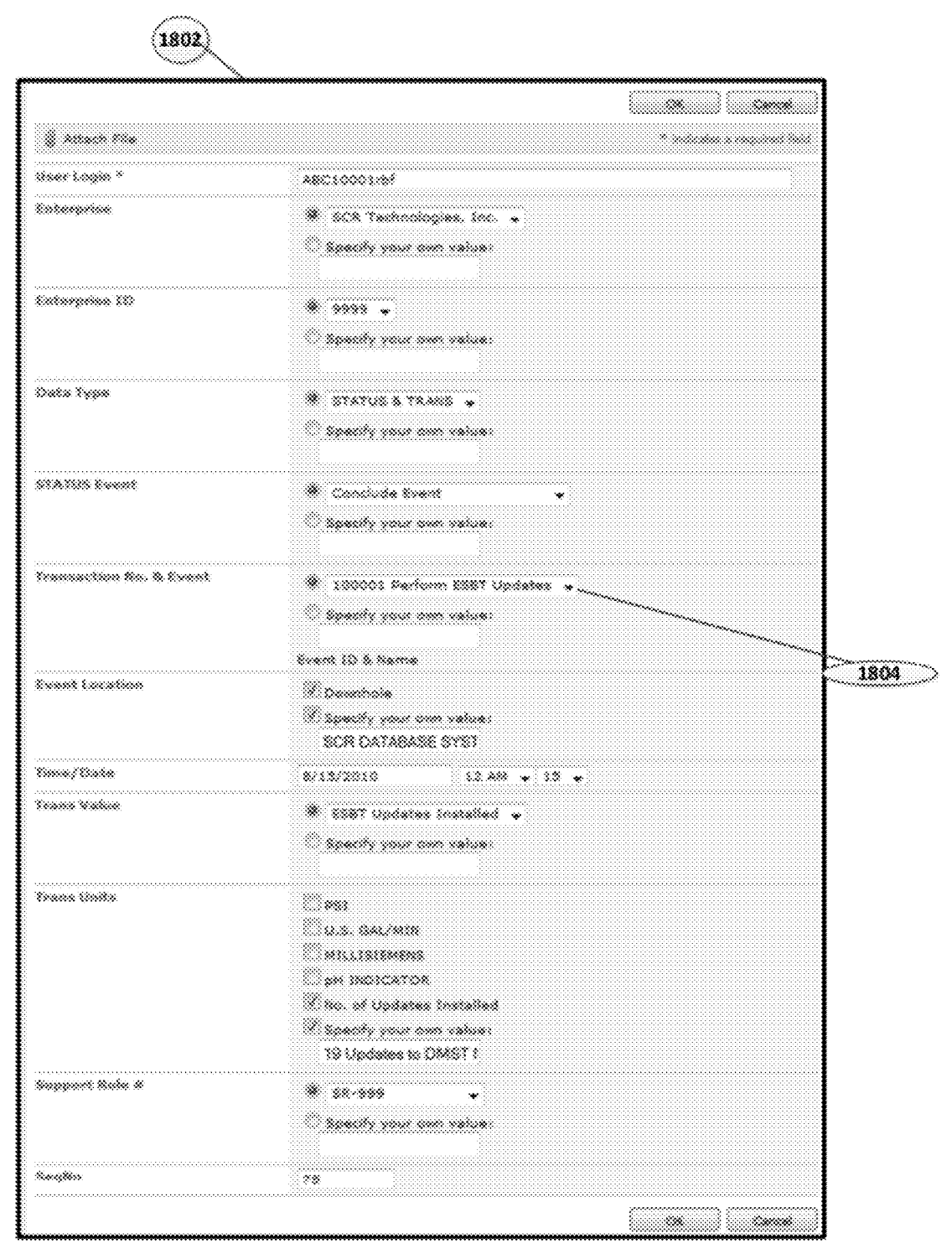

FIG. 17 is a screen shot of a data input form 1702 such as may be used by system users of an ESBT embodiment. This exemplary data input form, for instance, was created to enable a Microsoft SharePoint server to receive data, acting as one instance of a data aggregation device 1006 as shown in FIG. 13. Through use of such exemplary instance of data input form by system users, an SCR database 220 may receive data—via such data aggregation device 1006—for instance, data pertaining to industrial processes taking place in connection with the exemplary instance of ACME Oil's ABC oil well project. Exemplary data input categories, such as those shown in data form 1702 in FIG. 17, may include: an enterprise name 1704 and enterprise ID number, for instance as may pertain to particular support roles provided in support of the exemplary ACME Oil ABC well drilling and completion objective; a data type 1706, whereby may be indicated, for instance, data types such as 'transactional' and 'status,' as these pertain to event types; a transaction number and event name 1708; a data/time field 1710; a field for a transaction value 1712; and other data fields. Upon completing a data entry form such as form 1702, a system user may select 'OK' and, thereby, submit data to an SCR database 220 via a data aggregation device 1006, such as a Microsoft SharePoint server or other appropriate device; alternatively, the system user may select 'cancel' if, for instance, the user determined that particular data already entered into the exemplary form 1702 were possibly incorrect or needed verification. FIG. 18 is a screen shot of a data entry form 1802 that enables an SCR database to receive data (as may be declared by a system user or another), wherein the nature of data so received may include both event sequence data as well as event transaction data, for instance, transaction data such as that shown in element 1804 in data entry form 1802. Application of data entry forms, which may be used to enable an SCR database to receive both status data and transaction data, is further described below in a later section of this document.

Figure 19:
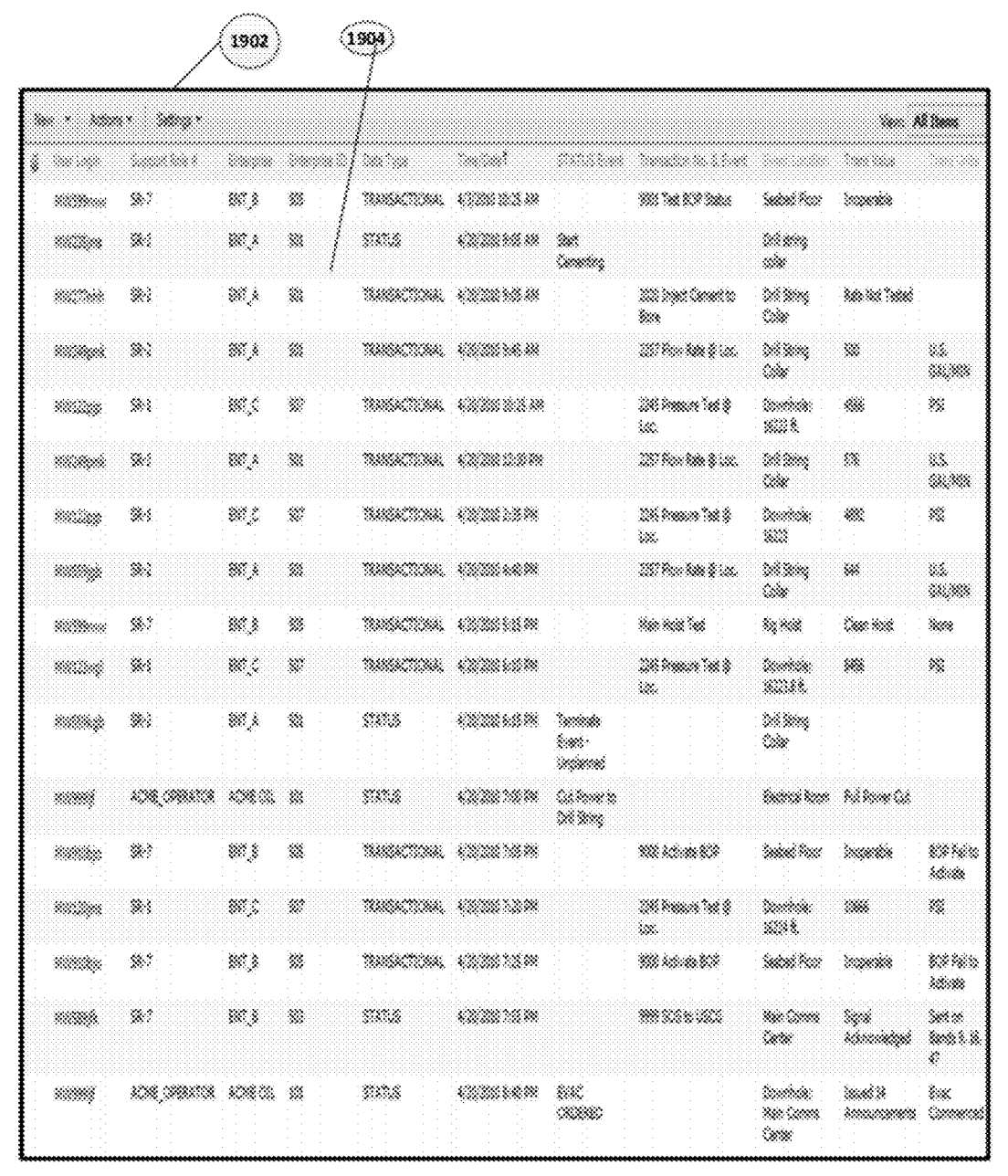

FIG. 19 is a screenshot of a user interface 1902 whereby is displayed exemplary data for a plurality of industrial events, as such events may be received by an SCR database (shown as element 220 in FIGS. 15, 16) via a data aggregation device 1006 and stored in database tables such as those illustrated in tables (1502 and 1504) in FIG. 15. User interface 1902, for instance, is exemplary of an interface that may be created by system users employing Microsoft SharePoint 2008 as may be run on a SharePoint server acting as a data aggregation device 1006 as shown in FIGS. 15, 16. User interfaces and data aggregation devices other than these may also be employed in constructing and operating an ESBT embodiment.

Event instance 1904 in FIG. 19 represents one exemplary instance of an industrial event, for instance, an event executed in conjunction with the exemplary application of an ESBT embodiment for the hypothetical ACME Oil ABC well project. Event instance 1904, as displayed with other such events in the data output table, corresponds to that shown in data entry form 1702 in FIG. 17. A chronological series of such events is illustrated in output table 1902, whereby each event instance is displayed in one row of the output table and all exemplary event instances are ordered in this table in chronological rank. For clarity, related data exhibited in exemplary output table 1902 may be other data, not shown in the table, pertaining to events and the like that may have occurred in time prior to or after the time window shown in the table. As will be apparent to one of skill, system users may request, and an SCR embodiment may enable delivery of, data in such data tables or otherwise pertaining to any time interval in which a sequence of events may have been executed. A benefit of embodiments is that of their capacity to articulate particular data in varying degrees of granularity and for varying time intervals. For example, a particular set of conditions or circumstances relating to an industrial operation such as oil well drilling may suggest a relatively macro-view, say over a 30-day period, of events, event sequences and particular (or all) data associated with the events and event sequences. Such macro-view of data, over a relatively longer time period may be of interest to managers, operators or others in understanding particular trends of performance or other operating parameters. Similarly, relatively micro-views of data may be of particular interest to system users and others at other times. For instance, an operating shift foreman on an oil drilling platform may wish to view event data and event-sequence data pertaining to a recent 24-hour period and in 5-minute time segments.

Figure 20:
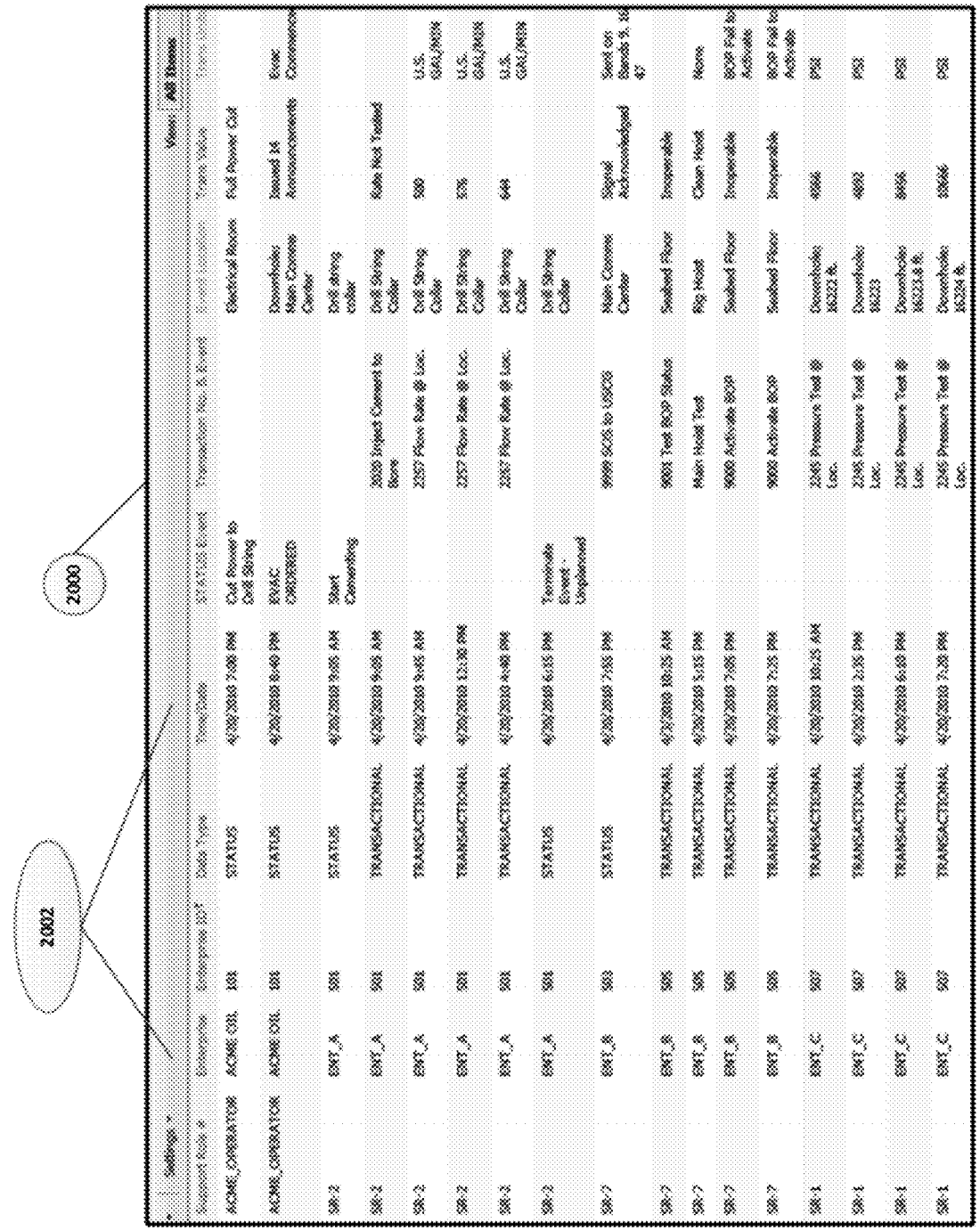
FIG. 20 is a screenshot of another embodiment of a data output view that may be produced by the systems and methods disclosed herein.

FIG. 20 is a screen shot of another data output view 2000, whereby the same exemplary event instances shown in FIG. 19 have been ordered in columns 2002, first by enterprise and support role and then by date/time. Event information such as that shown in view 2000 is representative of a decentralized, non-integrated structure of data management (as also illustrated in FIG. 13) whereby, for instance, the support role no. 'SR-2' (for instance, Enterprise 'A') may only view data that has been generated within its own operational systems and, similarly, the support role no. 'SR-1' (for instance, Enterprise 'C') may likewise only view its own operationally-related data. The importance of this distinction—that is, the difference between operational and other data output being accessible to only one support role (such as SR-1 or SR-2) rather than to a plurality of support roles or parties—is described next.

Figure 21:
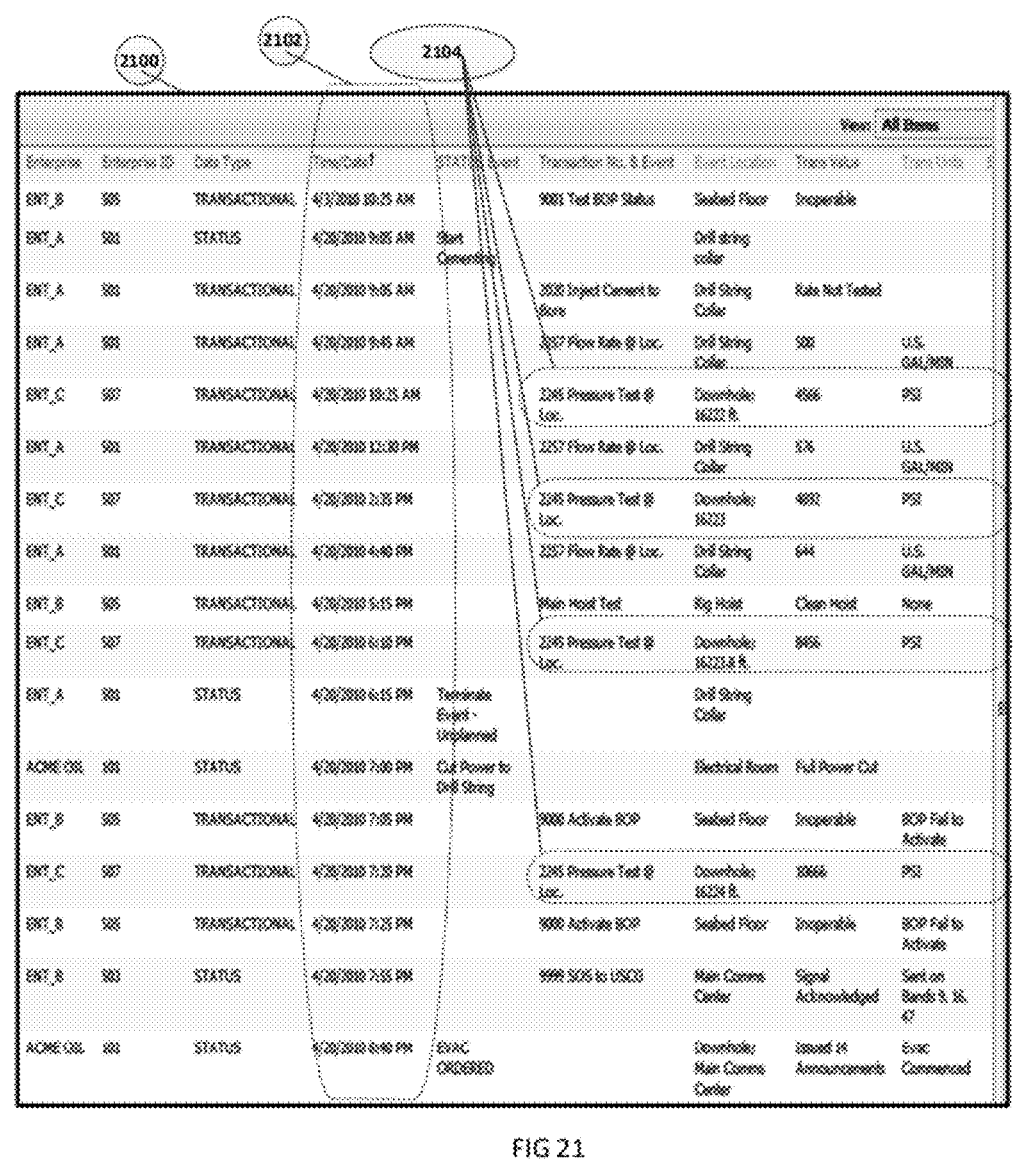

FIG. 21 is similar to FIG. 19, but with particular emphasis placed on event sequence and event-related data for events executed by a plurality of support roles (e.g., enterprises). Data output view 2100 in FIG. 21 is another screen shot showing exemplary data such as (hypothetically) may have been generated during the course of operations in August 2009, leading up to the (hypothetical) tragic explosion of the Broad View offshore drilling rig, loss of human lives, and much consequential damage. Data in column 2102 show the date/time stamps for 17 selected (and hypothetical) industrial events performed by the enterprises Enterprise 'B', Enterprise 'A', and Enterprise 'C', each performing designated support roles for the enterprise ACME Oil Company, which acted as general contractor and field operator for the ABC oil well drilling and completion project. All events but for the first event (hypothetically) were performed during the day of 20 Aug. 2009 at times ranging from 9:05 a.m. until 8:40 p.m. Shortly after this last event time, the Broad View drilling platform, owned by Enterprise 'B' and contracted to ACME Oil Company, was (hypothetically) engulfed in a series of gas- and oil-fueled explosions, resulting in destruction of the rig and loss of four human lives. Hypothetical events prior to those listed for 20 Aug. 2009 have been filtered out, but for the event instance shown in row no. 1 of data output view 2100.

As shown in row no. 1, (hypothetically) the enterprise Enterprise 'B', which owned the Broad View rig, is shown to have executed a transaction event, '9001 test BOP status,' that is, it executed a test to determine the operating status of the blowout preventer situated on the seabed floor of in the Gulf of Alaska. As indicated in the 'transaction value' column (second from last in the table), the outcome of the BOP operability test (as, hypothetically, performed by Enterprise 'B') is indicated as 'inoperable,' suggesting that the BOP was not in an operable condition. For illustrative purposes, it is assumed that between the date/time of the BOP operability test on 4 Aug. 2009 and the day of 20 Aug. 2009, no further BOP operability tests were undertaken—or, if undertaken, were not reported into the data systems of the hypothetical ESBT embodiment for the ABC oil well project.

A series 2104 of four (hypothetical) downhole pressure tests is also illustrated in exemplary data view 2100. These tests started at 10:25 a.m. on 20 Aug. 2009 and concluded with the fourth test at 7:20 p.m. Of critical interest in this series of hypothetical downhole pressure tests—all conducted (hypothetically) by the support role enterprise, Enterprise 'C' at hole-depths ranging from 16,222 feet to 16,224 feet beneath sea level—the measured (hypothetical) in-bore pressure readings were recorded steadily to increase from 4,566 psi to 10,666 psi. Such pressure rise within an approximate (hypothetical) nine-hour time span, and particularly the large pressure 'spikes' observed in the time intervals between and the reported second, third and fourth measurement times, an interval of about five hours, normally would cause alarm amongst an oil rig crew working in the Gulf of Alaska or anywhere else. During the day of 20 Aug. 2009, other (hypothetical) events were also occurring with other support role enterprises on the Broad View rig, as described next. For purposes solely of illustration—e.g., of the importance and value of having adequately centralized data output views available to a plurality of interacting parties, rather than only to the individual parties performing particular support roles or only to a small number of parties—it may be assumed that the various support role enterprises, as illustrated in FIGS. 19-21, had viewed data output pertaining only to their own operations and not to that of other operations.

Figure 22:
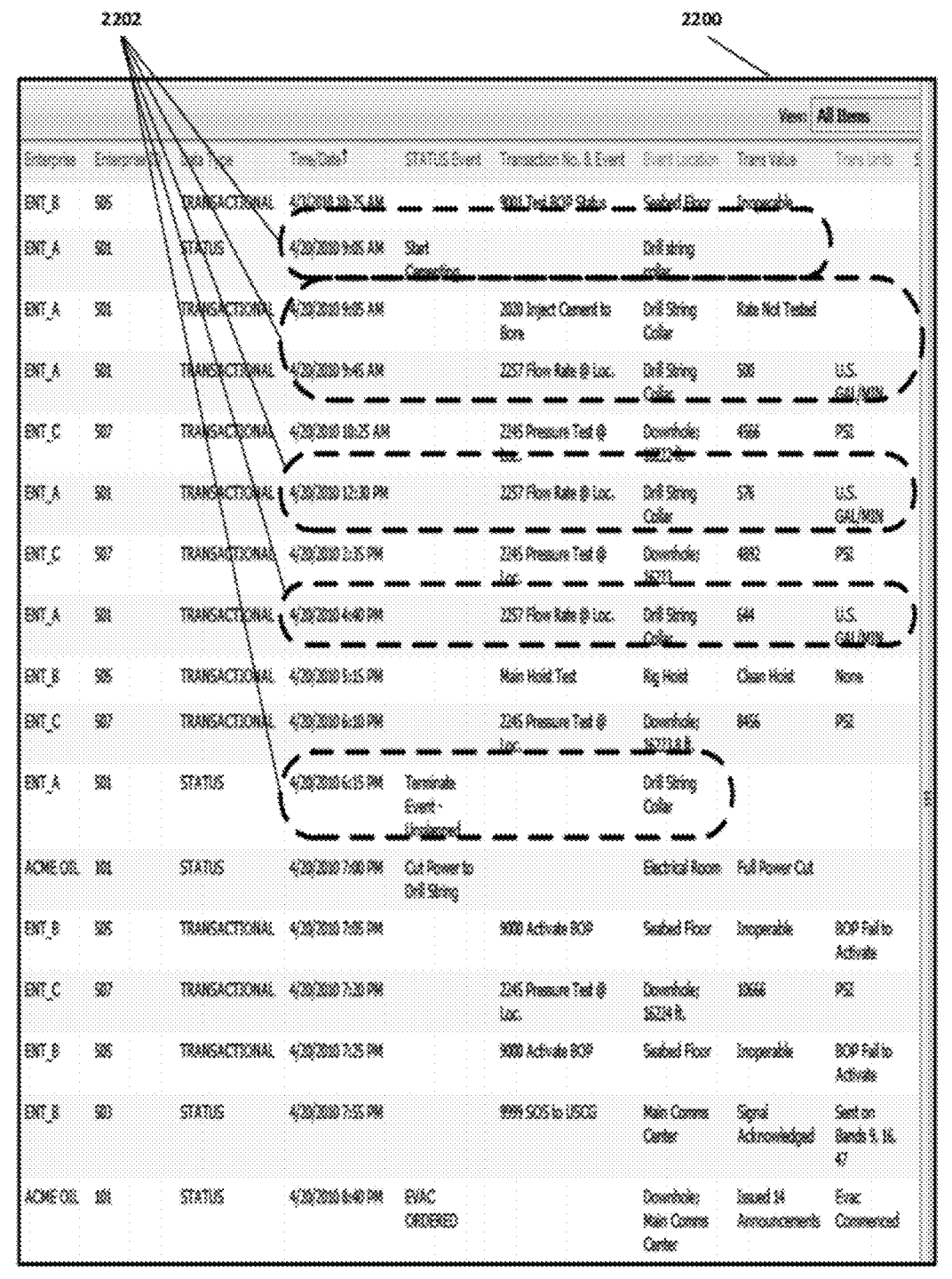

FIG. 22 illustrates, with data view 2200, data output pertaining to the (hypothetical) execution of six further events 2202 on 20 Aug. 2009 prior to (the hypothetical) explosions occurring on and near the Broad View rig. These six events are illustratively shown as having been (hypothetically) executed by support enterprise Enterprise 'A' as follows: i) at 9:05 a.m., the support enterprise declared a 'status' event, "start cementing," whereby, for instance, cementing operations were commenced as part of well completion procedures whereby an oil or gas well is prepared for purposes of flow testing the well or for commercial production; ii) also at 9:05 a.m., this enterprise declared, as a transaction event, commencement of cement injection into the ABC well bore; iii) at 9:45 a.m., this enterprise executed a transaction event, whereby cement flow rate (into the well casing) was (hypothetically) measured as 500 gallons per minute; iv) at 12:30 p.m., a second flow rate measurement was taken, indicating 576 gallons of cement per minute being injected; v) at 4:40 p.m., a third such measurement was taken, showing 644 gallons of cement per minute; and vi) at 6:15 p.m., this support enterprise (hypothetically) declared a status event, whereby is indicated that the cementing operation was terminated on an unplanned basis. All event instances as herein described are to be understood solely as hypothetical and as for illustrative purposes.

Examination of the (hypothetical) integrated data output views illustrated in FIGS. 21 and 22 may suggest: i) support enterprise Enterprise 'C' (ID 507) executed four separate downhole pressure tests (FIG. 21) (all within a two foot vertical depth range) on 20 Aug. 2009, showing a steady rise in pressure from 4,566 psi at 10:25 a.m. to 10,666 psi at 7:20 p.m., with large pressure 'spikes' between the second and third such tests and again between the third and fourth such tests; and ii) support enterprise Enterprise 'A' (ID 501) executed a series of well cementing operations (FIG. 22) from 9:05 a.m. until 6:15 p.m., with cement injection flow rates increasing from 500 gallons cement per minute to 644 gallons per minute, as measured by flow rate tests, followed by an unplanned termination of these operations at 6:15 p.m. The (hypothetical) consequences of such a plurality of (hypothetical) event executions are illustrated next.

Figure 23:
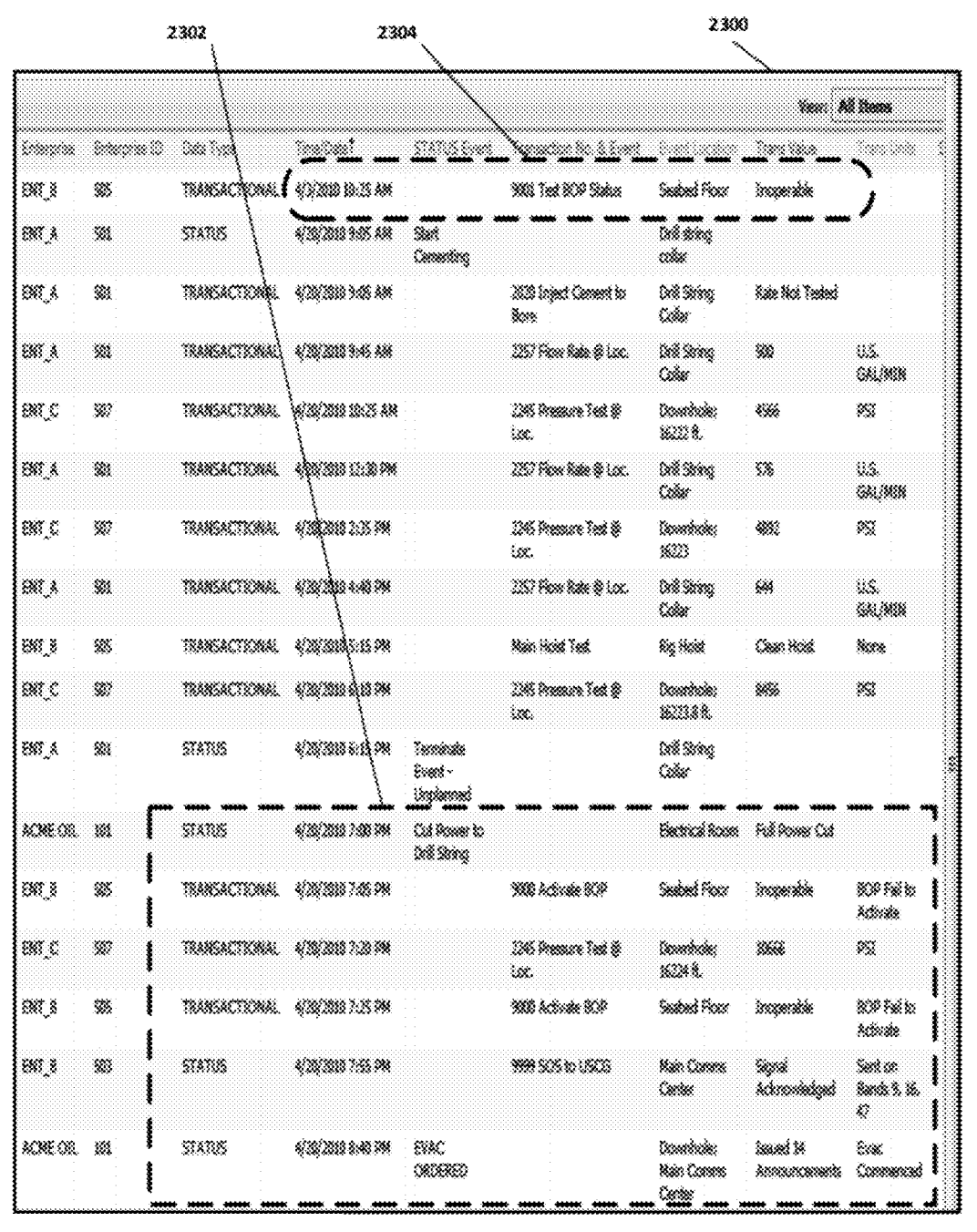

FIG. 23 illustrates hypothetical events in the (assumed) final hours leading to the demise of the Broad View on the night of 20 Aug. 2009. Data view 2300 is similar to the screen shots shown in FIGS. 21, 22. FIG. 21 focuses on one sequence of events executed on 20 August by support enterprise Enterprise 'C', e.g., performance of downhole pressure tests, showing a steady trend during that day of increasing pressure measurements in the depth range of 16,222 to 16,225 feet. FIG. 22, in turn, focuses on another sequence of events executed on 20 August by support enterprise Enterprise 'A', e.g., performance of a series of well completion tasks, specifically injection of cement into the well casing; this support enterprise's event execution records showed cement injection rates increasing throughout the day to 644 gallons of cement per minute prior to termination of cementing at 6:15 p.m. Thus, while (hypothetically) Enterprise 'C' was observing and recording down hole pressure in the well bore rapidly rising throughout the day of 20 August, Enterprise 'A' (also hypothetically) was increasing its cement flow rates. As described earlier, for illustration, it may be assumed that these two support enterprises—each contracted to ACME Oil Company, along with other contracted firms performing other tasks—in the absence of an ESBT embodiment, have viewed only their own data during the (assumed) fateful day of 20 Aug. 2009. FIG. 23 shows the (hypothetical, yet indicative) outcome of all events on 20 Aug. 2009, up through the evacuation of the Broad View drilling rig.

As shown with the final six event instances 2302, as recorded in data view 2300 of FIG. 23, and hypothetically, ACME Oil Company cut power to the drill string at 7:00 p.m., followed by: i) Enterprise 'B's first attempt of the day to activate the BOP, showing that the blowout preventer was inoperable; ii) a downhole pressure test by Enterprise 'C', indicating more than twice the pressure measured at 10:25 a.m. that day; iii) another operability test of the BOP by Enterprise 'B', again showing an inoperable condition; iv) communications by Enterprise 'B' to the U.S. Coast Guard at 7:55 p.m., indicating extreme distress on board the Broad View; and v) finally, at 8:40 p.m., declaration by ACME Oil Company, as general contractor and field operator, of orders to evacuate ship. Hypothetically and for illustrative purposes, the Broad View drilling rig was consumed in fire and explosions several hours later.

Referring to the (hypothetical) data view 2300 in FIG. 23, observation of the first event 2304 listed in this data output shows that Enterprise 'B' (hypothetically) executed an operability test on the BOP on 3 Aug. 2009, some 17 days prior to the fateful day of 20 August, with results shown as 'inoperable.' As will be apparent to an artisan of ordinary skill, if enterprises other than the one (hypothetically) executing the event 2304 had been aware of the non-operable status indicated for the BOP on 3 August, alternative actions may have taken place on board the Broad View rig or elsewhere, even up to the afternoon of 20 August when another support enterprise was observing sharply spiking downhole pressures, while a third enterprise was injecting cement into the well bore, thus further increasing pressure.

To this point, exemplary data input and data output have been illustrated whereby data is received by an SCR database (shown as element 220 in FIGS. 5, 6, 10, 11, 12 and 13) via a data aggregation device 1006 (FIG. 10), such as a SharePoint server or another suitable device. Next is described other data flows that may occur, whereby sequential event chain data and the objective analytical records, or OARs, created from such data, may be further communicated to an event sequence analyzer.

As illustrated in FIGS. 11 and 12, an SCR database 220 may receive data from system users and others via a data aggregation device, for instance, via a SharePoint server. A data structure, that may be formed using a DocString identifier, used in an ESBT embodiment, as earlier described, enables creation of sequential event chains and, from these event chains, the further creation of objective analytical records, OARs. As also illustrated in FIGS. 12 and 13, a plurality of such OARs (1202, 1204, 2406) may be received by an event sequence analyzer, ESA 1308, which, when interacting with an event sequence library, ESL 1216, may be analyzed via a plurality of data analysis tools. ESA 1308 and ESL 1216 may be included in a data analysis module 510, as shown in FIG. 5. Next are described data flows by which an ESA may receive particular data elements.

Figure 24:
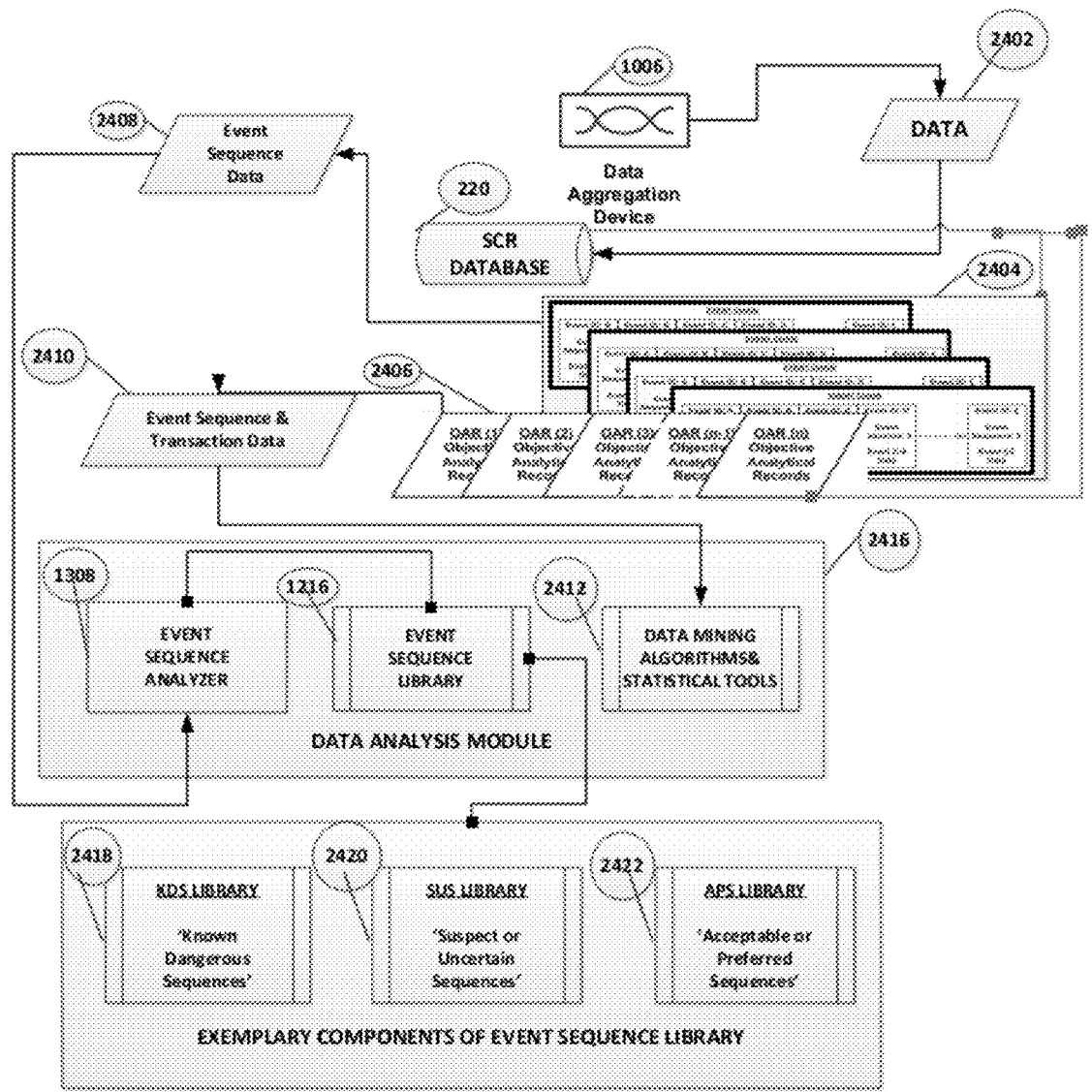
FIG. 24 is a flow chart illustrating an embodiment of a flow of data from a data aggregation device to an SCR database.

FIG. 24 is a flow chart illustrating: i) a flow of data 2402 from a data aggregation device 1006, for instance, from a SharePoint server, to an SCR database 220 (also shown as element 220 in FIGS. 5, 6), wherein may be formed a plurality of sequence event chains, or event chains 2404, and a plurality of objective analytical records, or OARs 2406; ii) a flow of event sequence data 2408 to an ESA 1308, which may be a component of a data analysis module 2416 (also shown as element 510 in FIGS. 5,6); and iii) a flow of both event sequence and transaction data 2410 to an element 2412, which may be comprised of data mining algorithms and statistical tools and which may also be a component of a data analysis module 2416. Execution of data operations within the latter are described later below, while next is described execution of data operations upon event sequence data 2408 within an ESA 1308.

As illustrated in FIG. 24, event sequence data 2408, derived from and dependent upon data contained in event chains 2404 as the latter may be received by and stored in an SCR database 220, may be transferred to an ESA 1308. One or a plurality of activities known as 'extract, transfer, and load,' or 'ETL,' may be performed (using data management tools, for instance, tools vended by Oracle, IBM, and others) in order to transfer such sequence-related data to, and load it into, the ESA 1308, including activities, for instance, such a normalizing or de-normalizing data from particular forms in which data may be organized and stored as event chains 2404 in the SCR database 220.

Following receipt of event sequence data 2408 in an ESA, a plurality of sorting and classification algorithms may be executed upon such data, whereby actual event sequences— e.g., event sequences such as illustrated in FIGS. 19 through 23—may be compared to sets of pre-defined, or benchmark, sequences in order to evaluate the safety or soundness of actual event sequences (such as those illustrated with the exemplary instance of the ABC oil well operations, herein described) against known benchmarks and, thereby, to enable prediction of potentially dangerous outcomes that may arise from continuing such actual event sequences. Such evaluations may be conducted, for instance, via procedures employed for online transaction processing, or OLTP, where herein the meaning of 'transaction' may include event executions (e.g., as transactions) and wherein such event executions have associated with them generation of data that may be captured as event chain data (shown as elements 2404 in FIG. 24), which, further may be aggregated into OARs 2406. Such OLTP operations may be run in real (or near-real) time.

For instance, such OLTP operations may be run concurrently with the flow of event executions occurring on an offshore oil platform, such as described herein for the hypothetical Broad View drilling rig exemplification and as illustrated in FIG. 13. As with such OLTP operations, online analytical processing, or OLAP, operations also may be executed in real or near-real time, whereby event sequence data 2408, as shown in FIG. 24, may be analyzed with the ESA 1308 upon receipt of particular transactional data via OLTP operations. Similarly, as later described and illustrated as event sequence and transaction data 2410, as these are derived from OARs 2406, may also be managed via such OLTP and OLAP operations. The physical location of data processing and analytical tools, such as those included with an ESA 1308 and with data mining algorithms and statistical analysis tools 2412, may be either on site (e.g., co-located with other data management tools on board an offshore oil platform in the exemplary instance herein described) or off site, for instance at an operations center such as that (hypothetically) maintained by ACME Oil Company in Anchorage, Alaska.

An event sequence library, ESL 1216, as illustrated in FIG. 24, may include one or a plurality of sub-libraries. For instance, the ESL herein illustrated (in FIG. 24) may include pre-defined, benchmark, data sequences (each corresponding to expected or possible actual, or real, event sequences, such as those as may be executed on an offshore oil platform) for: i) known dangerous event sequences, or 'KDSs,' which may be stored as benchmark (or reference) sequences in a 'KDS library' 2418; ii) suspect or uncertain event sequences, or 'SUSs,' which may be stored as benchmark sequences in an 'SUS library' 2420; and iii) acceptable or preferred sequences, or 'APSs,' which may be stored as benchmark sequences in an 'APS library' 2422. As will be apparent to an artisan of ordinary skill, categorizations of data sequences other than these herein described and illustrated may be employed, and such other sequence sub-libraries may be: formed as distinct data sets (as illustrated); formed as one larger data set, e.g., all within a single ESL 1216; or formed in other manners, as may be appropriate for data structures other than those herein illustrated for formation of particular sequence event chains 2404 and OARs 2406. A plurality of sorting and classification algorithms may be employed within the ESA 1308 in order: i) to process data 2408 pertaining to actual event sequences (such as those illustrated in FIG. 23) against ii) data pertaining to benchmark sequences contained in ESL 1216 and/or sub-libraries (2418, 2420, 2422) or other sub-libraries. Next is described an algorithm constructed specifically with reference to the exemplary application herein illustrated for the (hypothetical) ACME Oil Company ABC well drilling and completion instance.

Figure 25:
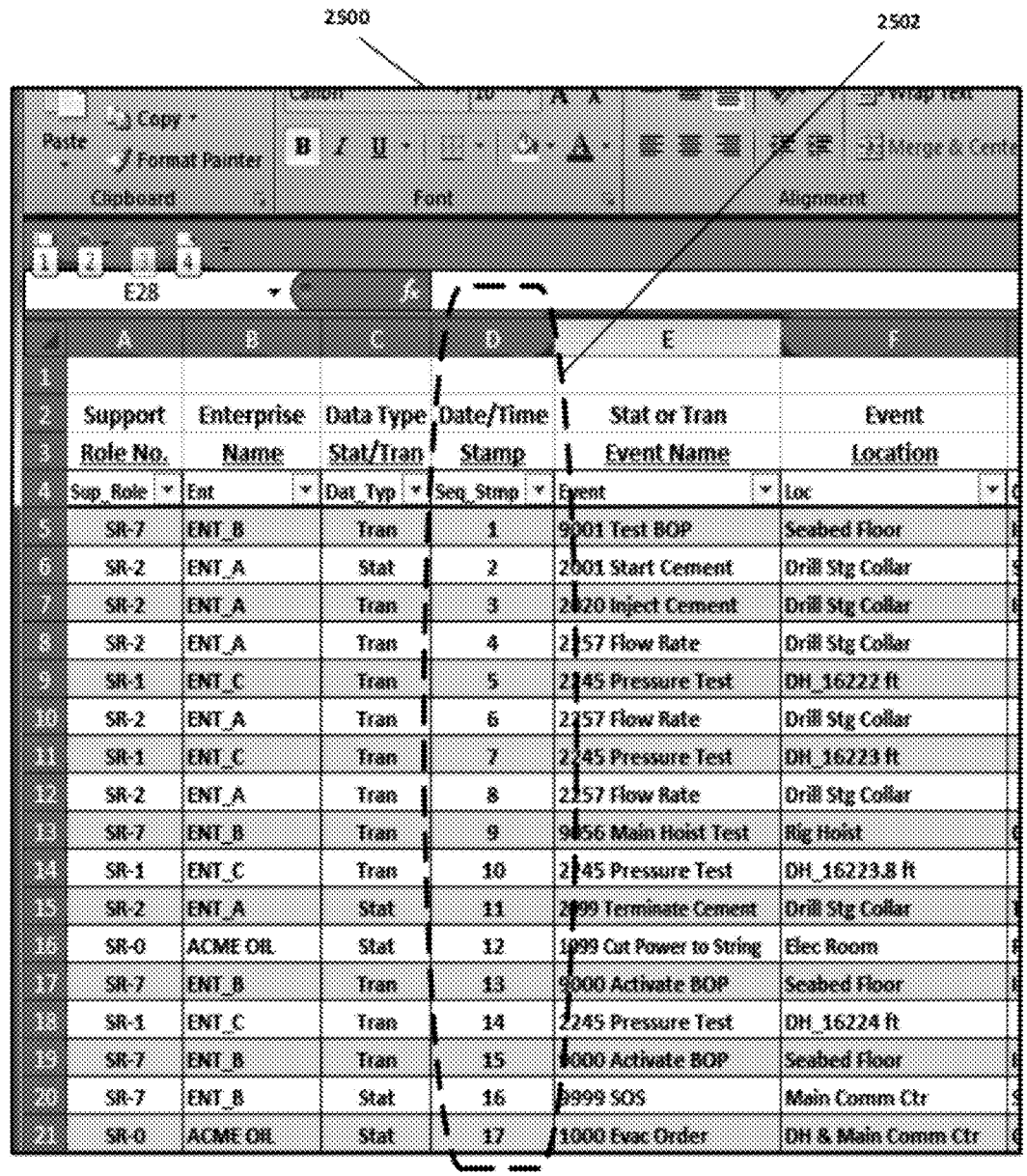
FIG. 25 is a screenshot of an embodiment of a database table illustrating exemplary event executions and a temporal sequence.

FIG. 25 is a screen shot of a database table 2500, illustrating exemplary event executions and a temporal sequence in which such events occurred, based on the same data illustrated in FIG. 19 for the exemplary instance of ESBT embodiment application for the ABC oil well project. The event data and other data included in database table 2500 pertain to the hypothetical instances earlier described wherein a plurality of support enterprises listed in columns A, B of the table 2500 execute a plurality of events (listed in column E of the table).

Column D 2502 contains a date/time stamp, wherein actual dates and times have been converted to a rank sequence order with rank '1' being first, or earliest, in time. For ease of illustration, database table 2500 is displayed as a data object created with Microsoft® Excel 2007 (with dating mining add-ins included in Excel). Data represented in database table 2500 are exemplary of actual event sequence data 2408, as shown in FIG. 24, wherein such (hypothetical) event sequence data may be loaded into event sequence analyzer, ESA 1308 contained in a data analysis module 510 as illustrated in FIGS. 5, 6.

Figure 26:
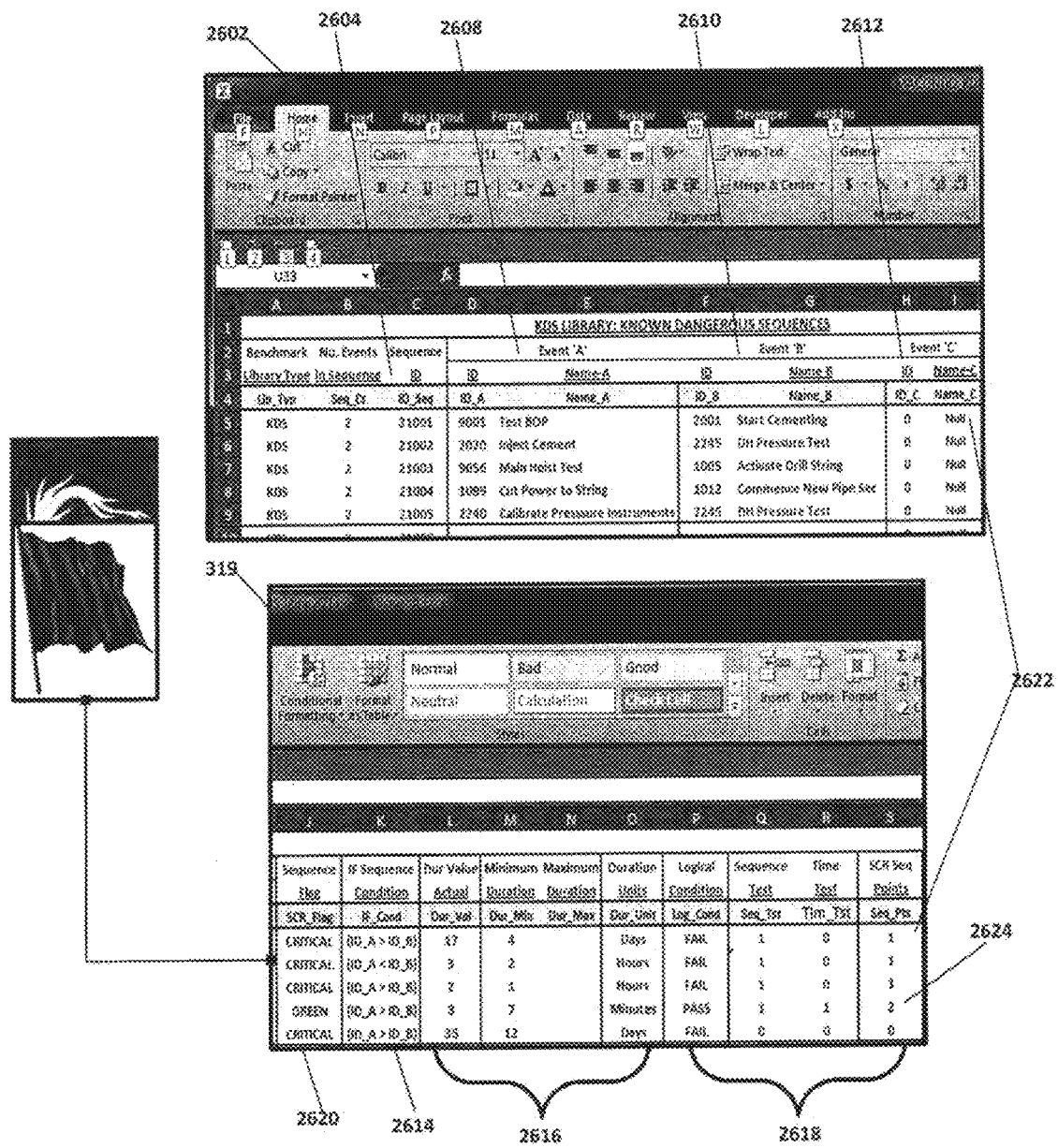
FIG. 26 is a screenshot illustrating data output for an ESBT embodiment.

FIG. 26 is a screen shot illustrating data output for an ESBT embodiment operating in the offshore drilling sector—and, specifically, in context of the exemplary instance, as herein described, of ACME Oil Company's hypothetical ABC oil well project. Referring also to FIG. 24, data output views 2602, 2604 (and wherein view 2604 is a continuation of the columns listed in view 2602 are an exemplary instance of an event and sequence report (illustrated in FIG. 12 as object 1210 that may be returned to a system user, as generated by an event sequence analyzer, ESA 1308. The ESA may execute computing operations on both actual event sequence data and benchmark sequence data that may be included in a 'known dangerous sequences' library, or KDS library, which is included in an SCR data analysis module. Following is an interpretation of the exemplary data displayed in data output views 2602, 2604 in FIG. 26.

Each particular row in data output table 2602 in FIG. 26 represents a particular actual event sequence, for instance, the (hypothetical) actual sequence of events shown in the first two rows of data view illustrated in FIG. 25. Each particular row in data output table 2602 also includes a particular benchmark event sequence, e.g., a benchmark event sequence created by a system user or another and stored in a KDS library. Such event sequence library, or ESL, in this instance may be a library that has been created by system users or others and stored in an SCR data analysis module. Column 'C' 2604 in view 2602 lists for each instance (e.g., row) of an event sequence the sequence's unique ID number; e.g., the first such instance is identified as 'ID-Seq' "21001," which may indicate, for example, that this particular event sequence is comprised of two discrete events (as the leading numeral in the ID form) and that it is also the $1001^{st}$ such benchmark event sequence in a domain of such two-event sequences. Columns 'D' and 'E' 2608 provide a name and unique ID of the first of the two events in each event sequence; columns 'F' and 'G' 2610 provide a name and unique ID of the second of the two events in each two-event sequence. As may be apparent to an artisan of ordinary skill, event sequences containing more than two events may also be evaluated in an ESA (as indicated by a third event in columns 'H' and 'I' 2612, which are left null in this example).

The first event sequence listed in data view (2602) in FIG. 26 is that with sequence ID of "21001," which is comprised of two events: i) first in sequence, the event 'Test BOP' with event ID of "9001"; and ii) second in sequence, the event 'Start Cementing' with event ID of "2001". Column 'K' 2614 describes a logic test as exemplary of such test that system users may wish to apply in evaluating a particular event sequence, e.g., in evaluating an actual event sequence such as those shown in data view illustrated in FIG. 25 versus a benchmark sequence as identified by the ID_Seq 2604. Thus, a logic test performed in the exemplary algorithm—herein also referred to as the 'SCR back testing algorithm'—is that shown in element 1614 as a logical 'IF' test. For instance, such logic test for the first event sequence tested (e.g., that in the first instance row, shown as row '5' in the table) may be read as: "If the value of the unique identifier of event 'A' (as the first-in-sequence) is greater than that of event 'B' (as the second-in-sequence), then . . . " Column 'Q' 2618 in the table shows the value returned by this first logic test, whereby, for instance, the value of '1' is returned if the logic test is 'true' and '0,' if false. The attribute in column 'Q' is herein referred to as the sequence test, or 'Seq_Tst.' Similarly, a time test may be performed, shown in column 'R' as 'Tim_Tst.' The 'Tim_Tst' attribute is computed with reference to columns 'L' through 'O' 2616. Column 'M' is an attribute whereby a user may specify a minimum duration period and column 'N,' a maximum duration, whereby the duration units are in column 'O' (e.g., minutes, hours, days, etc.). Such minimum and maximum durations may be specified by a system user with respect to the permitted minimum or maximum duration of time between events 'A' and 'B,' that is, between the in-sequence events specified in elements 2608 and 2610 and with ID_Seq listed in element 2604. Column 'L' 2616 is a similar duration attribute, in this instance, for the actual duration between the pertinent two sequential events as such, which may be derived from the corresponding date/time stamps (shown in column 'D' 2502 in FIG. 25).

Still referring to FIG. 26, a value for the 'Tim_Tst' attribute (column 'R' 2618) may be computed via a second logic test used in the SCR back testing algorithm, computed as follows: If the value of the actual event sequence duration in Column 'L' is greater than the minimum duration of the corresponding benchmark event sequence, then the logic test is false and a value of '0' is returned for the attribute 'Tim_Test,' and, contrariwise, such value is '1' if the logic test is true. Thus, the two logic tests computed within the SCR back testing algorithm indicate whether: i) a desired event sequence is, or is not, followed in a specified order, as valued via the Seq_Tst attribute; and ii) a minimum or maximum time duration test of the duration between actual event occurrences versus benchmark ones is, or is not, met, as valued via the Tim_Tst attribute. An SCR Seq Points score, or Seq_Pts, may be computed by summing the values of the two test attribute columns (e.g., columns 'Q' and 'R') and displaying the sum in column 'S' 2618.

The first exemplary instance 2622 in data views 2602, thus, may be interpreted as follows: i) the two-event sequence with ID of '21001,' comprised of 'Test BOP' (ID '9001'), first in order, and 'Start Cementing' (ID '2001'), second in order, occurred in the desired sequence (e.g., with 'Test BOP' first), thus returning a value of '1,' or true, for the attribute Seq_Tst (in column 'Q'); ii) the actual event sequence failed to meet the stipulated minimum duration for the corresponding benchmark event sequence (e.g., 17 days actual versus 4 days allowed minimum duration), thus returning a value of '0,' or false, for the attribute Tim_Tst (in column 'R'); and iii) a total value of '1,' therefore, is returned for the attribute Seq_Pts (in column 'S'). Column 'P' 2618 contains a third logic test, whereby: If the value of Seq_Pts (column 'S') equals '2,' then a 'Pass' result is returned, and otherwise, a 'Fail' result obtains. Thus, for example, the first instance of an event sequence shown in data views 2602—with '9001/Test BOP' as the first event in sequential order and '2001/Start Cementing' as the second such event—returns a 'Fail' result due to actual duration time exceeding the specified minimum duration time of four days (even though the two events are shown to have occurred in the desired sequential order). As also shown in data view 2602, such instance of a test failure (e.g., whereby the actual event sequence or its permitted minimum or maximum duration fails to pass the corresponding logic test) may result in a sequence flag—also herein referred to as an 'SCR flag'—being displayed in the data view in column 'J,' for instance, as a 'Critical' SCR flag 2620. For the exemplary data set included with data view 2602, the only one of five tested event sequences that received a 'Pass' result 2624 (based on a value of '2' in column 'S' for Seq_Pts) is that of event sequence with ID_Seq of '21004,' whereby event 'A' (1099/cut power to string') is shown to be properly ordered with reference to event 'B' ('1012/commence new pipe sec') and whereby the minimum duration between these events was satisfied. In embodiments, a flag may be associated with a flag condition. The flag condition may represent the type of flag or provide information about the flag. Example flag conditions include, but are not limited to, normal, critical, suspicious, risk, elevated risk, low risk, danger, or any other type of warning or status identifier used herein or otherwise known to the art. In embodiments, the flag condition may be used along with the flag to convey an alert (e.g., an alert status), a normal condition, or any other information about data in an event sequence representing an event chain. For example, selection via user interface of a particular flag may cause the specific flag condition to be displayed.

Thus, in the exemplary instance of event sequence with ID_Seq of '21001,' shown in FIG. 26, (hypothetically) the benchmark sequence requirements—e.g., for a blowout preventer, or BOP, test being executed within four days of commencement of well cementing operations—failed to be met, as signified by the computed value of 'Fail' in column 'P,' resulting in an SCR flag value (column T) of 'Critical' being returned. As illustrated in data view 2302 in FIG. 23, if an ESBT embodiment had been in use and correctly applied in the hypothetical ACME Oil Company ABC oil well project, such 'Critical' level of SCR flag value may have been returned in real (or near-real) time, thereby affording the opportunity for operations managers or others onboard, or associated with, the Broad View platform to take corrective action and terminate well cementing operations during the day of 20 Aug. 2009 and prior to occurrence of the (hypothetical) hydrocarbon-fueled explosion that destroyed the platform. Application of an ESBT embodiment, therefore, may have avoided or mitigated the assumed consequential damages arising from (hypothetically) an unapproved event sequence whereby the blowout preventer, BOP, had not been adequately tested and confirmed in good operating condition sufficiently in advance (e.g., in reference to particular benchmark sequences or benchmark time durations) of well cementing operations being performed at the platform on the ABC oil well.

As will be apparent to an artisan of ordinary skill: i) a plurality of different or alternative logic tests (than those herein described) may be designed by a system user, system designer, or another, whereby other conditions or other nature of parameters and parameter values may be compared and tested; ii) particular logic tests may be constructed for each particular event sequence; iii) event sequences with more than two discrete events may be employed with appropriate logic tests designed for them; iv) instances of actual event sequences may have associated with them a unique event sequence instance identifier (which, for clarity, is omitted from data view (2602)); v) algorithms may include logic tests for parameters included in transaction data (shown as element 2410 in FIG. 24) in addition to logic tests for event sequence data (shown as element 2408 in FIG. 24); and vi) event sequence benchmark libraries other than, or in addition to, such library as illustratively shown for 'known dangerous sequences,' KDSs, may also be run against actual event sequences, as next described.

As illustrated in FIG. 24, an ESBT embodiment may include one or a plurality of sub-libraries within (or, alternatively, apart from) an event sequence library, ESL 1216, which may be contained in an SCR data analysis module (510), as shown in FIGS. 5, 6 within an ESBT embodiment of the SCR system and method. For instance, exemplary ESL sub-libraries are illustrated herein for: i) a KDS sub-library 2418; ii) an SUS sub-library 2420; and iii) an APS sub-library 2422. Algorithms in the nature of that described herein for the SCR back testing algorithm, as applied herein with reference to the KDS sub-library, may also be constructed for use in such other sub-libraries. For instance, algorithms generally analogous to the SCR back testing algorithm may be constructed and applied for one or both of the SUS and APS sub-libraries and for other such sub-libraries, as next described.

Figure 27:
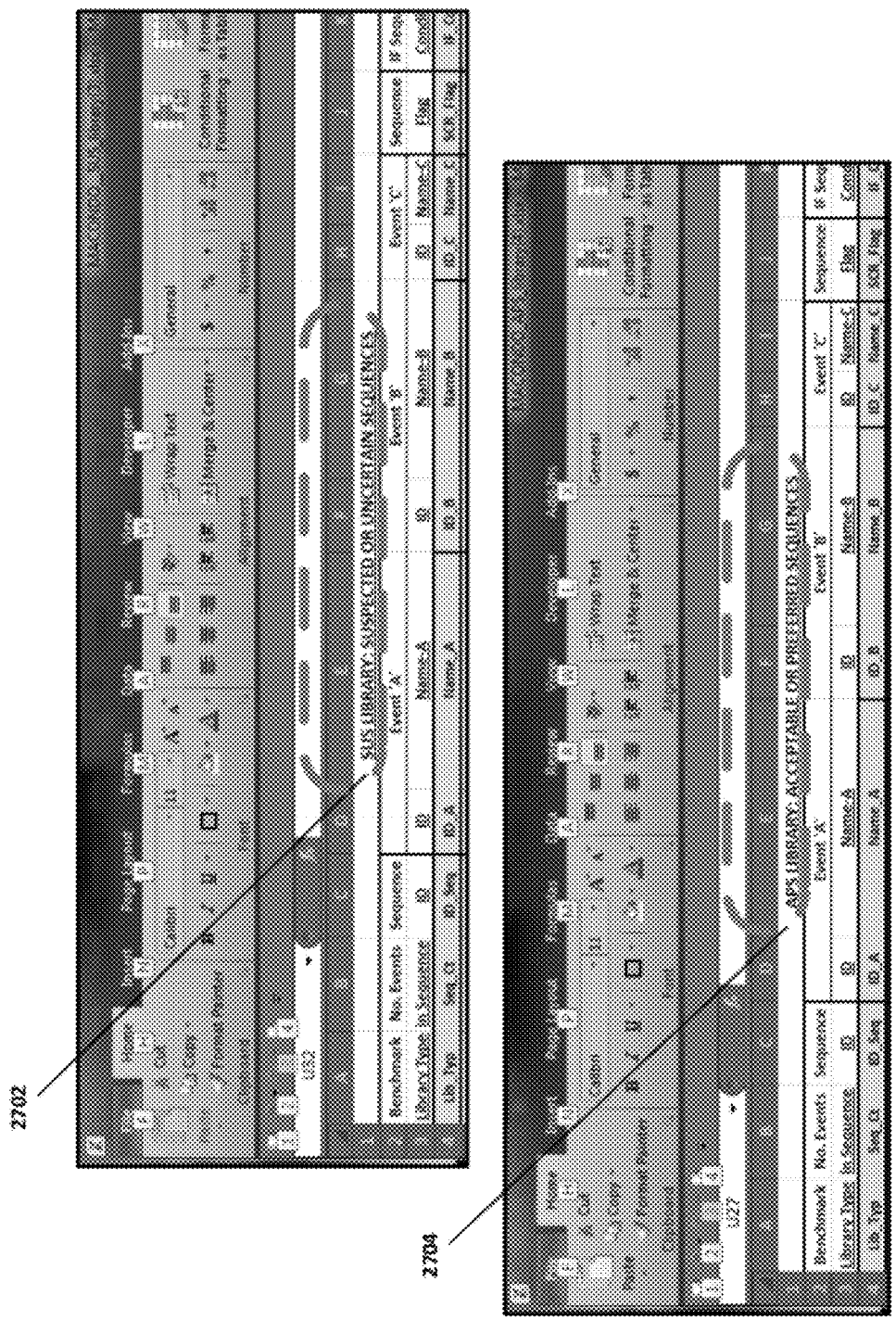
FIG. 27 illustrates screenshots of an embodiment of a data view with data output from an event sequence library.

FIG. 27 illustrates screen shots of data views, whereby data output from an event sequence library, ESA, may be computed by running actual event sequence data against benchmark event sequence data for two other exemplary sub-libraries herein described, in addition to the exemplary benchmark event sequence data herein described for the KDS sub-library: i) a data view for the 'suspect or uncertain sequences,' SUS 2702 sub-library; and ii) a data view for the 'acceptable or preferred sequences,' APS 2704 sub-library. Additional sub-libraries may also be constructed by system users or others, as may be appropriate for, and useful in, other ESBT embodiments. As described next, a particular advantage may accrue to users of an ESBT embodiment by employing more than one sub-library within an event sequence library, ESL, whereby parallel processing may be employed to expedite delivery times in which actionable information may be returned to system users.

Figure 28:
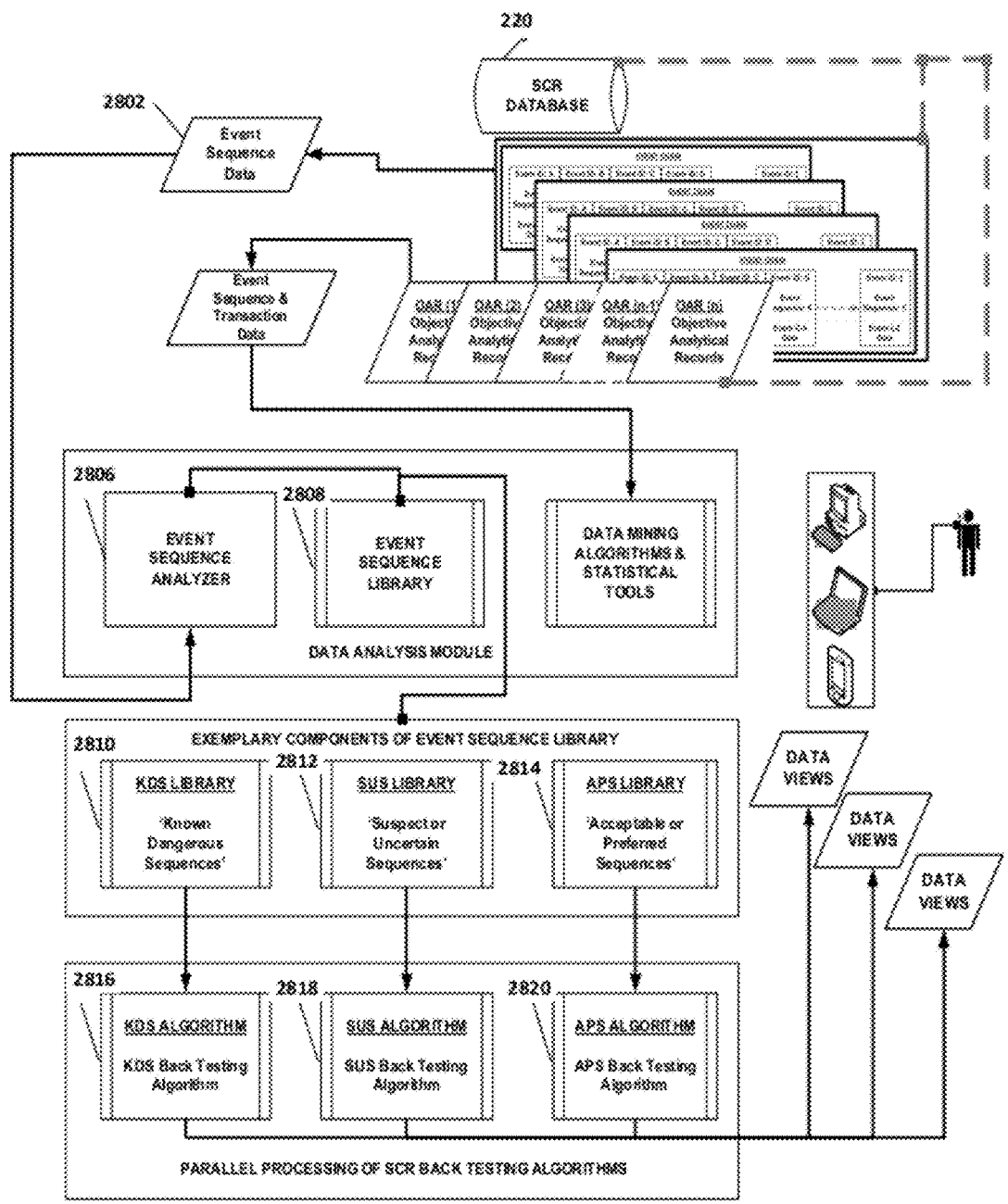
FIG. 28 is a block diagram illustrating an embodiment of data flows that may be employed with the embodiments disclosed herein.

FIG. 28 is a block diagram illustrating data flows, whereby a plurality of forms of SCR back testing algorithms 2816, 2818, and 2820 may be employed and whereby computational processing for each such algorithm may be run in parallel mode within an event sequence analyzer, ESA. An SCR database 220 within an ESBT embodiment may transfer event sequence data 2802 to the ESA, which is contained within an SCR data analysis module. As earlier herein described, the ESA may process event sequence data 2802 against sub-libraries of benchmark sequences 2810, 2812, and 2814, which may be included within an event sequence library, ESL. FIG. 26 illustrates exemplary data view (2602), created as data output from computational processing within the ESA 1308 of actual event sequence data 2802 run against a KDS library or sub-library 2810 and using an SCR back testing algorithm constructed to evaluate such actual event sequence data against benchmark event sequence data for 'known dangerous sequences,' or KDS. Additionally, the parallel processing mode operates in a manner whereby a particular set of actual event sequence data 2802 may be replicated and run in parallel against separate versions of an SCR back testing algorithm, whereby each such algorithm version may be constructed with respect to particular benchmark event sequences included in each corresponding such particular benchmark sub-library.

For instance, as illustrated in FIG. 28, one copy each of an actual event sequence data set 2802 may be run within the ESA 2806 against each one of three different (or more) such algorithm versions, whereby each such actual event sequence data set copy is processed in parallel against: i) a KDS algorithm 2816 for the KDS library or sub-library 2810; ii) an SUS algorithm 2818 for the SUS library or sub-library 2812; and iii) an APS algorithm 2820 for the APS library or sub-library 2814. Insofar as an objective of an ESBT embodiment may be to process actual event sequence data 2802 against such benchmark event sequence data, as may be contained in a plurality of such benchmark sub-libraries and in a manner as close to real time as possible, it may be advantageous for a system user or others to access data views in real time as such data views are constructed and become available. An exemplary instance of such application of parallel processing of copies of actual event sequence data sets 2802 is next described.

As illustrated in FIG. 28, multiple copies of an actual event sequence data set 2802 may be processed in parallel by an ESA 1308, whereby a copy of such actual event sequence data set is processed against an ESL sub-library, including sub-libraries such as for KDS 2810, for SUS 2812, and for APS 2814, whereby such processing occurs via the corresponding algorithms 2816, 2818, and 2820. For instance: i) the KDS algorithm 2816 may function, as herein earlier described and illustrated with FIG. 26, whereby such algorithm (also herein referred to as the SCR back testing algorithm) searches and tests for conditions known or judged (by system users or others) to represent a 'Fail' condition (e.g., wherein the actual event sequence data and corresponding benchmark event sequence data return at least one of two of the exemplary logic tests as 'false'), resulting in an SCR flag (shown as attribute 2620 in FIG. 26) such as 'Critical' being returned; ii) the SUS algorithm 2818 may function in an manner analogous to the KDS algorithm, wherein operation of the SUS algorithm on the actual and SUS benchmark event sequence data sets may return a 'Fail' condition, resulting in an SCR flag such as 'Suspect' being returned, indicating, for instance, that the conditions associated with the actual event sequence data do not warrant a 'Pass' condition with respect to the corresponding SUS benchmark event sequence data, but also wherein a 'Fail' condition is less indicative of a 'critical' condition as in the instance of a 'Fail' result returned by the KDS algorithm; and iii) the APS algorithm 2820 may function in an manner analogous to the KDS and SUS algorithms, wherein operation of the APS algorithm on the actual and APS benchmark event sequence data sets may return a 'Pass' condition, resulting in an SCR flag such as 'Acceptable' being returned, indicating, for instance, that the conditions associated with the actual event sequence data warrant a 'Pass' condition with respect to the corresponding APS benchmark event sequence data, thus indicating an acceptable match between the actual and benchmark event sequences. As next described, operation of the KDS and SUS versions of an SCR back testing algorithm enables searches for a 'Fail' condition, whereby actual and benchmark event sequences cannot be matched, and operation of the APS version of such algorithm enables searches for a 'Pass' condition, whereby such comparisons can be matched. Thus, for the KDS and SUS versions of such algorithm, searches are made for negative matches of actual and benchmark event sequences (resulting in an SCR flag such as 'Critical' and 'Suspect' being returned in a data view), and in the APS version of such algorithm, searches are made for positive matches of actual and benchmark event sequences (resulting in an SCR flag such as 'Acceptable' being returned in a data view).

Figure 29:
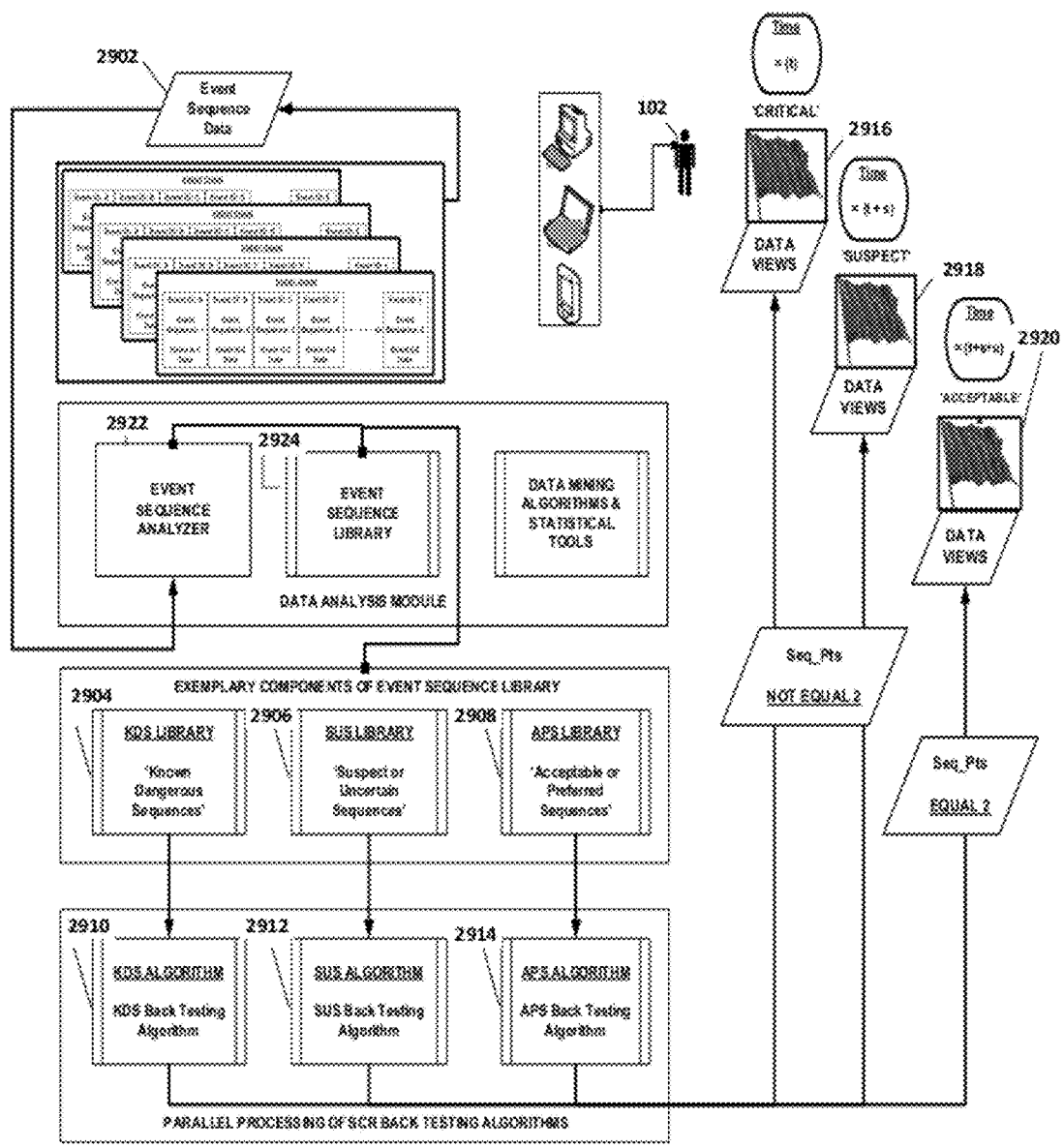
FIG. 29 illustrates an embodiment of outcomes for parallel processing of multiple copies of an event sequence data set via a plurality of SCR event and sequence back testing algorithm versions.

FIG. 29 illustrates exemplary outcomes for parallel processing of multiple copies of an event sequence data set 2902 via a plurality of SCR back testing algorithm versions. Actual event sequence data may be loaded into an ESA and processed against a plurality of benchmark ESLs or sub-libraries, for instance, again sub-libraries KDS 2904, SUS 2906, and APS 2908, whereby the ESA may employ particular SCR back testing algorithm versions tailored to each particular sub-library. For instance, algorithms 2910, 2912, and 2914 may be used in processing actual event sequence data against each of these three respective sub-libraries. Through operation of computational elements in a parallel processing mode, each copy of an event sequence data set 2902 may be independently run in the ESA using the corresponding version of SCR back testing algorithm. Different processing modules within the ESA may process actual event sequence data against different event sequence sub-libraries, using an appropriate algorithm version, such that, for instance: i) a higher performance processing module may run the actual event sequence data set 2902 against the KDS sub-library 2904, using the KDS algorithm 2910 version, enabling return of 'Critical' SCR flags 2916 (also illustrated as attribute 2620 in FIG. 26) to system users in an average run time of 't,' thereby enabling such users to receive critical sequence warnings in the (relatively) fastest time; ii) a medium performance processing module may run the actual event sequence data set 2902 against the SUS sub-library 2906, using the SUS algorithm 2912 version, enabling return of 'Suspect' SCR flags 2918 to system users in an average run time of '(t+s),' thereby enabling such users to receive suspect sequence warnings in time faster than for 'acceptable' 2920 notices, but slower than for 'critical' warnings; iii) a lower performance processing module may run the actual event sequence data set 2902 against the APS sub-library 2908, using the APS algorithm 2914 version, enabling return of 'Acceptable' SCR flags 2920 to system users (2) in an average run time of '(t+s+u),' thereby enabling such users to receive acceptable sequence notices with a lower time priority than for 'critical' 2916 and 'suspect' 2918 warnings. Alternatively, in embodiments, system designers, users or others may, in place of such parallel processing upon multiple data set copies as herein described, operate in a series processing mode, whereby for instance, a particular level of data filtering or transformation is first performed to reduce the size of copied data sets, whereby such smaller, filtered data sets then may be processed in a manner, for instance, where event sequence data is first processed against benchmark data in a KDS sub-library of an ESL, followed in series then by processing of the smaller data sets against benchmark data in either or both of the SUS and APS sub-libraries of an ESL. Other nature of filtering or data set reduction operations may be performed. Effecting such data reduction operations, as compared to the parallel processing herein described with reference to complete, copied data sets, may represent a benefit trade-off between data processing cost and turn-around time, e.g., the average and/or peak time (or other such time metrics) taken for an ESBT embodiment to receive and process data and then deliver results of such processing as information to system users and others.

A possible advantage of operating an ESBT embodiment in a parallel processing mode, as herein described and as illustrated with FIG. 29, is that system designers, users or others may configure computing hardware and other elements within an SCR database system, an ESA system, or within other system elements or modules—and also tailor the structure of data files, including files for both actual event sequence data sets and benchmark event sequence data sets—such that particular performance targets may be set, whereby, for instance, relative priorities may be established for run time with respect to different categories of data output variables. Additionally, the number of benchmark event sequence instances contained in particular ESLs or sub-libraries may be tailored to enable prioritized average run times, whereby, for instance, the KDS sub-library 2904 may contain relatively few benchmark event sequence instances with 'critical' warning potential such that actual event sequence data 2902 may be processed in real (or near-real) time against such an abbreviated benchmark library or sub-library. In such manner, for instance, system users may receive SCR flags with 'critical' condition with highest priority. Additionally, the relative complexity of a particular SCR back testing algorithm may be customized to enable, or approach, a particular targeted run time. For instance, the KDS algorithm 2910, as shown in FIG. 29, which may be aimed toward searching for and finding 'known dangerous sequences,' may be constructed with relatively few or simple logic tests such that rapid return of 'critical' levels of SCR flags may be achieved. Other choices also may be made for achieving targeted processing performance levels. For instance, a system designer or another may construct a version of a KDS algorithm whereby an initial (or temporary) 'critical' flag may be rapidly returned to users via an ESA and its related components, based on a first pass of such KDS algorithm, followed by a second such flag, for instance, a flag that either signifies a flag condition of 'confirmed critical' or 'cancelled critical' status of an actual event sequence versus its corresponding benchmark event sequence.

Other means and methods may be employed for customizing (e.g., with respect to a particular application environment) the structure and operating performance of hardware and software components of a particular ESBT embodiment. Referring to FIG. 29 and to the three exemplary ESL sub-libraries (e.g., the KDS, SUS, and APS sub-libraries) and to the three corresponding versions of SCR back testing algorithms (KDS algorithm 2910, SUS algorithm 2912, and APS algorithm 2914), for instance: i) any one of such algorithm versions may be run against actual event sequence data 2902 and benchmark event sequence data, without the other two algorithms; ii) two or all three such algorithm versions may be run in parallel processing mode, as herein described; iii) two or all three such algorithm versions may be run in a serial processing mode, whereby, for instance, a KDS algorithm is run first in sequence against actual event and benchmark data, followed by running of an APS algorithm; and iv) other nature or number of SCR back testing algorithms may be run in other sequences or with a plurality of other system performance objectives (e.g., performance objectives in addition to, or other than, a targeted run time). Additionally, in circumstances wherein system users or others may wish to process actual event sequence data 2902 using more than a single form or version of SCR back testing algorithm, such actual event sequence data: i) may be replicated, or copied, in part or entirely and loaded into parallel modules within an ESA, each such module running a particular algorithm version against actual and benchmark sequence data sets; or ii) may remain in a data store (e.g., without being replicated or copied in part or in full), whereby particular subsets of such actual event sequence data may be extracted from such data store (using ETL tools) and loaded into one or more ESA modules, each running one or more algorithms against particular benchmark libraries or sub-libraries.

Also, as will be apparent to an artisan of ordinary skill, versions of SCR back testing algorithms may be constructed whereby: i) as illustrated and described herein, such algorithms may be constructed to evaluate actual two-event sequences against a plurality of benchmark two-event sequences (e.g., as data for such benchmark sequences may be stored in an ESL or sub-library), employing two test parameters or variables (e.g., a sequence-match test and a time duration test); ii) such algorithms may be constructed to evaluate actual (n)-event sequences against a plurality of benchmark (n)-event or (p)-event sequences (e.g., as data for such benchmark sequences may be stored in an ESL or sub-library), employing (q)-count of test parameters or variables; iii) such test parameters or variables may be linear (as illustrated in the exemplary instance with FIG. 26, wherein the exemplary two test parameters, Seq_Tst and Tim_Tst, each may be assigned an alternative value of the binary 0/1, and which exemplary two parameters' values may be summed to derive a total SCR Seq_Pts score with value of either 0, 1, or 2, which summed value, in turn, determines a condition for an SCR flag); iv) such test parameters or variables may be non-linear, whereby, for instance, a sequence test parameter such as Seq_Tst (shown as element 2618, column 'Q' in FIG. 26) may permit a range of assignable values such as in the geometric series 2, 4, 16 . . . , whereby each such value (after the first value, 2) may equal the square of its preceding value, signifying a power-law relationship amongst possible values for the parameter, Seq_Tst; v) only event sequence data attributes of a categorical nature, a continuous nature, or both categorical and continuous nature may be specified as event sequence test (e.g., predictor) parameters; vi) both such event sequence data attributes and transactional data attributes (e.g., as may be included, respectively, in event sequence data 2408 and event sequence and transaction data 2410, as shown in FIG. 24)—and each of a categorical nature, a continuous nature, or both categorical and continuous nature—may be specified as event sequence test parameters, e.g., predictors; and vi) other nature, number, combinations and/or permutations of data attributes (e.g., such as the attributes Seq_Tst and Tim_Test in 2616 of FIG. 26) may be employed as test variables, e.g., as predictors, whereby a system designer, user, or another may construct a particular version of an SCR back testing algorithm targeted toward one or a plurality of particular objective test targets or concepts to be tested.

Another mode in which an ESBT embodiment may be operated for the purpose of evaluating actual event sequences in reference to benchmark event sequences is that of a forward planning mode, also herein referred to as the 'registered term work plan' mode or the 'RTWP' mode of an ESBT embodiment of the SCR system and method. In the RTWP mode, system users or others (for instance a plurality of enterprises operating in support of an offshore oil drilling platform or rig, each enterprise supporting a general contractor such as ACME Oil Company in its operatorship of the hypothetical Broad View rig on the ABC oil well) may file or register an RTWP for a particular forward period of time. For instance, a support enterprise such as Enterprise 'A' or Enterprise 'B'—operating in support of ACME Oil Company on the hypothetical Broad View platform—may declare into an SCR database a forward work plan, or RTWP, which may specify a plurality of work events or tasks planned for a particular upcoming 24-hour period. For example, Enterprise 'A' (at or near the end of one work day) may so declare an RTWP for the next work day (e.g., for the next three 8-hour shifts) in connection with cementing and other well completion events or tasks planned for execution (e.g., by Enterprise 'A') in support of ACME Oil Company's ABC oil well, operating from the Broad View platform. One or a plurality of data entry forms similar to that illustrated in FIG. 17 may be employed to enable such a support enterprise to enter data pertaining to each planned work event for the next one day forward.

For instance, a data entry form similar to object 1702 in FIG. 17 may be completed for information such as: a support enterprise's name and/or ID 1704; a planned work event 1708; and a planned event start time 1710. Referring also to FIG. 13, a system user, using a data client device such as a hand held PDA or laptop computer, may enable an SCR database 220 to receive such data input via a suitable data communications network such as that earlier herein described and as illustrated in FIGS. 5, 6. A support enterprise, such as Enterprise 'A', may declare one or a plurality of such planned events, and an aggregated RTWP may thereby be constructed for a plurality of, or all, enterprises performing support roles for the next day forward.

From such individual enterprises' RTWP data declarations, then, an aggregated RTWP for all such enterprises may be created, for instance, in a form similar to data object 1902 illustrated in FIG. 19. That is, a rank-ordered set of such planned work events or tasks may be created for all such events planned for a forward time period, such as for the forward 24-hour period. Once such aggregated, time-specific RTWP has been constructed in an SCR database—as comprised of a plurality of individual support enterprises' event plans—such RTWP may be stored in an event sequence sub-library (similar to sub-libraries 2418, 2420, and 2422 in FIG. 24). Once so stored in such sub-library, for instance in a sub-library named 'registered term work plan library,' or 'RTWP library,' then such benchmark event sequence sub-library may be accessed via an ESA 2922, as also shown in FIG. 24. In such configuration or mode, therefore, actual event sequence data 2902 may be processed within an ESA 2922—as in the manner earlier herein described—whereby actual event sequences for Day-(n) may be processed against benchmark event sequences as contained in the RTWP library for planned events filed on Day-(n−1) for execution on Day-(n), employing SCR back testing algorithms such as those illustrated in FIGS. 28 and 29.

Additionally, such RTWPs—as may be created by each particular support role (or enterprise) and as formed, in aggregate, for all support roles (or enterprises)—may be pre-tested, for example, by processing (via an ESA) such RTWPs against a benchmark event sequence library or sub-libraries during the nighttime before start of the work day for which such RTWPs may be created. In such manner, a coordinated RTWP for all event tasks to be executed on Day-(n) may be tested against benchmark event sequences (as those may be contained in an ESL or sub-libraries) on Day-(n−1), such that any observed event sequence mismatches (which may generate a warning flag in real time) may be rectified in advance operations' commencement on Day-(n). With such pre-testing, therefore, system users of an ESBT embodiment may commence work on Day-(n) with the advantage of having two event sequence-guidance tools: i) an ESA running in real (or near-real) time, which tests actual event sequences against benchmark sequences; and ii) an ESA running in advance of real time, which tests planned event sequences (as declared via one or a plurality of RTWPs) against benchmark sequences. In such dual-run mode, it also may be advantageous for users to operate: i) one ESA for real time, actual sequence back testing (e.g., for actual event sequences occurring during Day-(n−1)); and ii) a second ESA, e.g., a 'RTWP-ESA,' for processing event sequences contained in an RTWP (as created on Day-(n−1) for Day-(n)). In such dual-run mode manner, therefore, one ESA may remain dedicated to processing actual event sequences against benchmark event sequences during the course of an operational day, while a second ESA may be dedicated to processing planned event sequences again benchmark event sequences for an upcoming operational day, thereby not placing the processing load of the latter on top of the processing load of the former. Operating an ESBT embodiment in a mode with RTWPs in place may be analogized to a football team conducting practice sessions in advance of game day, whereby particular play sequences may be tested for effectiveness. Just as such a football team may discover particular play sequences that may not work well (and which should be avoided on game day), users of an ESBT embodiment (in RTWP mode) may discover particular event execution sequences that may not be safe or effective (and which should not be executed on work day). A further useful analogy for comprehending the potential effectiveness of employing the RTWP construct within an ESBT embodiment may be that of a pilot filing a flight plan in advance of a planned flight. Yet another useful analogy may be that of pilots testing such advance flight plans in the context of simulated real flights as these may be practiced in a flight simulator.

In such RTWP mode of operation of an ESBT embodiment, therefore, and analogous to the filing of an aviation flight plan with a regulatory body such as the FAA, actual event sequences occurring during the course of, say, Day-(n), may be evaluated in real (or near-real) time against planned event sequences (e.g., as received by an SCR database and as declared by support enterprises in the form of registered term work plans, or RTWPs, filed on Day-(n−1) and pertaining to Day-(n)). Also in such manner, the RTWP mode of an ESBT embodiment of the SCR system and method may enable comparison of as-executed events and event sequences with as-planned events and event sequences—in addition to other nature of event sequence matching as herein described, e.g., event sequence matching to test for: known dangerous sequences, as benchmarks in the KDS library 2904; suspect or uncertain sequences, as benchmarks in the SUS library 2906; and acceptable or preferred sequences, as benchmarks in the APS library 2908. The ability to evaluate both planned task events and event sequences against actual event execution and actual event execution sequences, as well as against other nature of event sequence benchmarks as herein described, may have significant predictive and other informational value to enterprises such as those herein described in the exemplary, hypothetical instance of the ACME Oil Company ABC oil well project.

Thus, the foregoing descriptions and FIGS. 17 through 29 have described manners in which actual event sequence data (shown as data included in event chains 2404 and as event sequence data 2408 in FIG. 24) may be processed against libraries of benchmark event sequences such as ESLs with an event sequence analyzer, ESA, and using a plurality of forms of SCR back testing algorithms such as the algorithms KDS, SUS, and APS as illustrated in FIG. 28. An objective of data manipulation, processing, and communications of such actual and benchmark event sequence data may be the searching, sorting and classifying of such data, whereby may be discovered particular sequence matches (e.g., matches between actual and benchmark sequences), and other data patterns, that may be categorized in a plurality of categories, for instance, in the categories of 'critical,' 'suspect,' and 'acceptable,' as illustrated in FIG. 29. Described next are means and methods by which event sequence and transaction data (illustrated as elements 2408 and 2410 in FIG. 24) may be processed via data mining algorithms and statistical tools for purposes in addition, or complementary, to the event sequence matching purposes herein described. Exemplary modes of operation of an ESBT embodiment, as herein described, each employ the event and sequence back testing, or ESBT, chain mode, shown as 804 in FIG. 8.

As illustrated in FIG. 24, objective analytical records, OARs 2406 may be stored as event sequence and transaction data 2410 within an SCR database 220, whereby raw data first may be received by a data aggregation device 1006 such as a SharePoint server or other device, functioning in an ESBT embodiment structured as herein described and as illustrated in FIGS. 8 through 14. As illustrated in FIG. 14, OARs 1402 may be formed from one or a plurality of sequence event chain 1406 data sets, wherein each such event chain 2404 may include data pertaining to: i) a particular event's sequence in execution, that is, an event's temporal executional sequence in relation to the times of execution of other such particular events; ii) event transaction data, such as quantitative or qualitative test or measurement results taken and recorded in connection with an event's execution; and iii) other nature of data. Event sequence data (e.g., On/Off, Operable/Inoperable status) may be categorical in nature, e.g., binary or classification names, but also may include continuous form data, for instance, wherein a system user may choose to designate the operating status of rotating equipment used in operating a drill pipe string both in binary terms (e.g., On/Off or Yes/No) and also with continuous form data, e.g., the revolutions per minute, or RPM, at which a pipe string is rotating at a particular time. Transactional event data, on the other hand, may often be of a continuous data type (e.g., a flow rate of drilling mud in gallons or kilograms per minute or a down hole pressure in pounds per square inch), but also may include data of a categorical type such as the name of a shift foreman heading a particular drilling crew executing a particular drilling event.

As earlier herein described and illustrated with FIG. 24, event sequence and transaction data 2410, as derived from a plurality of objective analytical records, OARs 2406, may be loaded into a sub-module included in an SCR data analysis module (510), as shown in FIGS. 5, 6, which sub-module may contain data mining algorithmic and statistical tools 2412— also herein referred to as a 'data mining and statistical tools' module or simply as a 'DMST' module. One purpose of such DMST module 2412 is to enable data mining and statistical analyses of event and sequence transaction data 2410 (and including both continuous and categorical data types), whereby such analyses may be directed by system users toward purposes different than those purposes herein described for operation upon only event sequence data 2408 within an ESA. As herein described, such operation upon only such event sequence data 2408 may include: manipulation of such data by use of SCR back testing algorithms that may evaluate actual versus benchmark event sequences; and performance of searches for particular instances of matches (or mismatches) between such actual and benchmark event sequences, whereas processing of both event sequence and transaction data 2410 may entail additional operations than those performed on only event sequence data 2408.

Figure 30:
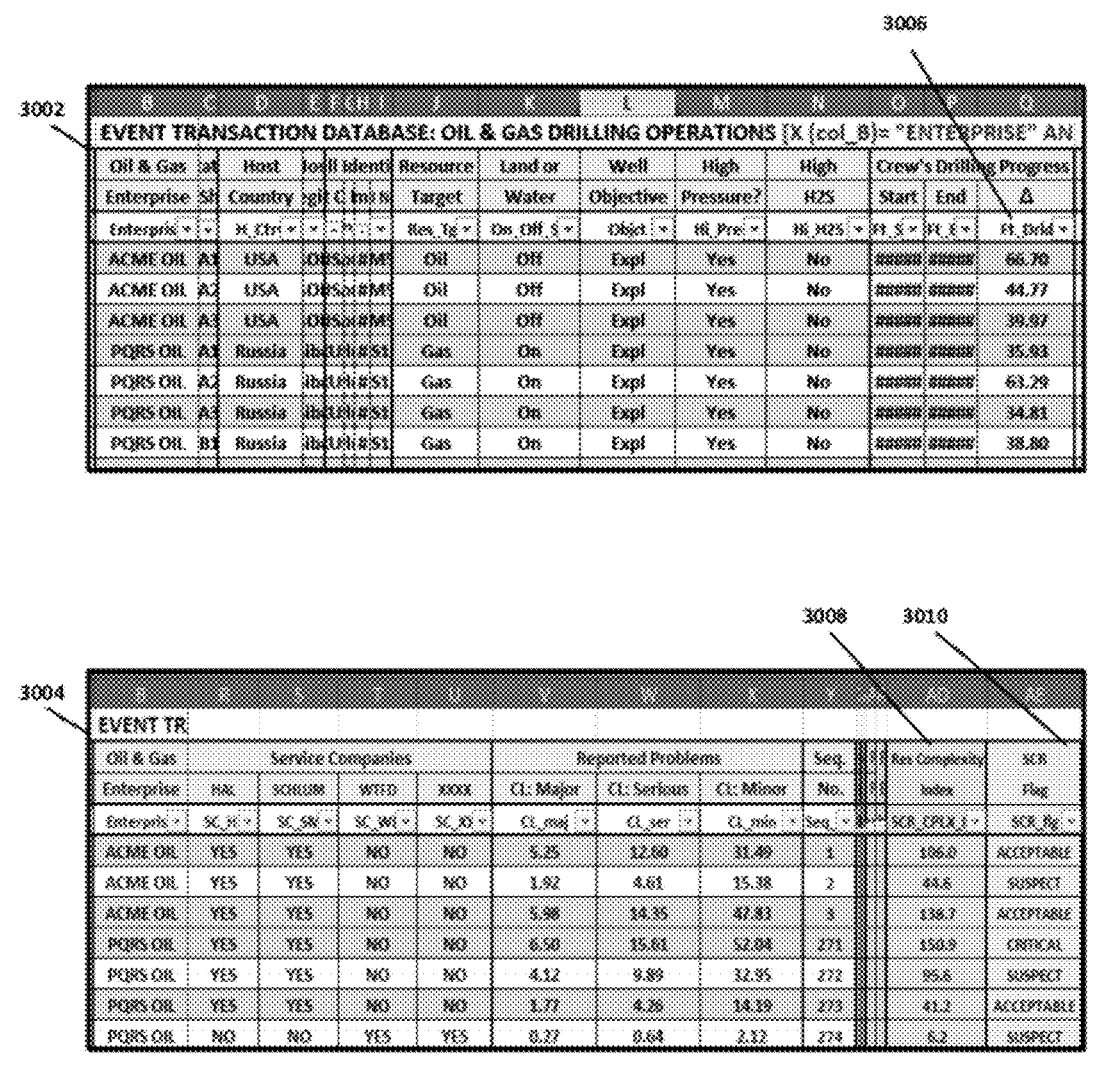

Following are descriptions of: the exemplary nature of such event sequence and transaction data (e.g., data as illustrated in element 2410 in FIG. 24); how such exemplary data may be evaluated within a DMST module 2412; what exemplary nature of data output derived from such manipulation of event sequence and transaction data may be observed as data views; and, how such data output and data views may be used by system users and others. Some aspects of some of the following descriptions continue with the illustrative, hypothetical ACME Oil Company ABC oil well project (as herein described) as an exemplary instance of implementing a DMST module within an ESBT embodiment of the SCR system and method, whereby: FIG. 30 illustrates (hypothetical) exemplary data received by a DMST module shown as element 2412 in FIG. 24), that is, exemplary data input to a DMST module; and FIGS. 31 through 34 illustrate exemplary data output such as that which may be returned to users from a data analysis module via the means illustrated in FIG. 6 and including via a DMST module, which may be included in an SCR data analysis module (510).

Referring both to FIGS. 24 and 30, elements 3002, 3004 (in FIG. 30) are screen shots of data tables that may be created in an SCR database 220 (in FIG. 24), whereby: objective analytical records, OARs 2406 may be formed from data contained in a plurality of event chains 2404, as data 2402 included in such event chains are received by a data aggregation device. As earlier herein described, such OARs 2406 constitute the data domain named event sequence and transaction data 2410 such OARs data included in such data domain may be loaded into a DMST module 2412, which module may be included in an SCR data analysis module (510) via employment of data management tools and systems that perform data extraction, transformation and loading, or ETL, functions; and such OARs data may be processed in the DMST module with one or a plurality of systems, including systems of data mining algorithms and statistical tools. In addition, proprietary algorithms also may be used for particular data analyses, as later below described.

Data may be received by an SCR database via data entry forms, such as data entry form 1802 as illustrated in FIG. 18. This instance of a data entry form is the same in layout (e.g., in the listing of data attributes or fields which may be selected by a system user and populated with data) as data entry form 1702 (illustrated in FIG. 17) with the following exception. While data entry form 1702 includes exemplary data pertaining to an event transaction, data entry form 1802 includes data entered into fields both for event status and for a particular event transaction. In the exemplary instance of a data entry form shown in FIG. 18, an event status of 'Conclude Event' is indicated, and an event transaction 1804 is also indicated, e.g., an event execution named 'Perform ESBT Updates' with event ID of '100001.'

As illustrated in FIG. 30, event transaction data may be received by an SCR database for a plurality of event transaction attributes. For instance, exemplary database table 3002 includes data input—e.g., data received by an SCR database as may be declared by a system user—pertaining to: an oil rig's 'Crew's Drilling Progress' 3006, whereby a downhole depth measurement may be taken and recorded (e.g., via a data entry form such as form 1802 shown in FIG. 18) both at the start and end of a crew's drilling shift and a computation derived therefrom in order to return a value for the number of feet or meters drilled by a particular drilling crew in a particular work shift. A plurality of other data input may be included in such a database table (as other data input may be received by an SCR database via data entry forms). For instance, data fields may be populated by a system user or another for data attributes such as: the name of an enterprise (e.g., PQRS Oil Company or ACME Oil Company) with whom a particular drilling crew is working; a host country in which work may be performed in drilling an oil or gas well (whereby each instance, or row, in table 3002, 3004 may pertain to a particular work crew's daily progress in drilling a particular well); whether a drilling target is 'oil,' 'gas,' or 'oil & gas'; whether the well being drilled may be classified as a high pressure well; and other attributes.

Attributes 3008, 3010 in data table 3004 are exemplary instances of a data attribute that may be constructed, or defined, by users of an ESBT embodiment. For instance, attribute 3008 is a (hypothetical) exemplary attribute—named 'Reservoir Complexity Index'—which may be a quantitative (and of continuous data type, in this instance) measure of the relative complexity of a particular hydrocarbon reservoir, e.g., a measure that may be computationally derived from a plurality of reservoir characteristics such as type of reservoir rock formation, internal reservoir pressure, water infiltration rates, and other attributes. For example, a value of such index attribute of 105 may indicate a highly complex hydrocarbon reservoir, and an index value of 5 may indicate low reservoir complexity. Values of such relative 'complexity index' may either be entered via a data entry form, such as form (1702) shown in FIG. 17, or may be derived from the values of other attributes contained in a database table. For instance, a value for attribute 3008, e.g., for a 'reservoir complexity index,' may be derived from values contained in other data fields such as those illustrated in columns 'V' through 'X' in table 3004. An example of such a derived value for an attribute is illustrated in column 'AE' of table 3004—e.g., in the form of an 'SCR flag' 3010, which may be computationally derived via operation of a user-specified algorithm such as that illustrated in FIG. 26, whereby such SCR flag 2620 obtains from manipulation of data contained in an SCR database via such an algorithm.

An interpretation of (hypothetical) exemplary data input included in database tables 3002, 3004 in FIG. 30 may be as follows, for example, with reference to the first instance, or case (row) listed in the tables: 'ACME Oil Company' is operator of a particular oil field at which a drilling crew is performing drilling tasks during a particular work shift (e.g., as described by a date and a shift classification such as first, second, or third shift); the hydrocarbon reservoir target is 'oil,' the well is 'offshore' within U.S. waters, and the well objective is 'exploration'; the reservoir or particular well is designated as 'high pressure,' but not as 'high $H_2S$'; the particular drilling crew accomplished '66.70' feet of drilling progress during its work shift (shown as shift 'A1' in column 'C'); 'Hal' and 'Schlum' are oil service companies engaged in supporting the drilling crew on the particular shift day; several problems were encountered, rated, and reported during the work shift, including in each of the problem categories 'major,' 'serious,' and 'minor'; a relative 'reservoir complexity index' of the reservoir targeted by the particular oil well is '106.0'; and the most serious SCR flag encountered during the crew's shift day indicated a flag condition classified as 'Acceptable,' signifying, for instance, that no 'Suspect' or 'Critical' SCR flags were returned (e.g., returned to system users or others via an SCR database system or data analysis module) during the particular work shift. The usefulness of information as may be reflected in an attribute such as 'SCR flag'—and other nature of derived attribute values, as may be computed within a data analysis module—is described next and with FIGS. 31 through 34.

Figure 31:
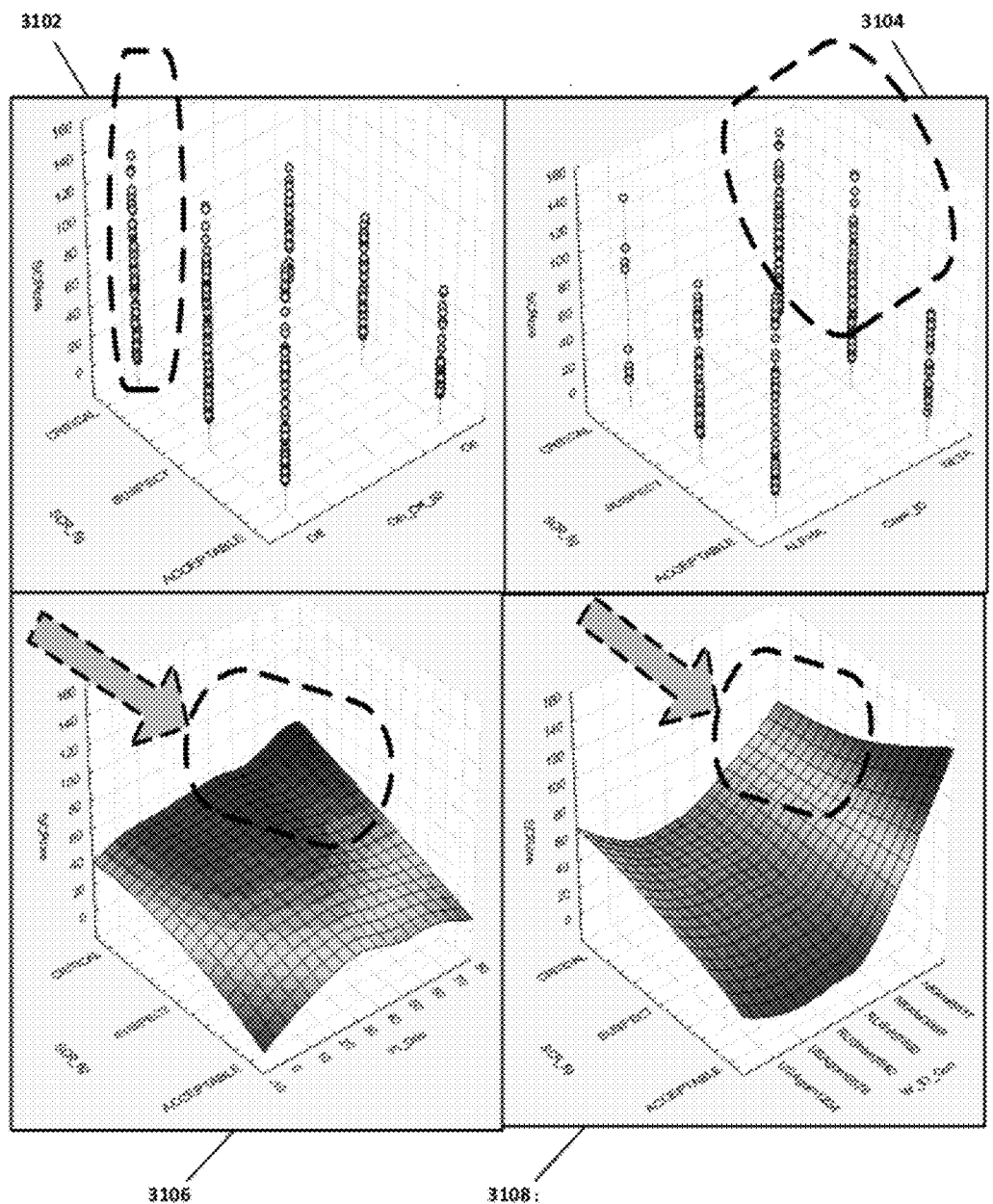
FIG. 31 illustrates an embodiment of data output generated via an exemplary data mining algorithm.

FIG. 31 illustrates data output generated (from data input) via an exemplary data mining algorithm, for instance an algorithm as may be included in the Statistica software vended by StatSoft, which may be included as (or within) element within a data analysis module, as shown in FIG. 24, whereby data mining software (and/or statistical tools) operate on event sequence and transaction data. For example, input data such as represented in tables 3002, 3004 in FIG. 30 exemplify instances of such event sequence and transaction data.

Figure 32:
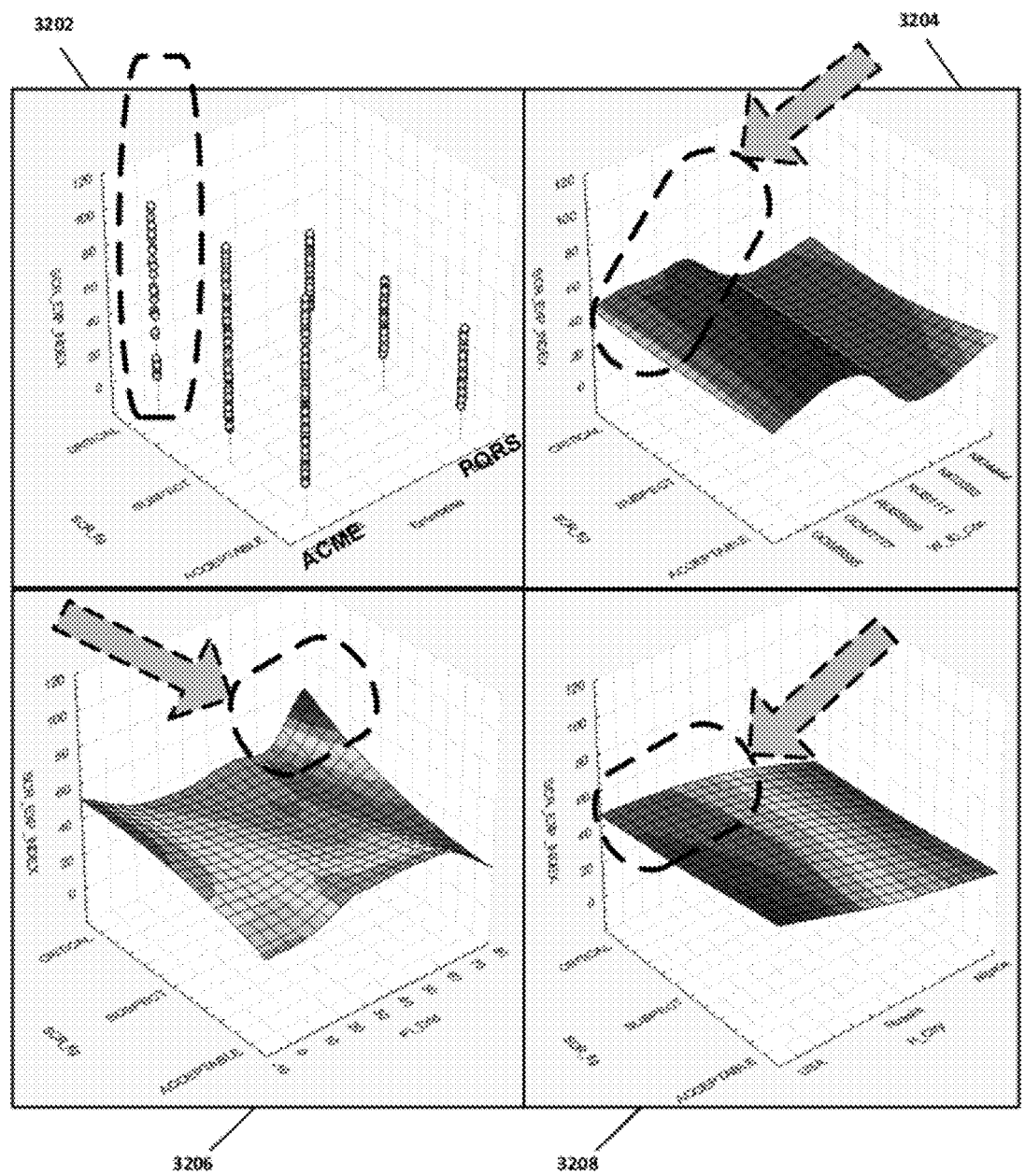
FIG. 32 illustrates yet another embodiment of data output produced by the systems and methods disclosed herein.
Figure 33:
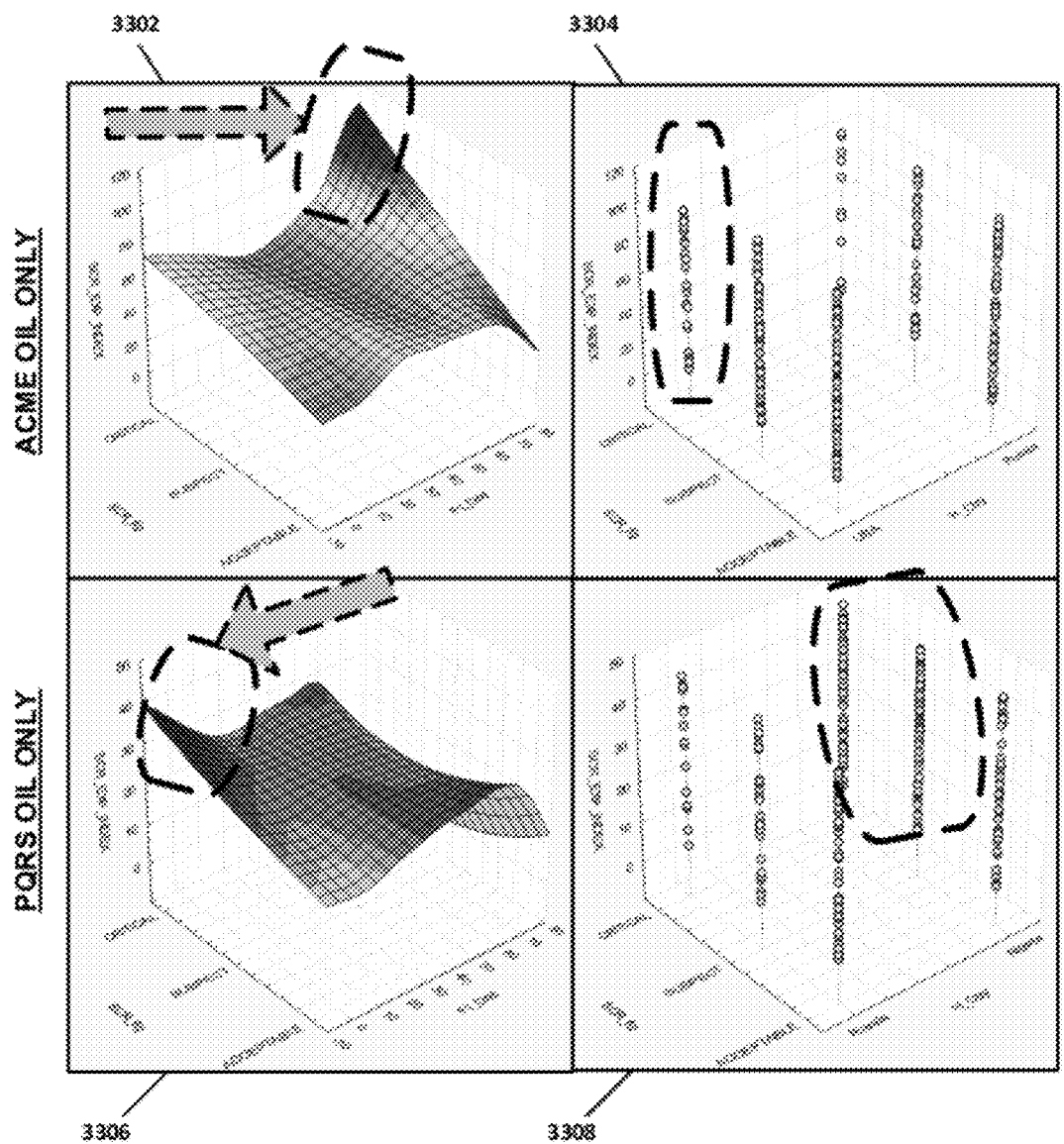
FIG. 33 illustrates another embodiment of data output that may be produced by the systems and methods disclosed herein.
Figure 34:
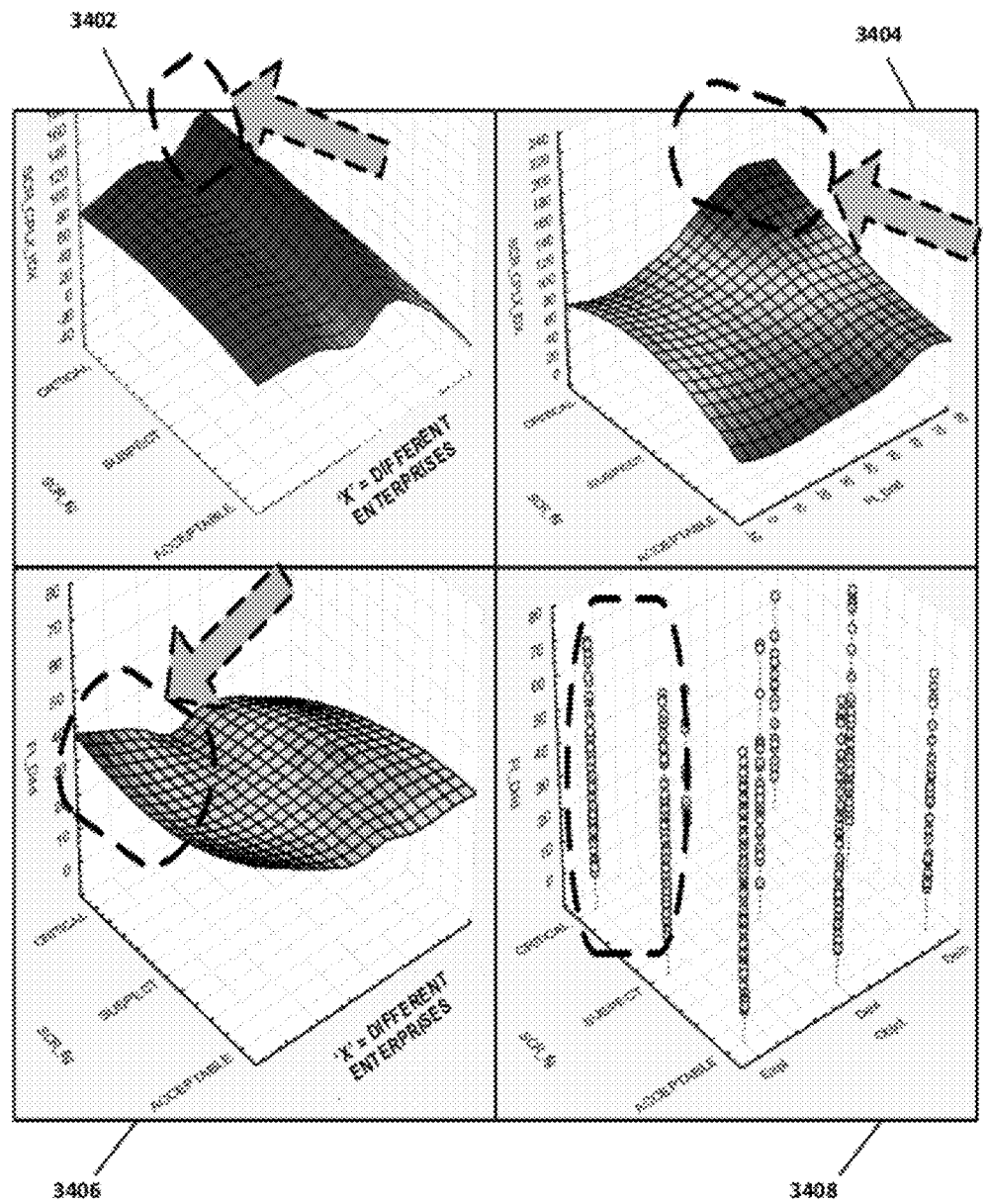
FIG. 34 is yet another embodiment of data views that may be produced by systems and methods disclosed herein.

Four sets of such exemplary data output 3102, 3104, 3106, 3108 are illustrated in FIG. 31. Such data output are generated (e.g., from data input such as that illustrated in FIG. 30), via StatSoft's Statistica software (as one exemplary instance of data mining software) and shown as a particular type of data view, herein referred to as '3D surface plots.' (Additional exemplary data output, as shown in FIGS. 32 through 34 are also displayed as 3D surface plots.) The 3D surface plot construct may be selected, as one of many forms of exemplary data view, as a convenient visualization tool to aid a system user in viewing multi-dimensional data and in order to posit and understand relationships amongst more than two variables. In FIG. 31, all four data view examples are structured, for illustrative purpose, as follows: i) the vertical, or 'Z,' axis depicts a form of SCR score (shown as 'SCRore') as a dependent variable (of continuous data type), in this instance a variable, or attribute, that gives a measure of problems encountered by well drilling crews in connection with drilling an oil or gas well (for instance, as such measure may be computed as a weighted average of 'major,' 'serious,' and 'minor' problem categories, as illustrated in data input table 3004 in FIG. 30); the northwest/southeast projecting, or 'Y,' axis depicts another form of SCR score (shown as 'SCR_flg') as a second dependent variable, or attribute (in this instance, of a categorical data type), that illustrates for each case (row), or instance, of a drilling crew's shift-day activity whether any warning, or alert, flags were returned from an event sequence analyzer, or ESA (shown as element 1308 in FIG. 28), for instance (as illustrated in FIG. 29) SCR flags warning of event execution sequences that may be considered (as actual event sequences are evaluated against benchmark event sequences, as earlier herein described) as 'critical' 2916 or 'suspect' 2918 in nature, absent which an 'acceptable' 2920 SCR flag may be returned to signify that all event execution sequences performed during a particular crew's shift day are considered as acceptable in nature; and iii) the southwest/northeast projecting, or 'X,' axis depicts a variable, or attribute as an independent variable (of either continuous or categorical type data), wherein may be described one of a plurality of metrics, such as metrics as may pertain to a drilling crew's performance, the nature or classification of the hydrocarbon reservoir into which a well may be drilled, whether the drilling activity occurs on shore or offshore, and other such metrics. Thus, for all the exemplary instances (as shown in FIGS. 31 through 34 and as next described) of data output and data views, which may be returned via computation on data input as herein described: 3D surface plots are depicted as exemplary data views; the 'Z' and 'Y' axes in each such data view represent two dependent variables, or attributes, each of which may be of either continuous or categorical data type; and the 'X' axis in each such data view represents an attribute describing something about a drilling crew's activities, features, or other such attribute or about the circumstances pertaining to the environment or conditions in which well drilling activity may be taking place. The following descriptions exemplify 16 instances of multi-dimensional (specifically, 3-dimensional) data returned via a data analysis module operating in an ESBT embodiment wherein the three axes displayed in these data views are as just described. As will be apparent to an artisan of ordinary skill, a plurality of other forms of data views, and including a plurality of other attributes, may also be generated in a data analysis within an embodiment.

Data view 3102 in FIG. 31, for instance, employs for the 'X' axis an independent variable, or attribute (shown as 'On_Off_Sh') that differentiates between whether a well drilling crew may be executing events, or tasks, on an oil or gas (or combined oil/gas) well that is onshore or offshore. Therefore, the 'On_Off_Sh' attribute is an example of an independent variable that is of categorical data type (e.g., the binary, On/Off, as a set of two categorical designations, or classes, of where a particular instance of well drilling activity is occurring). The 'Z' and 'Y' axes in data view 3102 are as earlier described. Each circle (or dot) in data view 3102 represents one instance of a well drilling crew's shift-day activity, as a drilling crew executes a plurality of events such as those events illustrated in FIG. 19. (For all data views illustrated in FIGS. 31 through 34, a sample data set comprised of 540 instances of particular drilling crew shift-days was used, wherein each crew shift-day instance, or case, includes data that may describe: performance of such a crew's event execution during a particular work shift; circumstances within or surrounding the environment in which such crew executes a plurality of events; and other features or attributes. The exemplary set of 540 instances of crew shift-days may represent, for instance, 13,400 person-hours of work, based on an average of 20 personnel per work crew and 8 hours per shift.) An interpretation of data view 3102 may include, for instance, these observations: more of the exemplary 540 crew-shift instances occurred for wells being drilled offshore versus onshore ('X' axis) (with the corresponding, particular numeric data being viewable in other data views, which are not herein included); a relatively high level of 'critical' SCR flag alerts ('Y' axis) occurred in the offshore operating environment; and such 'critical' SCR flag alerts were distributed throughout the SCRore attribute value range ('Z' axis), that is, throughout a wide range of operating problem classifications as these may be measured by the SCRore attribute.

Another observation that may obtain from examining data view 3102 in FIG. 31 may be that the distributions of SCR flag alerts ('Y' axis) appears (e.g., visually as shown in a 3D surface plot data view) as being roughly proportionate for each class of SCR flag value (e.g., for the 'suspect' flag category) between onshore and offshore drilling activities ('X' axis) in comparison to the distributions for the other classes of SCR flag value. In such instance, additional examination of data may be required—also referred to as 'drilling down' into a data set—in order to gain a better understanding of multiple factors and their interactions, as next described.

Data view 3104 in FIG. 31 includes the same 'Z' and 'Y' axes as displayed in data view 3102, but includes a different attribute, as the independent variable, for the 'X' axis, viz., a categorical attribute showing two classifications (e.g., 'Alpha' and 'Beta'), one of which may be assigned to each instance of particular drilling crew. (For example, classification 'Alpha' may signify a measure of average years' experience or qualification level for a particular drilling crew as being 'high experience,' while 'Beta' may signify a 'low experience' attribute value as an average experience rating for a particular drilling crew.) Visual inspection of exemplary data view 3104 may suggest, for instance, that a relatively high level of 'critical' and 'suspect' SCR flags ('Y' axis) are returned for the 540-instance analysis for instances in which drilling crews classed as 'Beta,' signifying, for instance, that more 'critical' and 'suspect' SCR flags are returned for drilling crews rated with a 'low' (versus 'high') average experience rating. Further observation, in this exemplary data view 3104, that very few 'critical' SCR flags were returned for 'Alpha' drilling crews (with 'high' average experience rating) may support a conclusion that 'Beta'-rated drilling crews are more likely to have a higher incidence of 'critical' and 'suspect' SCR flags returned, signifying, for instance that 'Beta' drilling crews execute more event (or task) sequences, which when analyzed in an event sequence analyzer, or ESA, against benchmark event sequences, are found not to be 'acceptable' sequences of task execution. Such observations made from data evaluated as herein described, for instance, may lead company management to identify particular groups or subgroups of personnel (e.g., personnel on 'Beta'-classed drilling crews with a 'low' experience rating) that require additional training in order to reduce the incidence of 'critical' and 'suspect' SCR flag warnings issued in connection with event execution by those drilling crews.

Referring to the exemplary instance herein described for ACME Oil Company's hypothetical ABC well project, if information of the nature described in data view 3104 in FIG. 31 had been available and viewable by ACME Oil Company's (or other companies') management or others, remedial action (e.g., increased training) may have been identified as necessary for particular drilling crews or for particular personnel in order to mitigate the high incidence of 'critical' and 'suspect' SCR flags indicated for 'Beta'-classed drilling crews. For instance, for the scenario just described—and referring to data view 3104—the drilling crew(s) working on the hypothetical Broad View platform on ACME Oil Company's ABC well during the day and night of 20 Aug. 2009 may have been rated in a 'Beta'-class of experience. With the exemplary relationships illustrated in data view 3104, management may have had the opportunity (if such data view had been available prior to the date of the ABC well's hypothetical blowout on 20 Aug. 2009) to have afforded 'Beta'-class drilling crews to be better trained, whereby, for instance, methods of avoiding event sequence execution errors are taught. If such training (e.g., focusing on event sequence execution), hypothetically, had been made available to the drilling crews employed on the hypothetical Broad View rig during 2009—and/or if an ESBT embodiment had been in operation on the Broad View rig— the particular sequence, or chain, of events that (hypothetically) occurred on that rig may have been avoided, and the highly adverse consequences emanating from the (hypothetical) loss of the Broad View vessel also may have been avoided.

Data view 3106 in FIG. 31—with the same 'Z' and 'Y' axes as described for data views 3102, 3104—suggests, in the same exemplary instance herein described, that a relatively high incidence of 'critical' SCR flags are returned for instances in which higher (rather than lower) number of feet drilled (e.g., 'Ft_Drld' on the 'X' axis, as independent variable with continuous data type) are recorded. For instance, such informed observation, based on data views enabled by a DMST module in an ESBT embodiment, may suggest that management should investigate work practices of drilling crews that execute relatively high extent of drilling accomplishment (e.g., as measured by feet drilled per shift day) because such drilling crews are also found (in this exemplary case) to have relatively high levels of SCR 'critical' flag incidence ('Y' axis) as well as higher problem incidence as measured by the SCRore problem index ('Z' axis). Data view 3106, for instance, quantifies and visualizes the adage of 'haste makes waste,' wherein, for example, the high performance on the feet-drilled attribute, or metric ('X' axis), corresponds both to a high degree of SCR 'critical' flag warnings ('Y' axis), indicating problems in maintaining desired event execution sequence, and to a high SCRore 'problem' index ('Z' axis). The intersection of these three exemplary metric values (or value ranges) is represented in data view 3106 by the dashed oval-shaped line. That is, the section of the 3D surface plot in data view 3106 that tips upward (to the north) in the back corner of the plot represents a conjunction of drilling crew shift instances wherein all of the following metrics may be observed: high levels of feet drilled during crew work shifts ('X' axis); high levels of 'critical' SCR flag warnings ('Y' axis); and high levels of SCRore ('Z' axis). The confluence of these high levels of three separate metrics may suggest that drilling crews that tend to exceed a certain mean level of feet drilled per shift (or like metric) also tend to experience higher than average levels of both drilling problem occurrences and 'critical' SCR flag warnings.

Data view 3108 presents on the 'X' axis, as independent variable, each particular well, wherein, for instance, the 540 drilling crew shift days (e.g., the 540 drilling crew shift cases used in the exemplary, hypothetical sample) are presented each in relation to the particular oil or gas well on which each drilling crew works. For instance, the 'X' axis portrays two particular wells as situated in each of the USA (for instance, as denoted by the particular well ID, 'USA'), Russia ('Rus'), and Nigeria ('Nig'). (For instance, of the 540 drilling crew shift days, 90 shift days may be crew shift cases for each of the six exemplary wells.) This data view 3108 presents a multi-dimensional data analysis that suggests, for instance, that, of the three countries and six wells evaluated within an ESBT embodiment, wells on which drilling crews work in Nigeria (the two right-most instances on the 'X' axis) have associated with them relatively higher returns of 'critical' level SCR flags as well as relatively higher returns for the SCRore metric (which treats, illustratively, with problems reported during particular drilling crew shifts). Management—for instance, management of a single enterprise that is responsible for all six of the wells depicted in data view 3108—may take an informed decision that event execution sequence is a significant problem for wells being drilled in Nigeria and that remedial action may be warranted for Nigerian drilling crews in order to reduce both the incidence of SCR 'critical' flags ('Y' axis) and the incidence of reported problems ('Z' axis). An example of such an informed decision, based on such exemplary data, may be that management determines to transfer selected personnel from operations in the U.S. and/or Russia, where lower incidence of both critical warnings and SCRore performance are observed, to Nigeria in order to provide additional training to personnel in Nigeria.

Data views 3202, 3204, 3206, 3208 in FIG. 32 continue with the 'Y' axis as illustrated for data views in FIG. 31, whereby the 'Y' axis in both figures is represented as the dependent variable of SCR flags (e.g., as this variable may indicate an instance in which a particular drilling crew, in a particular work shift, may have encountered: at least one 'critical' SCR flag; no such 'critical flags but at least one 'suspect' flag; or no 'critical' or 'suspect' flags and only 'acceptable flags'). The 'Z' axis for data views in FIG. 32 is modified (versus the 'Z' axis in FIG. 31), whereby an 'SCR_EXP_INDEX' is employed (hypothetically) to rate, or score, the relative drilling crew experience for all crews. For instance, 'SCR_EXP_INDEX' may be a metric showing the average years' work experience of all personnel included in a particular drilling crew. The 'X' axis of data views in FIG. 32 varies as amongst the four data views shown, but in each data view is a form of independent input variable. Thus, in these four exemplary data views in FIG. 32, the 'X' and 'Z' axes represent independent variables, or attributes. In these same data views, the 'Y' axis is a dependent variable, e.g., the 'SCR_flg' attribute, indicating the association of 'critical,' 'suspect,' and 'acceptable' flags—as these may pertain to warnings or alerts indicative of particular nature of event execution sequences. Thus, the 'Y' axis is a variable, or data attribute, whose value is dependent on values of the two independent variables of the 'Z' and 'X' axes. These data views present exemplary (hypothetical) data pertaining to oil and gas well drilling operations of two illustrative enterprises, PQRS Oil Company and ACME Oil Company, wherein are combined the respective data of these two enterprises. (The number of instances of drilling crew shift days may be assumed, for illustrative purposes, to be the same—specifically, 270 instances for each of enterprise PQRS Oil Company and enterprise ACME Oil Company. While data view 3202 appears to suggest that ACME Oil Company, in the exemplary analysis, has more total instances than PQRS Oil Company, this may be due to the higher density distribution for the exemplary PQRS Oil Company cases, e.g., to the higher concentration of average drilling crew experience within the lower numbers of the exemplary index, 'SCR_EXP_INDEX,' as compared to instances for ACME Oil Company.)

Data view 3202 in FIG. 32 illustrates (hypothetically) that enterprise ACME Oil Company returns SCR flags of 'critical' value (as a categorical data type) across a wide range of drilling crew experience as rated by the 'SCR_EXP_INDEX'

(on the 'Z' axis), potentially suggesting, for instance, that the incidence of 'critical' SCR flag warnings (e.g., warnings of critical event execution sequence errors) extends throughout the (continuous data type) scale of average crew work experience. Exemplary data in data view 3202 also may suggest that average crew work experience of PQRS Oil Company's drilling crews is about half that of ACME Oil Company's drilling crews and that ACME Oil Company's incidence of 'critical' SCR flags is distributed throughout a wide range of its measured drilling crew work experience.

Data view 3204 is similar to view 3202, but with the independent ('X' axis) variable, or attribute, being the name or ID of particular wells drilled by several oil companies. One observation of information reflected in this 3D surface plot—e.g., a plot showing relationships amongst the three indicated variables—may be that the two wells containing 'GOM' in their unique IDs (e.g., standing for 'Gulf of Mexico') had the highest (of sample) incidence of 'critical' level SCR flags and were drilled by relatively more experienced drilling crews, e.g., as indicated by the 'Z' axis. Relational information such as this—as may be gleaned by application of data mining algorithms, contained in a DMST module of an ESBT embodiment—may be useful to management of an enterprise in the well drilling business that wishes to improve its operational performance by reducing event execution sequence errors as a way to improve operational safety and control.

Data view 3206 illustrates relations between feet drilled (Ft_Drld') on the 'X' axis as an independent variable with the same two factors, or dimensions, on the 'Y' and 'Z' axes as illustrated in data views 3202, 3206. An interpretation of this data view, for example, may be that drilling crews with higher levels of average experience ('Z' axis) drilled higher numbers of feet per day (X' axis) than did drilling crews with less experience but also incurred a higher level of cautionary (critical') SCR flags ('Y' axis). Such pattern of data may suggest, for instance, that, for the two exemplary enterprises (PQRS Oil Company and ACME Oil Company) illustrated in FIG. 32, more experienced drilling crews achieved higher daily drilling productivity (measured here as feet drilled per crew shift day) than did less experienced crews but at the risk of incurring a higher proportion of 'critical' SCR flag warnings, indicating (for instance) that more event execution sequence errors are also incurred by the more experienced crews. Such information may be useful to management in considering trade-offs between drilling productivity, operations control and event sequence risk.

Data view 3208 is similar to data view 3204, but with host country ('H_Ctry'), on the 'X' axis, substituted for individual well instances. This data view, for instance, may suggest that, while drilling crews operating in the USA have higher average experience levels than those operating in either Nigeria or Russia, the U.S. crews also experience higher levels of 'critical' SCR flag warnings. Again, as with data views 3204, 3206, such outcome may suggest a possible connection, or correlation, between drilling crews' experience rating and the incidence of 'critical' SCR flag warnings, which may be an indication of such 'experienced' crews taking added operational risk in performing their tasks—e.g., 'swinging for the fences.' Such exemplary findings, as those illustrated in FIG. 32, may provide enterprise management with knowledge that may be used to take corrective actions in order to reduce operational risk. For instance, if an ESBT embodiment had been operational for the exemplary ACME Oil Company's hypothetical ABC well project—and had also been operational in projects prior to the ABC project, such that a body of domain knowledge had been established (for instance, domain knowledge relating drilling crew experience to relative levels of event sequence errors as may be scored by the 'SCR flag' metric)—it may have been possible for ACME Oil to predict operational risks associated with particular drilling crews or combinations of drilling crews. Such capability to predict may have enabled avoidance of the hypothetical ABC well blowout and the assumed Broad View drilling rig disaster.

FIG. 33 presents four additional data views 3302, 3304, 3306, 3308—the top two views pertaining to (hypothetical) data for drilling crews engaged by ACME Oil Company and the bottom two views, with data for drilling crews engaged by PQRS Oil Company. Thus, these two pairs of data views, for instance, may correspond to data views 3202 and 3206 in FIG. 32, whereby the latter may pertain to aggregated data for both a plurality of enterprises (e.g., combined data for PQRS Oil Company and ACME Oil Company in FIG. 32) and the former, to disaggregated data (e.g., for PQRS Oil Company and ACME Oil Company separately). Such capability of creating different levels, or granularity, of data are a common feature of many data mining, deep statistical analysis and online analytical processing, or OLAP, software systems. For instance, the more granular data presented in data views 3302, 3306 in FIG. 33—as contrasted with the less granular data presented in data view 3206 in FIG. 32—may suggest that drilling crews with relatively high levels of average experience ('Z' axis), high performance as measured by feet drilled ('X' axis) and working for enterprise ACME Oil Company (data view 3302) (hypothetically) incur particularly high levels of 'critical' SCR flag alerts ('Y' axis), but that for PQRS Oil Company (data view 3306), the drilling crews that incur higher levels of 'critical' SCR flag warnings are those with moderate experience levels (as compared to those for ACME Oil Company) and low drilling productivity. Such granular, comparative data may be of interest not only to particular operating enterprises, such as PQRS Oil Company and ACME Oil Company, but also to regulatory entities, for instance, to the U.S. Bureau of Ocean Energy Management, Regulation and Enforcement, which has certain oversight responsibilities for offshore oil and gas drilling in the United States (and which supplanted the U.S. Minerals Management Service, or MMS, in mid-2010).

Data views 3304, 3306 in FIG. 33 illustrate additional data patterns that may be observed through operation of a DMST module included in an ESBT embodiment. For instance, data view 3304 may suggest that drilling crews working for ACME Oil Company in the USA—across a wide range of experience ratings ('Z' axis)—encounter a relatively high level of 'critical' SCR flag warnings, whereas ACME Oil Company's crews working in Russia encounter relatively few such 'critical' SCR flag warnings (at all levels of crew experience rating). Similarly, data view 3308 may suggest that PQRS Oil Company's drilling crews operating in Nigeria (on 'X' axis) are responsible for a majority of SCR flags at the 'critical' and 'suspect' warning levels, whereas PQRS Oil's crews in Russia encounter relatively fewer occurrences of 'critical' and 'suspect' SCR flag warnings. Again, such information may be useful in aiding management to search for and find areas in which risk may be reduced and where operations control may be improved. As will be apparent to an artisan of ordinary skill, measures other than those shown in the illustrative data views in FIGS. 31 through 34 may also be examined within a DMST module in an ESBT embodiment. For instance, in addition to evaluating risk factors via an ESBT embodiment, measures of operational profitability and productivity may be evaluated in multi-dimensional, multi-granular manners.

Data views 3402, 3404, 3406, 3408 in FIG. 34 are similar to other data views shown in FIGS. 31 through 33, but with the 'Z' (vertical) axis (in data views 3402, 3404) representing an illustrative SCR score pertaining to hydrocarbon reservoir complexity, where such score or index herein is also referred to as 'SCR_Cplx_Idx' or SCR complexity index for reservoir complexity. The four data views in FIG. 34, illustratively, refer to data combined for a plurality of unnamed enterprises as shown on the 'X' (independent variable) axis.

Amongst these illustrative enterprises, some are (hypothetically) shown as experiencing the highest relative level of 'critical' SCR flags ('Y' axis), particularly in situations where hydrocarbon reservoir complexity ('Z' axis) is high. Such measured outcome, as may be afforded by operation a DMST module in an ESBT embodiment, for instance, may (hypothetically) suggest that certain oil companies experience relatively high levels of 'critical' SCR flag warnings. On the other hand, some enterprises are shown in data view 3402 to operate in environments with relatively low reservoir complexity and also to have a low incidence of 'critical' SCR flag warnings. As will be apparent to an artisan of ordinary skill, attributes measured and displayed in ESBT embodiment-enabled data views such as those illustrated in FIGS. 31 through 34 may employ either or both absolute or relative values.

Data view 3404 may suggest that the incidence of 'critical' SCR flag warnings ('Y' axis) is highest for a sample set of cases when drilling crews execute high levels of drilling productivity (as may be measured by the feet-drilled metric, shown on the 'X' axis) and when drilling into relatively more complex hydrocarbon reservoirs ('Z' axis). Data view 3406 may suggest that certain oil companies encounter relatively higher levels of 'critical' SCR flags when crews are operating at higher levels of feet drilled per crew shift day ('Z' axis). Data view 3408 may suggest the highest levels on 'critical' and 'suspect' SCR flag warning incidence occur when the drilling objective is 'exploration' ('X' axis) as compared to lower incidence levels for wells drilled when the drilling objective is that of 'development' or 'delineation' drilling. Such findings, for instance, may be consistent with the common observation that knowledge about hydrocarbon reservoirs is nearly always lower at the exploratory stage of reservoir exploitation and higher at the development and delineation stages of exploitation.

Figure 35:
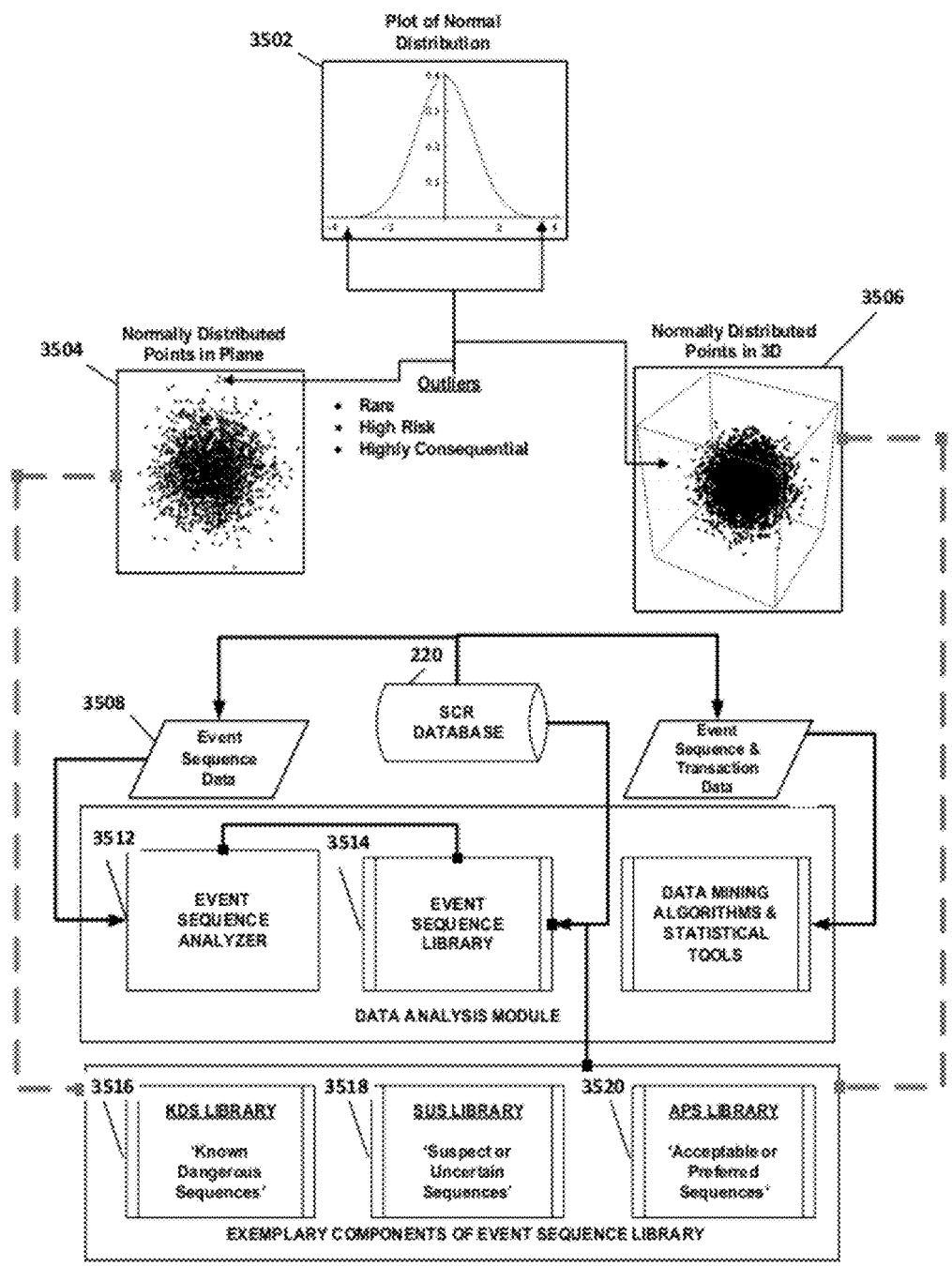
FIG. 35 illustrates an embodiment of three different views of the mathematical function pertaining to a normal distribution.

A particular benefit of implementing an ESBT embodiment of the SCR system and method is ability to assist an enterprise in keeping track of sequences in which events are executed, followed by back testing of such actual sequences of event executions against a library, or set, of event execution sequences that may be known in advance to be either 'safe' or otherwise 'problematic' in some respect. Earlier herein an exemplary instance of implementation of an ESBT embodiment is described with respect to the instance of the hypothetical ABC oil well blowout, which is assumed to have occurred while ACME Oil Company was responsible (as field operator) for execution of a plurality of events that, in aggregate, may be viewed as events associated with the drilling and completion of such a hydrocarbon well—in this instance, in deep U.S. waters in the Gulf of Alaska. FIG. 35 illustrates (top portion of this figure) the nature of probabilistically distributed events (e.g., as a normal or Gaussian distribution), such as events or tasks that may be executed in conjunction with the drilling and completion of an oil or gas well in the Gulf of Alaska or elsewhere. One manner of viewing such distribution of event executions is next described, as such event distribution may be analyzed (via an event sequence analyzer, contained in an ESBT embodiment) with reference to an a priori established set, or library, of particular events and event sequences that may be of interest to system users.

Charts 3502, 3504, 3506 in FIG. 35 illustrate three different views of the mathematical function known as a normal distribution, also commonly referred to as a Gaussian distribution, including views showing, respectively, an X/Y plot of such a distribution, a two-dimensional representation of the discrete instances (points) in such a distribution, and a three-dimensional view of the same. A common example of such normal, or Gaussian, distribution, for instance, may be the distribution of heights or weights of all males born in a particular country and of all ages of such males. Another such example may be the distribution of the number of times that a particular nature of event is executed by a drilling crew in connection with drilling oil or gas wells. For instance, there may be observed a normal distribution—or other nature of distribution, such as a power law distribution—for the number of distinct times that well drilling crews are observed to start or stop a particular event execution, for instance, for the event 'commence (or cease) injection of drilling fluid into well bore.' The following descriptions continue with the hypothetical oil well drilling example—such as the example herein described for drilling of ACME Oil Company's ABC hypothetical oil well in the Gulf of Alaska—to describe the manner in which distributions of events and event sequences may be analyzed via an ESBT embodiment and applied toward reducing risk in operations such as offshore and onshore well drilling.

The distributions illustrated in charts 3502, 3504, 3506 in FIG. 35 may be considered as distributions of event sequences (rather than as distributions of discrete event executions, as just illustrated in the preceding paragraph). That is, each dot in the two- and three-dimensional distribution views and each point in the distribution chart view may represent a particular sequence of event executions. For instance, a particular dot or point may represent a particular sequence in which two events are executed—e.g., the particular sequence of: {(1. Test downhole pressure in well bore)—(AND THEN)—(2. Commence injection of drilling fluids into well bore)}. For illustration, it may be assumed, for instance, that such a sequence of these two exemplary events may be considered by management of an oil drilling enterprise to be a 'safe' or 'desired' sequence in which these two exemplary events preferably should be executed (e.g., executed by a drilling crew). Further, it may be assumed, for illustration, that such a sequence would be considered as 'unsafe,' 'undesired,' or 'critical' if executed in the reverse order—that is, in this exemplary instance, by first commencing injection of drilling mud or other drilling fluids into the well bore, followed by testing downhole pressure in the well bore.

One or a plurality of domain specialists (sometimes referred to as 'experts') may create one or more lists of a plurality of such a priori event sequences—for instance, a plurality of event sequences that are known or believed to be 'acceptable' sequences; other such lists for 'suspect' sequences; and still other such lists for 'critical' sequences, e.g., for the sequence just above described as: {(1. Commence injection of drilling fluids into well bore)—(AND THEN)—(2. Test downhole pressure in well bore)}. For instance, such sequence may be considered as 'critical' (e.g., warranting an SCR flag of 'critical' level, as illustrated in FIG. 29) because safe well drilling practice may require that downhole pressure in a well bore first be checked (and, perhaps, validated against a particular range of 'safe' pressures) before commencing injection of drilling fluids into the well bore. Assembly of a set of such event sequences, e.g., for a set of event sequences ranging from 'safe' to 'highly dangerous,' or otherwise, may represent what commonly is referred to as domain knowledge. That is, based on input from a plurality of experts and others (e.g., from experienced well drilling managers, foreman, and roustabouts), domain knowledge may be created for a plurality of particular event sequences, where each such event sequences may be assigned a categorical (or, alternatively, a continuous type) classification.

Referring to FIG. 35, a set of such domain knowledge—in this exemplary instance, domain knowledge treating with event execution sequences for a plurality of events executed, or which may be executed, in connection with oil well drilling—may be viewed as comprised of a set of discrete dots (in distribution views 3504, 3506) or discrete points (in distribution chart 3502), whereby such entire set may represent the combined knowledge of one or a plurality of domain experts with respect to multi-event execution sequences.

Such set or sets of domain knowledge—e.g., of a plurality of particular event execution sequences that may be stored in an SCR database 220 and loaded into an event sequence library 3514—represent the benchmark event sequences, as earlier herein described, that may be processed against actual event sequences, whereby such processing may occur in an event sequence analyzer 3512 contained within an SCR data analysis module. Further, such benchmark event sequences—e.g., as represented by the set of dots or points in the distribution views 3502, 3504, 3506—may be classified or categorized (e.g., by domain experts such as well drilling experts) into sub-sets of event sequences that may be grouped within sub-libraries such as the KDS library 3516, the SUS library 3518, and the APS library 3520.

Referring to FIG. 35, as particular, actual event sequences are executed, for instance, by drilling crews drilling an offshore well, actual event sequence data 3508 may be assembled in an SCR database 220 and loaded into an ESA 3512, by means as earlier herein described. Also as earlier herein described, the ESA 3512 may process each such actual event sequence against one or a plurality of event sequence libraries or sub-libraries 3516, 3518, 3520 by applying particular algorithms and, thereby, manipulate such data in a manner that enables determination of whether any undesired event sequences are being executed or are planned for execution.

Some particular event sequences may be considered, e.g. by domain experts or by others, as instances of event execution sequences: i) that are, or may be, rare in their occurrence (e.g., have a low probability of occurring), but which ii) are also considered as likely to be of high risk and high consequence (e.g., highly adverse consequence) if they do occur. Alternatively, such domain experts may be unable to estimate a probability for a particular event sequence occurrence in some rare instances, but still may be aware that such instance of occurrence may have highly adverse consequences if realized. For instance, in the exemplary case (herein described) of ACME Oil Company's, hypothetical well blowout and loss of the Broad View drilling platform, a particular sequence of event executions (hypothetically) may be shown to have existed, whereby: the sequence of {(1. Well cementing operations commenced)—(Prior to)—(2. Performance of operability tests on blowout preventer)} was observed. Such an event sequence as that just described may be considered an outlier, e.g., one that may be rare (e.g., low probability of occurrence), but also risky and highly (adversely) consequential if it does occur. Such rare, but highly consequential events—also, sometimes referred to as 'black swan' events—may be depicted in a distribution plot or graph as the outlying dots or instances, for example, the instances at the edges of the distributions shown in charts 3504, 3506 or at the tail ends of the distribution chart 3502. Alternatively, as described above, it may not be possible to compute a probability of certain rare events—for the very reason that such events are rare; also a plot of such event distributions may follow a pattern quite different from the normal distribution.

An ESBT embodiment, operating in a manner as herein described, has capability of detecting both such rare (and highly consequential) event sequences as well as other event sequences that may be less critical in nature—regardless of whether or not experts or anyone else are capable of estimating the occurrence probabilities of such event sequences. By enabling back testing of actual event sequences against benchmark event sequences, as herein described, an ESBT embodiment may enable return of information that can alert system users and others, such as regulators, to particular event sequences of highest interest, such as those that may be classified as 'critical' or 'suspect or uncertain' sequences. In such manner, an ESBT embodiment may enable return of event sequence information—such as that illustrated in FIG. 29, whereby 'critical' and 'suspect' SCR flags can be returned to users. In such manner, then, an ESBT embodiment—had it been in operation on the (hypothetical) Broad View drilling platform in August 2009—may have enabled avoidance of the hypothetical ABC well blowout. The SCR systems and methods, as may be implemented via embodiments of ESBT, therefore, can solve or contribute to a solution to the real world problems engendered by an improper sequencing of operational events in industrial and other applications.

Descriptions herein, with their accompanying illustrations, have addressed event execution sequences by means of using binary event executions, that is, by considering a particular sequence in which two particular events may be executed—both for actual event sequences and for benchmark sequences, whereby the latter (benchmark sequences) may be used for evaluation against actual sequences. As will be apparent to an artisan of ordinary skill, (n)-order event execution sequences may also be addressed by system users within an ESBT embodiment. For instance, order-3 event execution sequences may be employed. Both logically and in terms of data structure, such higher order event execution sequences may be constructed from a plurality of binary event sequences, as herein described.

An illustration is provided of a particular significance manifested in considering implications of avoiding, versus incurring, 'black swan events,' e.g., those such as ACME Oil Company's hypothetical ABC well blowout, with reference to the upper portion of FIG. 35. In considering a full range of impact (e.g., as may be measured by all-in, comprehensive cost analysis) over which an entire set of well drilling events may be executed—and the sequences in which such events may be executed—a plurality of domain experts may consider that a particular, improperly sequenced pair of event executions (such as that described above with the Acme Oil Company's hypothetical ABC well blowout) is extremely unlikely (and, perhaps, that its probability may not be computable), but also that it is extremely adversely consequential (e.g., highly costly) if it does occur. A mean, or expected value, computation may be performed for a range of possible outcomes extending, for instance, from cost of, say, $1 million to $200 billion. For instance, an expected value computation across such range, perhaps using a particular probability distribution, may suggest an expected value of any one improperly sequenced pair of event executions—e.g., as may be identified by a 'critical' SCR flag—of, say, $2.5 million, perhaps leading an oil and gas enterprise to conclude that monitoring event execution sequences is not worth the effort.

However, a different viewpoint may be reached when an enterprise considers a 'worst case' outcome rather than a mean, or expected value, outcome. An ESBT embodiment of the SCR system and method, as herein described, has capability to evaluate 'worst case' outcomes with facility equal to that for evaluating other outcomes. Further, an ESBT embodiment may do so irrespective of any ability to compute probabilities of particular event sequence occurrences. Instances of actual, real-world 'worst case' outcomes abound, for instance, with outcomes such as occurred with: the Bhopal, India industrial accident; the U.S. Challenger space shuttle disaster; the Chernobyl, Ukraine nuclear plant disaster; the Three Mile Island nuclear plant situation; and the Ixtoc I oil well blowout in Mexican waters of the Gulf of Mexico. As a measure of the potential value of an ESBT embodiment, a ratio may be computed for a worst case cost outcome to a mean value (or expected value) cost outcome. For instance, if (hypothetically) ACME Oil Company had analyzed a range of possible cost outcomes for a plurality of event execution sequences, it may have found that the mean value of such set of outcomes may be, say, $5 million, with a worst case outcome estimated at $5 billion. A worst case value of $5 billion, compared to a mean value outcome of $5 million (both such values being estimates), suggests a ratio of 1,000-to-one for the cost impact of a worst case versus a mean-value case. The analytical ability of an ESBT embodiment of the SCR system and method to evaluate all event sequences irrespective of any probability estimates of event sequences occurring—as such estimates may be limited by the scope of domain knowledge articulated by domain experts—affords an opportunity to avoid such highly adversely consequential (black swan') outcomes in the form of undesirable event execution sequences.

As will also be apparent to an artisan of ordinary skill, the ESBT embodiments of SCR systems and methods may be of value in a plurality of other multi-step processes, in addition to the upstream oil and gas industry. For instance, an ESBT embodiment may be implemented in sectors or application areas such as: petroleum refining; chemicals and petrochemicals operations; minerals and mining operations; general manufacturing; processes involving multi-step, complex negotiations of interlocking contracts; engineering and construction; aircraft manufacturing; general and private aviation; medical procedures; and others.

In addition to a real (or near-real) time operation environment for an ESBT embodiment, whereby actual event execution sequences may be monitored, such embodiment may also be implemented for other purposes. For instance, an ESBT embodiment may be implemented for purposes of creating and storing documented evidentiary facts pertaining to operations, operation sequences, and circumstances surrounding operations in a particular sector, business, or other setting. For example, even if implementation of an ESBT embodiment had been effected in the instance of the (hypothetical) ABC well incident, as herein described, there may still have been a blowout of that oil well. Use of an ESBT embodiment in such circumstances could still afford access to data and information that may be useful in establishing culpability of one or more parties engaged in support and other roles performed on the hypothetical ABC well project and also in gaining useful knowledge for application in future operations. (Post-event access to such evidentiary information, in the case of the ABC well blowout, would require suitable data backup precautions being in effect, whereby appropriate, timely backup of data— e.g., data contained in any or all of an SCR database, an event sequence analyzer (ESA), event sequence libraries (ESLs) and sub-libraries, and in a data mining algorithms and statistical tools (DMST) module—is maintained at a site location other than, or in addition to, that of the drilling platform.) Further, an ESBT embodiment may be implemented in an environment where only one or a few of all enterprises engaged in a common project or undertaking participates in operation of such embodiment. For instance, the exemplary ACME Oil Company may have implemented an ESBT embodiment for the hypothetical ABC well project wherein third parties, such as oil service companies, may not have directly participated in data input operations for such embodiment. In such circumstance, an enterprise (such as ACME Oil Company) may still monitor its own event executions and event execution sequences and may also monitor those of its supporting enterprises. Thus, joint ownership or joint operation of an ESBT embodiment may not be necessary for fruitful implementation of such embodiment in a multi-enterprise work environment, such as commonly exists in the oil and gas industry, although such would likely be preferable.

Another application area wherein the ESBT embodiment may of beneficial use is that of establishing standards, e.g. standards relating to operational and process safety. For instance, for a particular industry (such as the oil and gas industry, the mining industry, or the electric power industry), operation of an ESBT embodiment application (and including operation of an ESA, ESLs, and a DMST module) may enable creation and accumulation of extensive sector-specific (experience-based) domain knowledge, whereby sector-wide standards for particular process execution and event execution sequences may be established and employed as a guide for safe process operations. Development of such sector-specific standards—by implementation of ESBT embodiments—may offer particularly high benefit in industries characterized by an extensive degree of interaction between human operators and complex machines, whereby a particular order of event executions (e.g., the event execution sequence) is often determined by humans rather than machines—as is the case in the oil well drilling sector. Such interaction is often referred to as the human-machine-interface, or HMI.

Figure 36:
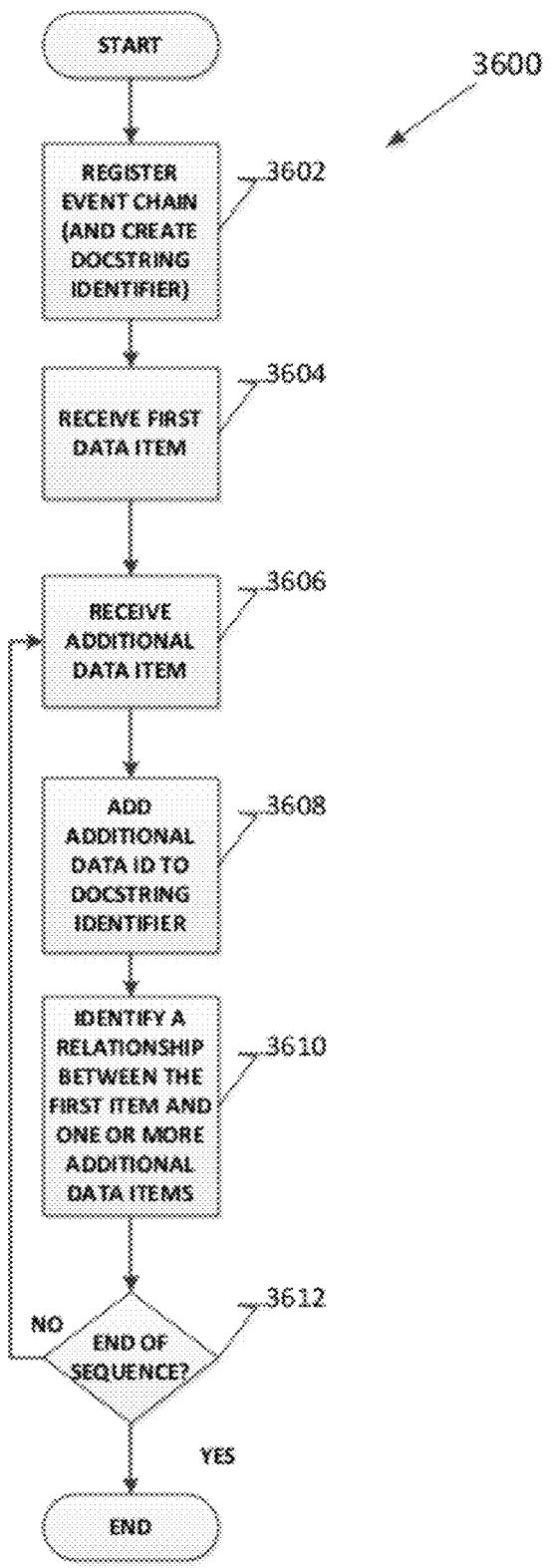
FIG. 36 is a flow chart illustrating an example embodiment of a method to create an event chain.

FIG. 36 is a flow chart illustrating an example embodiment of a method 3600 to create an event chain using a DocString identifier. In embodiments, the method 3600 may be performed by a database or a general computing device. Flow begins with operation 3602 where an event chain is registered. Registering an event chain associates the event chain with a unique identifier that may be used to relate events as they occur over a period of time. In embodiments, the DocString identifier is created upon registering the event chain. In such embodiments, the DocString identifier is the unique identifier created upon registering the event chain. In other embodiments, the DocString identifier may be a modification of a unique identifier created upon registration. For example, the DocString identifier may be created by modifying the unique identifier using an operation such as a hash and/or by combining the unique identifier with other data. One of skill in the art will appreciate that any manner of creating a unique identifier may be employed at operation 3602.

Flow proceeds to operation 3604, by which the database receives a first data item. For example, the database may receive the initial event definition from a user of the database, a user using a different computer device connected to the database over a network, or by another system, application, or process in communication with the database. In embodiments, the first data item may be received from a first user at a first location. In embodiments, the first data item may be a data item containing information about an event, such as, for example, performing a task on an oil rig. In embodiments, the first data item may contain any type of data related to the event.

In embodiments, the first data item may be associated with a unique ID. In one embodiment, the unique ID may be received at operation 3604 along with the data item. In another embodiment, the database or general computing device performing the method 3600 may create a unique ID for the first data item upon receiving it. In embodiments, the first data item may be a sequential chain component, or SCC.

Flow continues to operation 3606, where an additional data item is received. In embodiments, the additional data item may be a sequential chain component (SCC), a sequential chain component host (SCC host or SCC host entity), an object, or any other type of data related to an event chain. In embodiments, the additional data item may be received from a second user that is different from the first. Furthermore, the additional data item may be received from a different source than the first data item. The source of the second data item, for example, may be a different location, system, or database. In embodiments the source of the second data item is a siloed system (e.g., a system controlled by a second vendor working to build an oil rig) that does not have access to information in the system that provides the first data item (e.g., a system controlled by a first vendor working to build the oil rig). In embodiments, the additional data item may include its own unique ID. In another embodiment, the method 3600 may create a unique ID for the additional data item upon receiving it.

In embodiments, the additional item may be information related to the same event as the first data item. An example of such information may be a measurement. In such embodiments, the second data item may be a sequential chain component host. In yet another embodiment, the additional item may be a second event or information related to a second event. In embodiments, the new event may be stored in a sequential chain component.

Flow continues to operation 3608, where the DocString identifier is modified using the unique ID of the additional data item. In embodiments, the DocString identifier may be modified by concatenating it with the unique ID of the additional data item. In other embodiments, the DocString identifier may be modified in another manner, such as performing a hash on the DocString identifier using the unique ID of the additional data item. In other embodiments, the data item may be stored with the DocString identifier, thereby allowing all the related documents to be pulled and analyzed when accessing the data item. One of skill in the art will appreciate that any manner of modifying the DocString identifier may be employed with the embodiments disclosed herein.

Flow then proceeds to operation 3610, where a relationship is created between the first data item and the additional data item or items. In one embodiment, the relationship is created using the DocString identifier. For example, the first data item and the additional data item may each be stored in a relational database along with the DocString identifier. The DocString identifier is used to relate the data items, for example, by acting as a primary or secondary key for each database entry corresponding to the first data item and the additional data item. In embodiments, the relation of the first data item and the additional data item or items creates a digital sequential chain. The relation of the first data item and the one or more additional data items allows for the tracking of an events (e.g., the first data item or a sequential chain component) as they occur over a period of time including milieu data about the event (e.g., sequential chain component hosts).

Flow continues to decision operation 3612. At operation 3612 a determination is made as to whether the sequence has completed. For example, the method 3600 may receive an indication that the sequence is complete. One of skill in the art will appreciate that any matter of determining that an event sequence has completed may be employed with the embodiments disclosed herein. If the sequence is complete, flow branches YES and terminates, resulting in a completed digital sequential chain of events. If the sequence is not complete, flow branches NO and returns to operation 3606 where additional data items are received and the DocString identifier is again modified, thereby continuing construction of the event chain.

In embodiments, the DocString identifier is used to relate one or more events that may occur over a period of time. The DocString identifier may be used to relate the one or more events in such a way that a digital event chain can be constructed which aggregates data pertaining to all related events (and, in embodiments, milieu data about the events), even when such data is collected from siloed sources that do not have access to each other's data. The aggregated information may then be processed in order to discover information about the events (e.g., by an event sequence analyzer or any of the other components disclosed herein). This provides for the tracking of events as they may occur to one or more item, as described herein. Such aggregated information, once so processed, also may be used to enable improvement over time to the knowledge base represented by benchmark event sequences, such as those shown in an ESL 2924 in FIG. 29, that may be employed as reference sequences against which actual event sequences may be measured and evaluated. It also allows for setting flag conditions, as set forth herein, after comparison (e.g., comparison of the event order) of such aggregated information to data stored in the ESL 2924.

Although specific embodiments were described herein and specific examples were provided, the scope of the invention is not limited to those specific embodiments and examples. One skilled in the art will recognize other embodiments or improvements that are within the scope and spirit of the present invention. Therefore, the specific structure, acts, or media are disclosed only as illustrative embodiments. The scope of the invention is defined by the following claims and any equivalents therein.

What is claimed is:

1. A method for storing data about events in an event chain, the method comprising:
   creating a DocString identifier;
   receiving a first data item related to a first event, the first data item having a first identifier;
   modifying the DocString identifier using the first identifier;
   receiving a second data item related to a second event, the second data item having a second identifier;
   modifying the DocString identifier using the second identifier;
   receiving a third data item comprising data about the third event, wherein the third data item has a third identifier;
   modifying the DocString identifier using the third identifier;
   identifying a relationship between the first, second, and third data items using the DocString identifier; and
   providing information relating to the event chain, including using the DocString identifier to access the first data item and the second data item, wherein providing information relating to the event comprises:
      comparing the event chain to data from an event sequence library to generate comparison data, wherein the data in the event sequence library defines at least one pre-defined event sequence comprising a plurality of events, and wherein the comparison data is based at least upon an event order of the first event and the second event and an order of events in the at least one pre-defined event sequence, and wherein the event sequence library comprises:
  data related to a known dangerous event sequence; and
  data related to a suspect event sequence; and
  generating a report based on the comparison data.

2. The method of claim 1, wherein the first data item is stored in a sequential chain component.

3. The method of claim 1, wherein the at least one pre-defined event sequence comprises at least a first known dangerous event sequence.

4. The method of claim 3, wherein the report comprises a flag condition, and wherein when the event sequence data is comparable to the first known dangerous event sequence, the flag condition is set to a fail condition.

5. The method of claim 1, wherein the report comprises a flag condition, and wherein at least one pre-defined event sequence comprises at least a first suspect event sequence, and when the event sequence data is comparable to the first suspect event sequence, the flag condition is set to a suspect condition.

6. The method of claim 1, wherein the report comprises a flag condition, and wherein when the event sequence data is comparable to a first acceptable event sequence, the flag condition is set to a NULL flag condition.

7. The method of claim 1, wherein the event sequence library comprises data related to an acceptable event sequence.

8. The method of claim 1, wherein the first data item is received from a first source that is part of a first system and the second data item is received from a second source that is part of a second system.

9. The method of claim 8, wherein the first source and the second source are distinct systems, wherein the first system does not have access to data of the second system.

10. A non-transitory computer storage medium encoding computer executable instructions that, when executed by at least one processor, cause the at least one processor to perform a method for storing data about events in an event chain, the method comprising:
  creating a DocString identifier;
  receiving a first data item related to a first event, the first data item having a first identifier;
  modifying the DocString identifier using the first identifier;
  receiving a second data item related to a second event, the second data item having a second identifier;
  modifying the DocString identifier using the second identifier;
  receiving a third data item comprising data about the third event, wherein the third data item has a third identifier;
  modifying the DocString identifier using the third identifier;
  identifying a relationship between the first, second, and third data items using the DocString identifier; and
  providing information relating to the event chain, including using the DocString identifier to access the first data item and the second data item, wherein providing information relating to the event comprises:
    comparing the event chain to data from an event sequence library to generate comparison data, wherein the data in the event sequence library defines at least one pre-defined event sequence comprising a plurality of events, and wherein the comparison data is based at least upon an event order of the first event and the second event and an order of events in the at least one pre-defined event sequence, and wherein the event sequence library comprises:
      data related to a known dangerous event sequence; and
      data related to a suspect event sequence; and
    generating a report based on the comparison data.

11. The computer storage medium of claim 10, wherein the first data item is stored in a sequential chain component.

12. The computer storage medium of claim 10, wherein the at least one pre-defined event sequence comprises at least a first known dangerous event sequence.

13. The computer storage medium of claim 12, wherein the report comprises a flag condition, and wherein when the event sequence data is comparable to the first known dangerous event sequence, the flag condition is set to a fail condition.

14. The computer storage medium of claim 10, wherein the report comprises a flag condition, and wherein at least one pre-defined event sequence comprises at least a first suspect event sequence, and when the event sequence data is comparable to the first suspect event sequence, the flag condition is set to a suspect condition.

15. The computer storage medium of claim 10, wherein the first data item is received from a first source that is part of a first system and the second data item is received from a second source that is part of a second system.

16. The computer storage medium of claim 15, wherein the first source and the second source are distinct systems, wherein the first system does not have access to data of the second system.

17. A system comprising:
  at least one processor; and
  memory encoding computer executable instructions that, when executed by the at least one processor, cause the at least one processor to perform a method for storing data about events in an event chain, the method comprising:
    creating a DocString identifier;
    receiving a first data item related to a first event, the first data item having a first identifier;
    modifying the DocString identifier using the first identifier;
    receiving a second data item related to a second event, the second data item having a second identifier;
    modifying the DocString identifier using the second identifier;
    receiving a third data item comprising data about the third event, wherein the third data item has a third identifier;
    modifying the DocString identifier using the third identifier;
    identifying a relationship between the first, second, and third data items using the DocString identifier; and
    providing information relating to the event chain, including using the DocString identifier to access the first data item and the second data item, wherein providing information relating to the event comprises:
      comparing the event chain to data from an event sequence library to generate comparison data, wherein the data in the event sequence library defines at least one pre-defined event sequence comprising a plurality of events, and wherein the comparison data is based at least upon an event order of the first event and the second event and an order of events in the at least one pre-defined event sequence, and wherein the event sequence library comprises:
        data related to a known dangerous event sequence; and
      data related to a suspect event sequence; and generating a report based on the comparison data.

18. The system of claim 17, wherein the at least one pre-defined event sequence comprises at least a first known dangerous event sequence.

19. The computer storage medium of claim 18, wherein the report comprises a flag condition, and wherein when the event sequence data is comparable to the first known dangerous event sequence, the flag condition is set to a fail condition.

20. The system of claim 17, wherein the report comprises a flag condition, and wherein at least one pre-defined event sequence comprises at least a first suspect event sequence, and when the event sequence data is comparable to the first suspect event sequence, the flag condition is set to a suspect condition.

* * * * *